US010780907B1

(12) United States Patent
Camarco et al.

(10) Patent No.: US 10,780,907 B1
(45) Date of Patent: Sep. 22, 2020

(54) ATTACHABLE CART SYSTEM AND METHOD

(71) Applicant: C5 Enterprises LLC, Colts Neck, NJ (US)

(72) Inventors: Kenneth Camarco, Colts Neck, NJ (US); Jonathan Albert, Philadelphia, PA (US); Eric Chang, Plainsboro, NJ (US); Pierre-Andre Couture, Laval (CA); Francois Gelinas, Terrebonne (CA); Gregory Allen Wallace, Mission Viejo, CA (US); Mark William Chiles, Yorba Linda, CA (US); Marko Vujicic, Huntington Beach, CA (US)

(73) Assignee: Invententional Products, LLC, Sherrills Ford, NC (US)

( * ) Notice: Subject to any disclaimer, the term of this patent is extended or adjusted under 35 U.S.C. 154(b) by 0 days.

(21) Appl. No.: 16/179,986

(22) Filed: Nov. 4, 2018

Related U.S. Application Data

(63) Continuation-in-part of application No. 15/611,712, filed on Jun. 1, 2017, now Pat. No. 10,131,371.

(Continued)

(51) Int. Cl.
*B62B 3/02* (2006.01)
*B62B 5/00* (2006.01)
(Continued)

(52) U.S. Cl.
CPC ............ *B62B 5/0003* (2013.01); *B62B 3/002* (2013.01); *B62B 3/02* (2013.01); *B62B 3/04* (2013.01);
(Continued)

(58) Field of Classification Search
CPC ......... B60R 9/06; B60R 9/065; B62B 5/0003; B62B 2203/10; B62B 2205/06; B62B 2205/20
See application file for complete search history.

(56) References Cited

U.S. PATENT DOCUMENTS 2,676,720 A  4/1954  Noble
4,681,335 A  7/1987  Ledermann et al.
(Continued)

FOREIGN PATENT DOCUMENTS

WO  WO 2016/000042      1/2016
WO  WO 2016/000042 A1   7/2016

OTHER PUBLICATIONS

Supplementary European Search Report, PCT/US2017035559, dated Jan. 2, 2020.

*Primary Examiner* — Brian L Swenson
(74) *Attorney, Agent, or Firm* — Roark IP

(57) ABSTRACT

A cart is disclosed which is capable of being wheeled to a vehicle and mounted thereon through a mount secure coupling attached to the cart and a secure receiver attached to the vehicle. Upon secure attachment to the vehicle, the carts undercarriage assembly including wheels are capable of being retracted into the top deck assembly of the cart. Therefore, the vehicle maintains clearance from the road even after the cart is attached. Upon reaching a destination, the undercarriage of the cart is lowered and the cart is detached from the vehicle. The cart is then able to be wheeled away. The cart allows for transportation of loads without the need for the operator to actually carry either the load or the cart at any stage from start to finish or perform any additional steps to safe and securely attach the cart to the vehicle.

14 Claims, 84 Drawing Sheets

Related U.S. Application Data

(60) Provisional application No. 62/581,772, filed on Nov. 5, 2017, provisional application No. 62/344,436, filed on Jun. 2, 2016.

(51) Int. Cl.
  B62B 3/00 (2006.01)
  B62B 3/04 (2006.01)
  B62B 5/06 (2006.01)
  B62B 5/04 (2006.01)

(52) U.S. Cl.
  CPC ............... B62B 5/068 (2013.01); *B62B 5/04* (2013.01); *B62B 2206/003* (2013.01); *B62B 2206/06* (2013.01); *B62B 2301/04* (2013.01)

(56) References Cited

U.S. PATENT DOCUMENTS

| | | | |
|---|---|---|---|
| 5,454,625 A | 10/1995 | Christensen | |
| 5,567,107 A | 10/1996 | Bruno et al. | |
| 5,615,814 A * | 4/1997 | Dechant | B60R 9/06 224/282 |
| 5,996,869 A * | 12/1999 | Belinky | B60R 9/06 116/28 R |
| 6,152,462 A | 11/2000 | Barrett | |
| 6,202,909 B1 | 3/2001 | Belinsky | |
| 6,502,730 B2 | 1/2003 | Johnson | |
| 6,705,624 B2 | 3/2004 | Cassoni | |
| 6,725,855 B1 | 4/2004 | Brennan | |
| 6,846,017 B2 | 1/2005 | Martin | |
| 7,249,771 B1 | 7/2007 | Brennan | |
| 7,905,508 B2 | 3/2011 | Crawford | |
| 8,827,303 B1 | 9/2014 | Fridman | |
| 8,905,423 B2 | 12/2014 | Hart | |
| 8,979,098 B2 * | 3/2015 | Wang | B62B 3/022 280/39 |
| 8,985,418 B1 | 3/2015 | Poudrier | |
| 9,114,758 B1 | 8/2015 | Poudrier | |
| 9,381,867 B2 | 7/2016 | Robinson | |
| 9,387,869 B1 * | 7/2016 | Berger | B62B 3/022 |
| 9,694,758 B1 | 7/2017 | Krolski | |
| 2002/0005423 A1 | 1/2002 | Grover | |
| 2005/0179241 A1 | 8/2005 | McManus | |
| 2006/0118586 A1 | 6/2006 | Heravi | |
| 2006/0145461 A1 * | 7/2006 | Anderson | B60R 9/06 280/769 |
| 2007/0096437 A1 | 5/2007 | Watson | |
| 2007/0126192 A1 | 6/2007 | Thomas | |
| 2008/0100076 A1 * | 5/2008 | Potts | B60R 9/06 296/3 |
| 2009/0159627 A1 | 6/2009 | Myrex | |
| 2009/0230642 A1 | 9/2009 | Thomas | |
| 2009/0232633 A1 | 9/2009 | Stamps et al. | |
| 2010/0260587 A1 | 10/2010 | LeAnna | |
| 2012/0133112 A1 | 5/2012 | Myrant | |
| 2013/0292925 A1 | 11/2013 | Shindelar | |
| 2014/0375040 A1 | 12/2014 | Rhodes | |
| 2015/0050107 A1 | 2/2015 | Kipp | |
| 2015/0175085 A1 * | 6/2015 | Raley | B60R 3/00 224/519 |
| 2017/0360173 A1 | 12/2017 | Berger | |
| 2018/0009461 A1 * | 1/2018 | Rucker | B62B 3/022 |
| 2018/0022287 A1 * | 1/2018 | Sorey | B62B 3/0631 224/519 |
| 2019/0351833 A1 * | 11/2019 | Ni | B60R 9/06 |
| 2019/0375338 A1 * | 12/2019 | Deninno | B60R 9/10 |

\* cited by examiner

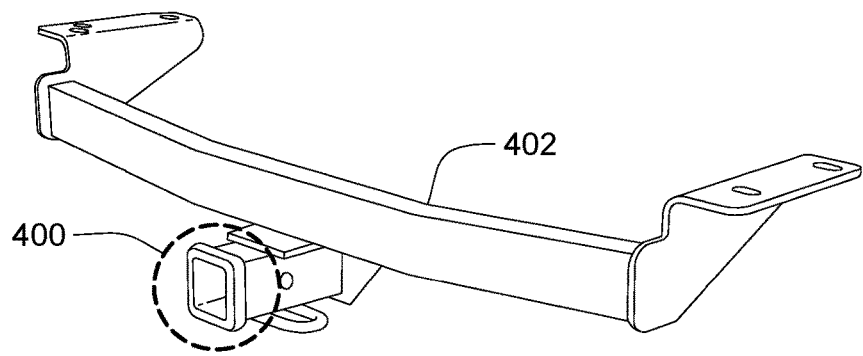
FIG. 15
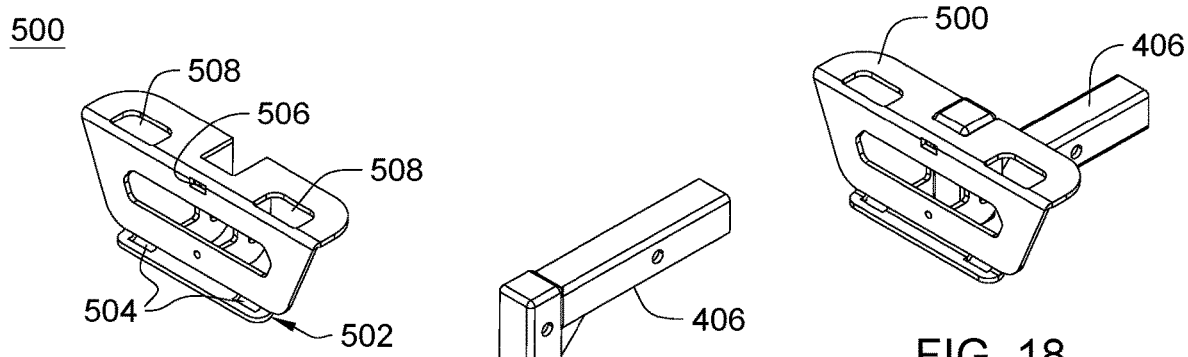
FIG. 16
FIG. 17
FIG. 18
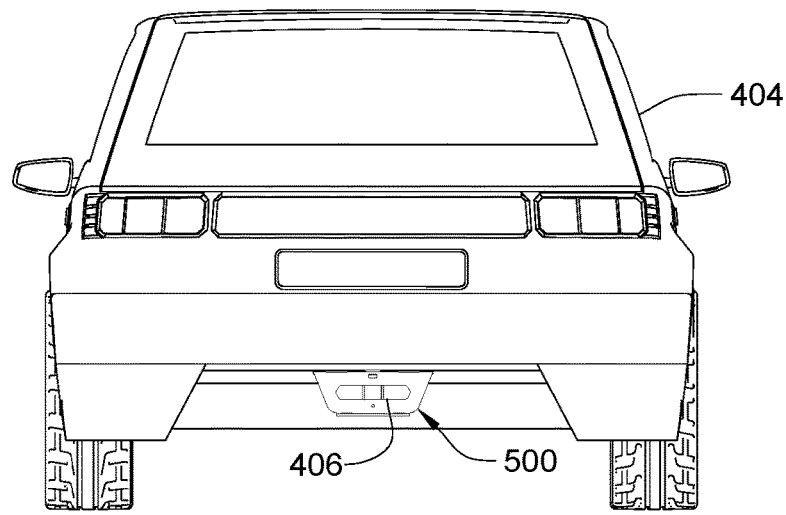
FIG. 19

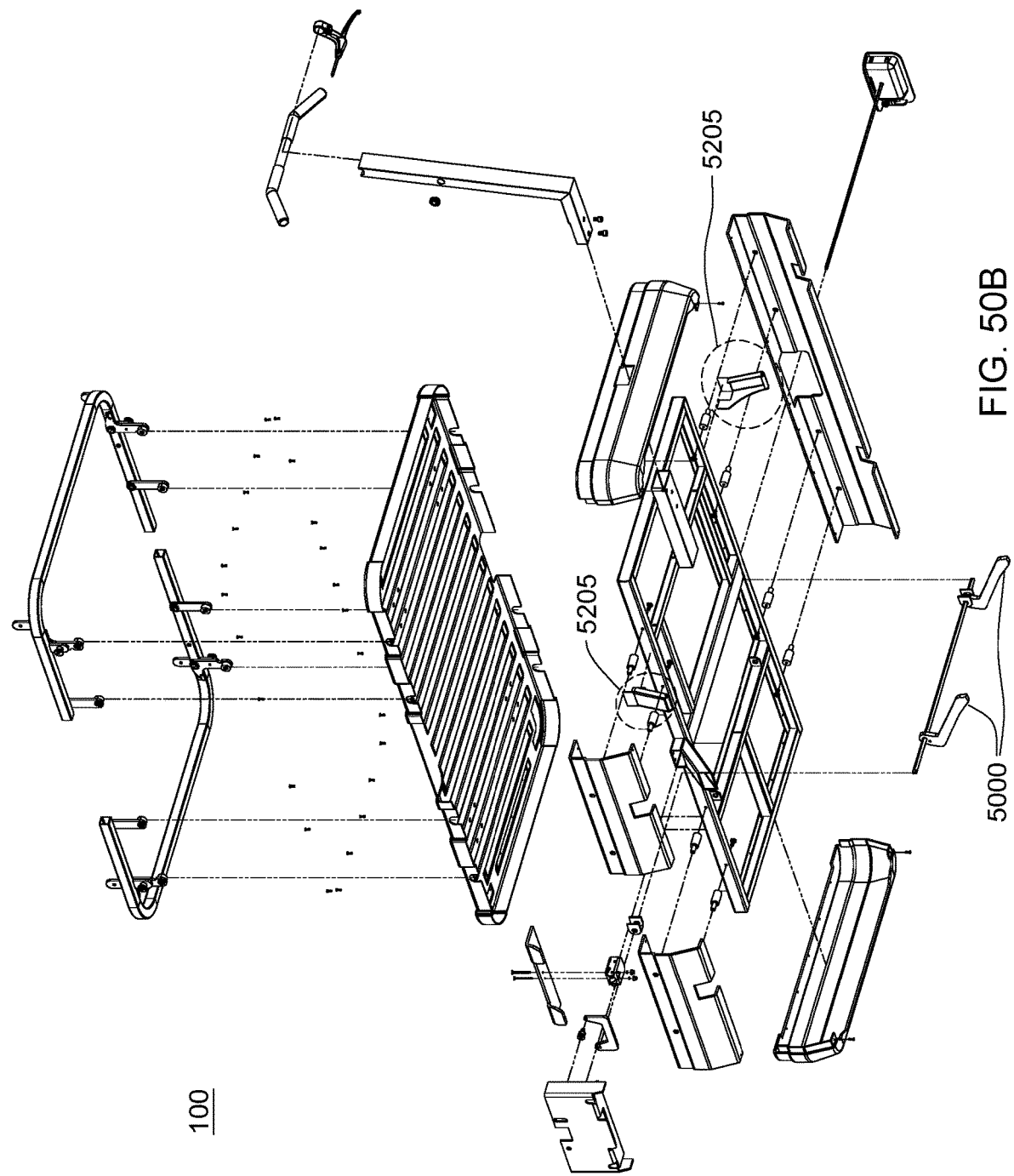

ATTACHABLE CART SYSTEM AND METHOD

CROSS-REFERENCE TO RELATED APPLICATIONS

This application claims the benefit of U.S. Provisional Patent Application Ser. No. 62/581,772, filed Nov. 5, 2017; and U.S. patent application Ser. No. 15/611,712, filed Jun. 2, 2017; which claims the benefit of 62/344,436, filed Jun. 2, 2016. These applications are all incorporated herein by reference.

FIELD OF THE DISCLOSURE

The present disclosure relates to carts and, more particularly, it relates to mechanisms for attaching a cart to a vehicle.

BACKGROUND OF THE DISCLOSURE

Several types of collapsible and foldable carts for transporting articles or goods have been utilized in the past. Generally, these types of foldable carts are used by home owners for transporting of groceries, packages, luggage, duffle bags, ski equipment, sports gear, musical equipment, and the like. Some of these may have a capability to work at multiple heights as well. These foldable, and/or adjustable height carts are also implemented for commercial and light industry usage in the transporting of in process goods, finished products, tools and construction equipment and the like.

SUMMARY

Aspects of the disclosure include a cart and mount secure coupling and receiver system comprising: a cart including: a top deck assembly having a carrying portion, a mount secure coupling and a secure coupling lock assembly; an undercarriage assembly capable of supporting and adjusting the height of the top deck assembly so that the mount secure coupling is capable of being attached to a secure receiver by the engagement of both the mount secure coupling and the secure coupling lock assembly.

Further aspects of the disclosure include a method of coupling a cart to a secure receiver: the cart is placed in position with a mount secure coupling mounted on a top deck assembly of the cart substantially aligned with the secure receiver; a hydraulic pump foot pedal coupled to a hydraulic cylinder pump in an undercarriage assembly of the cart receives pumps from an operator to elevate the mount secure coupling above the secure receiver; and a hydraulic release lever is activated to release pressure in the hydraulic cylinder pump to lower the mount secure coupling onto the secure receiver and cause the undercarriage assembly to rise.

Further aspects of the disclosure include a secure receiver comprising: at least one retention tine slot (also know as a "slot") capable of receiving a corresponding at least one mount secure coupling top tine; at least one lower tine reception slot capable of receiving a corresponding at least one mount secure coupling lower tine; and an opening capable of receiving a latch bolt.

Further aspects of the disclosure include a secure receiver comprising: a plurality of retention tine slots capable of receiving a corresponding plurality of mount secure coupling top tines; a plurality of lower tine reception slots capable of receiving a corresponding plurality of mount secure coupling lower tines; and at least one opening capable of receiving a latch bolt. The plurality of mount secure coupling top tines may be self-aligning and self-seating into upper tine retention slots of the secure receiver.

Further aspects of the disclosure include a carrier and mount secure coupling and receiver system comprising: the carrier comprising: a deck having a carrying portion, a mount secure coupling and a secure coupling lock assembly; and wherein the mount secure coupling is capable of being attached to a secure receiver by the engagement of the mount secure coupling and the secure coupling lock assembly.

BRIEF DESCRIPTION OF THE DRAWINGS

Aspects of the embodiments of this disclosure are illustrated by way of example. While various details of one or more techniques are described herein, other techniques are also possible. In some instances, well-known structures and devices are shown in block diagram form in order to facilitate describing various techniques. A further understanding of the nature and advantages of examples provided by the disclosure can be realized by reference to the remaining portions of the specification and the drawings, wherein like reference numerals are used throughout several drawings to refer to similar components.

FIG. 15 is a perspective view of a vehicle mounted (or trailer mounted) hitch receiver 400 shown attached to a hitch receiver mounting arm and bracket 402 configured to connect to a vehicle.

FIG. 16 is a perspective view of the secure receiver 500.

FIG. 17 is a perspective view of a standard load bar adjustable extender 406.

FIG. 18 is a perspective view of a secure receiver 500 assembled on a load bar adjustable extender 406.

FIG. 19 is a perspective view of the secure receiver 500 assembled to the load bar adjustable extender 406 on the back of a vehicle 404.

FIG. 49C shows an alternative embodiment of the mount secure coupling and secure coupling lock assembly. FIG. 49D shows a fully coupled and locked mount secure coupling and secure receiver. FIG. 49E shows an alternative embodiment of the mount secure coupling with rollers on the front face.

FIGS. 50A-50I illustrate another embodiment of the cart with a safety mechanism to prevent the top deck assembly 106 from lowering too much and causing an inadvertent collapse of the undercarriage assembly 107 when raising and lowering the top deck 106 while the cart 100 is independently mobile and not attached to the secure receiver 500

FIG. 55C shows a perspective view of the locking mechanism 5500a; FIG. 55D is a cross-sectional view of the locking mechanism 5500a; and FIG. 55E is a perspective view of the locking mechanism 5500a.

DETAILED DESCRIPTION OF THE DISCLOSURE

Typical carts permit the transport of goods up and down walkways, steep hills, across dirt trans, and the like, without causing damage to walkway surfaces, such as linoleum, tile, wood, or carpeting. However, conventional carts which have been used in the past lack convenience and versatility. For example, they require lifting of materials and/or the cart itself which limits transportability, lacks maneuverability and handling convenience for the various uses to which such carts are put in warehouses and retail establishments. The embodiments described herein address a gap in currently available material handling devices. Although there are many carts available to move materials from place to place, virtually all unpowered devices require manual "lifting" of either the payload (i.e., the carried materials, tools, resources, etc.), the cart, or both at multiple steps of the transportation process. For example, grocery shopping requires loading and unloading of the shopping cart multiple times to get the groceries/merchandise from store shelf to the kitchen pantry in one's house. Many similar examples exist in industrial manufacturing, assembly, and logistics. Examples also exist in commercial construction and professional trades in movement of tools, materials and other resources from point of supply (store/warehouse) to job site, workbench and other points of use. For leisure, sporting events, or adventure travel the same issues exist in attempting to move necessary gear from place to place.

Figure 1:
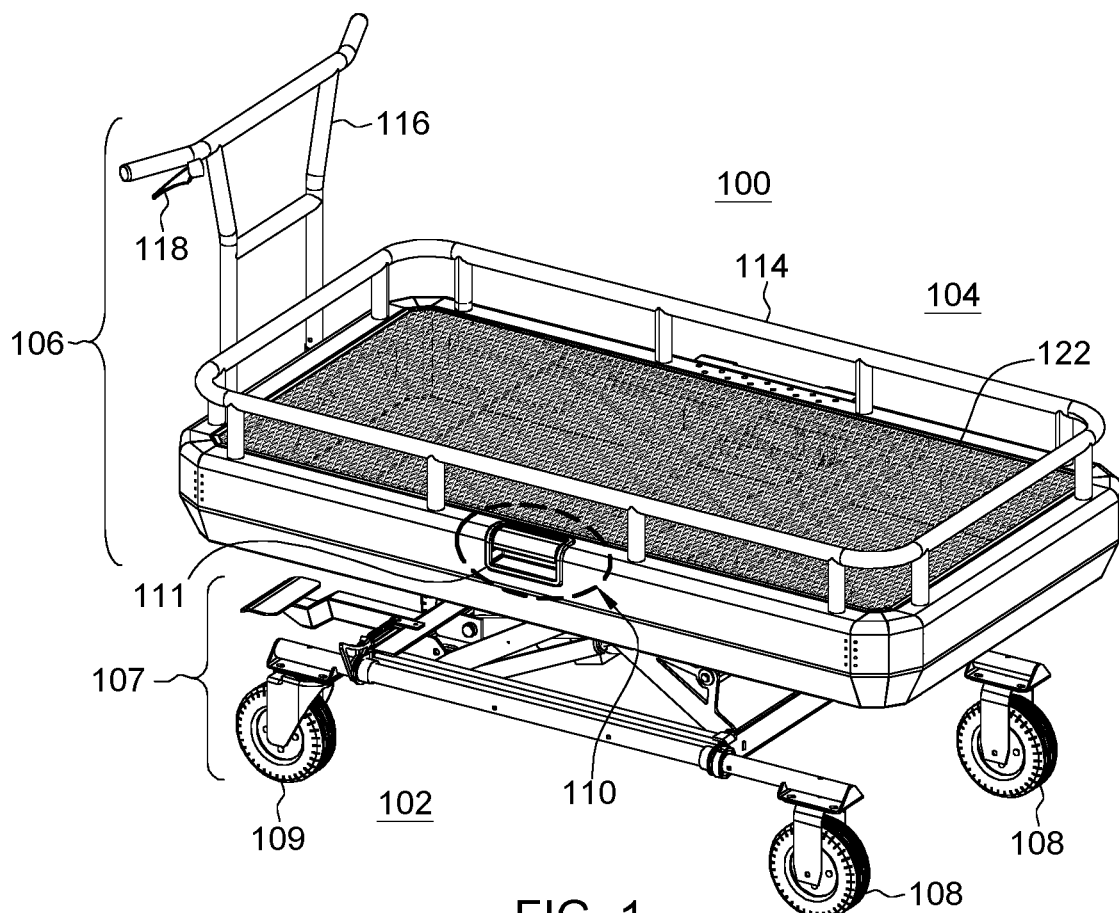
FIG. 1 is a perspective view of the cart 100 from the side facing an operator when the cart is being mounted onto a vehicle (i.e., the "operator side" 102). The cart 100 is shown in upright mode with undercarriage assembly scissors extended and wheels locked out.
Figure 2:
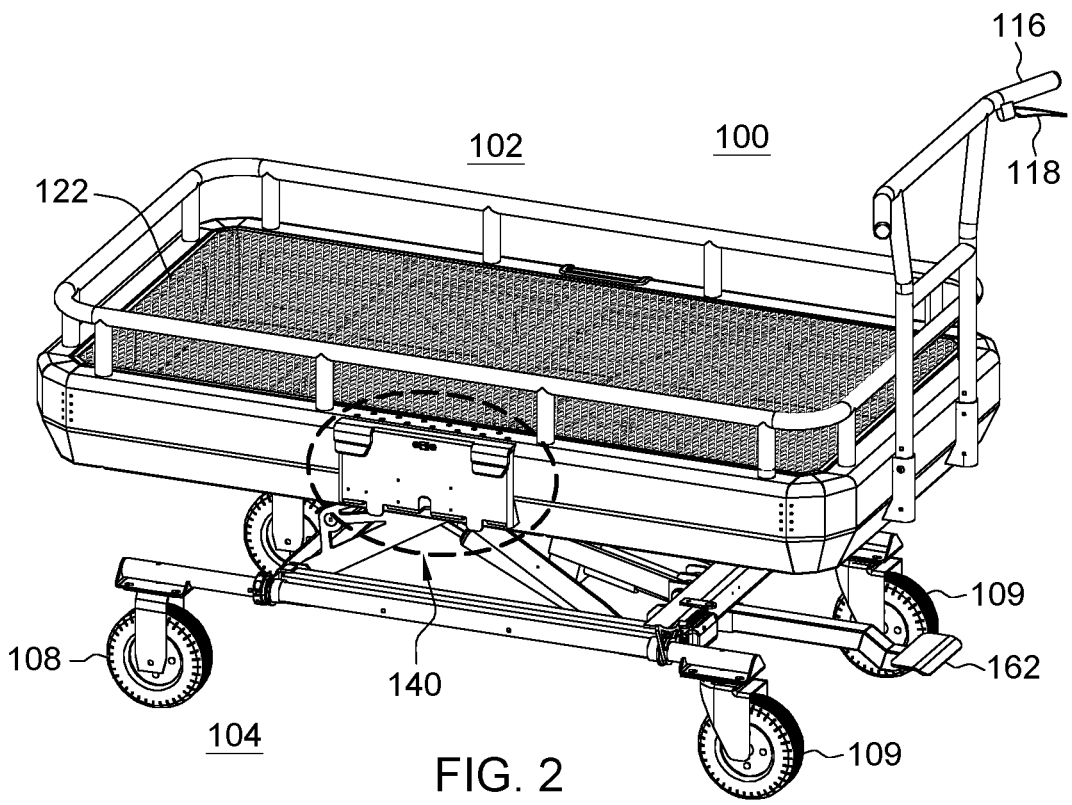
FIG. 2 is a perspective view of the cart 100 from the side facing the vehicle during mounting (i.e., the "vehicle side" 104).
Figure 3:
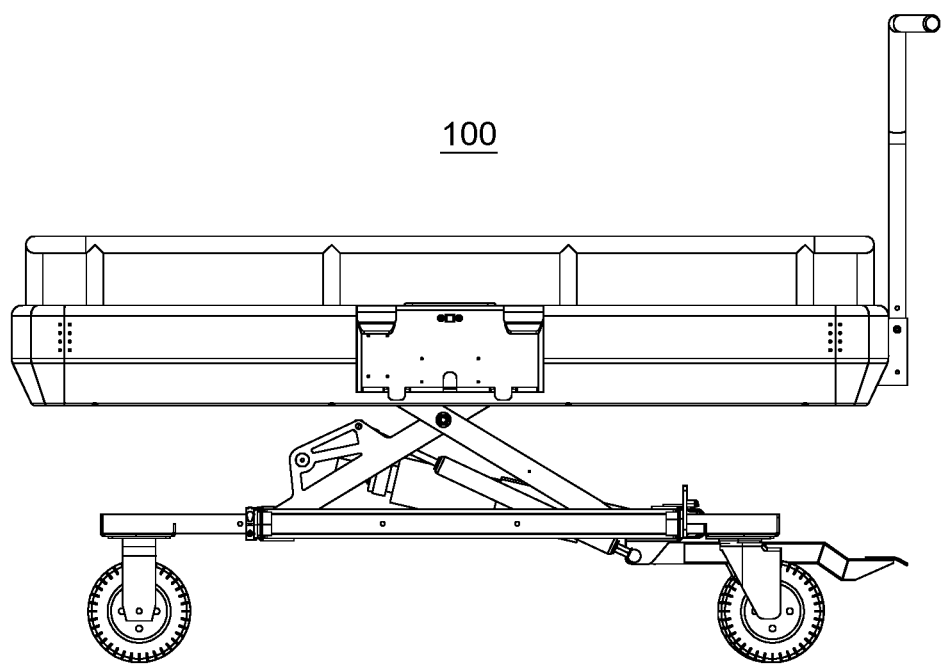
FIG. 3 is an elongated (or lengthwise) view of the cart 100 from the vehicle side 104.
Figure 4:
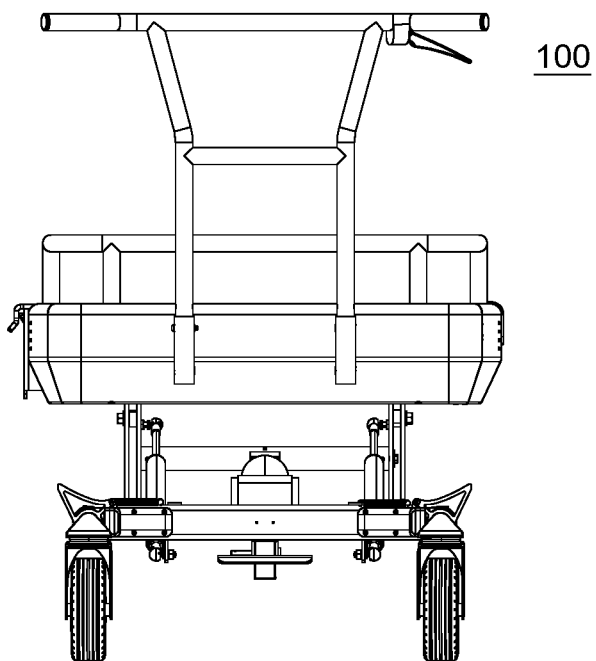
FIG. 4 is a side view of the cart 100 from the handle side.
Figure 5:
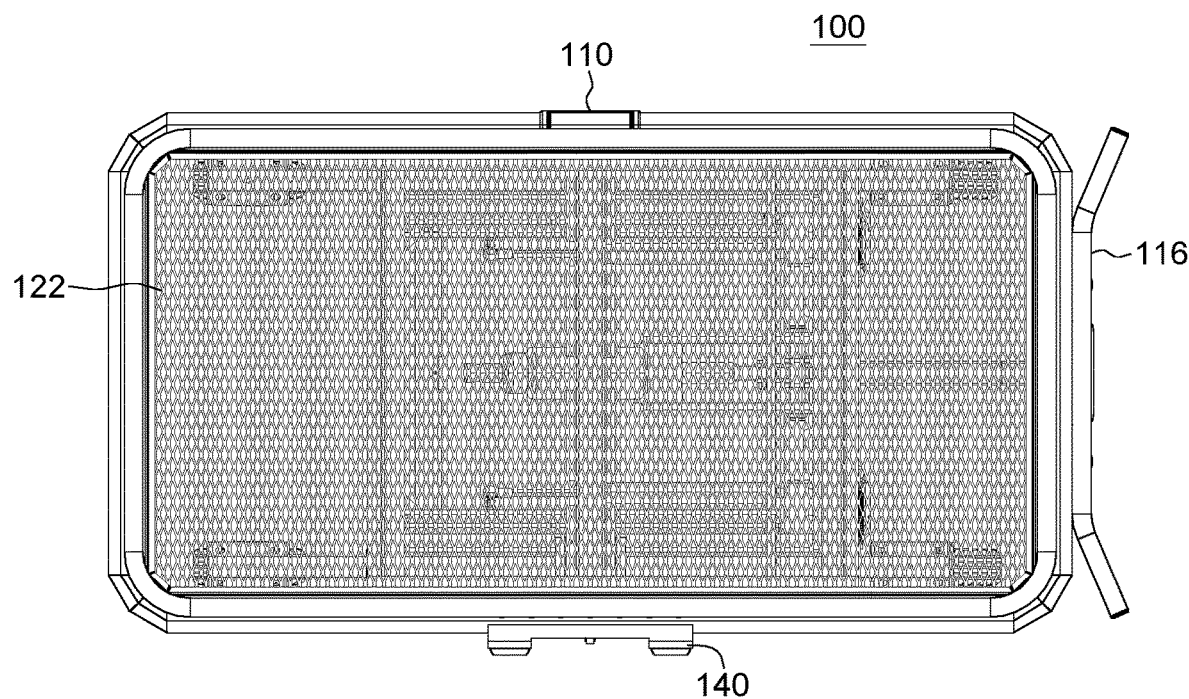
FIG. 5 is a top view of the cart 100 showing deck 122 upon which a load may be placed.

FIGS. 1 through 6B show a mobile, height adjustable and vehicle attachable cart 100 and its associate coupling mechanisms 140, 500 which are the subject of this disclosure from different viewpoints. Mount secure coupling 140 with secure receiver 500 together form a Mount Secure Coupling & Secure Receiver System for mounting and demounting the cart 100 on a vehicle. Cart 100 is capable of rolling and is steerable on retractable and stowable wheels. FIG. 1 is a perspective view of mobile cart 100 from the side facing the operator when the cart is being mounted onto a vehicle (the "operator side" 102). FIG. 2 is a perspective view of the cart 100 from the side facing the vehicle during mounting (the "vehicle side" 104). The cart 100 has a top deck assembly 106 and an undercarriage assembly 107 each of which are made up of numerous component parts. FIG. 3 is an elongated view of the cart 100 from the vehicle side 104. FIG. 4 is a side view of the cart 100 from the handle 116 side. In FIGS. 1-4 the cart 100 is shown in upright mode with supporting scissor arm pairs 152, 154 of the undercarriage assembly 107 extended and wheels 108, 109 locked out in rolling mode of operation. Mount secure coupling 140 on the vehicle side 104 of the cart 100 allows the cart 100 to mate to a secure receiver 500 mounted (typically) on the rear of a vehicle which is configured to receive the mount secure coupling 140. (The secure receiver 500 is also a "universal coupler" or "hitch coupler" usable on any vehicle with a tow hitch which emphasizes its flexibility). The foot step configuration of the secure receiver 500 is an alternative embodiment in which the secure receiver functions as a flat surface step allowing the operator to stand on it. FIG. 5 is a top view of the cart 100 showing deck 122 upon which a load may be placed.

The undercarriage assembly 107 includes a pair of front (or first) wheels 108 which may be rigid and a pair of rear (or second) wheels 109 which may swivel (e.g., caster wheels able to turn 360 degrees). Both sets of wheels 108, 109 are retractable, and rotatable inward and under the undercarriage assembly 107 to provide clearance from the ground for the cart 100 when the cart 100 is mounted on the back of a vehicle. As the vehicle travels, the cart 100 will be high enough not to bottom on a highway or catch objects underneath that are in the path of the vehicle (i.e., typically after mounting of the cart on the vehicle the wheels 108, 109 will be higher than the lowest feature of the vehicle itself like an oil pan). Secure coupling lock release lever (or secure coupling lock release handle) assembly 110 is shown in FIG. 1 and in more detail in FIG. 8. The secure coupling lock release lever assembly 110 is capable of providing a way for an operator to easily unlock a secure coupling lock assembly 202 from the operator side 102 of the cart 100 to demount the cart 100 from the vehicle. The secure coupling lock release lever assembly 110 is made up of a secure coupling lock release lever 111 and a secure coupling lock trim 112. The secure coupling lock release lever assembly 110 is connected to a secure coupling lock connecting rod 200 which in turn connects to and opens a secure coupling lock assembly 202 when activated which will be discussed in detail below.

FIGS. 1-4 also show a brake mechanism of the cart 100. The break mechanism may include independent caster wheel brakes, mechanical lock of wheel axle or friction on wheel itself, a multi-wheel pressure/friction bar, "deadman" brake with hand release to allow rolling, hand operated top or side wheel caliper brake and/or hand operated drum brake.

Figure 6A:
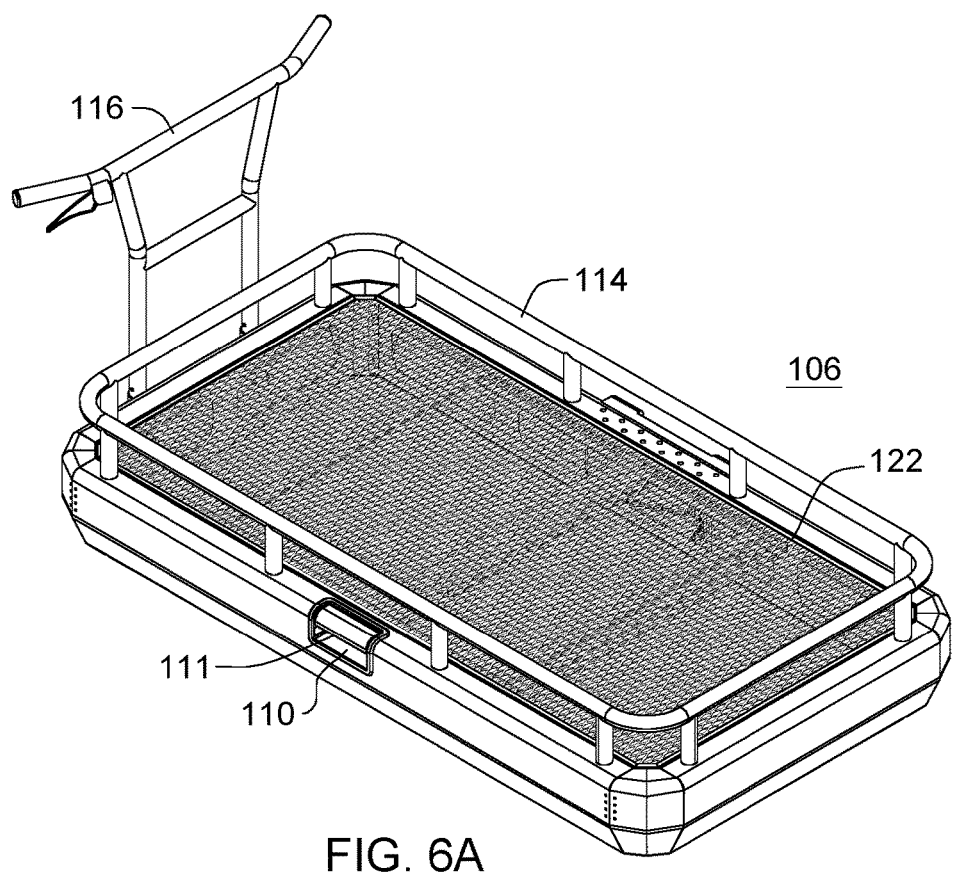
FIG. 6A is a perspective view of a top deck assembly of the cart 100 and FIG. 6B shows a typical load 120 which may be a fully enclosed cargo box or a cover over the deck 122.
Figure 6B:
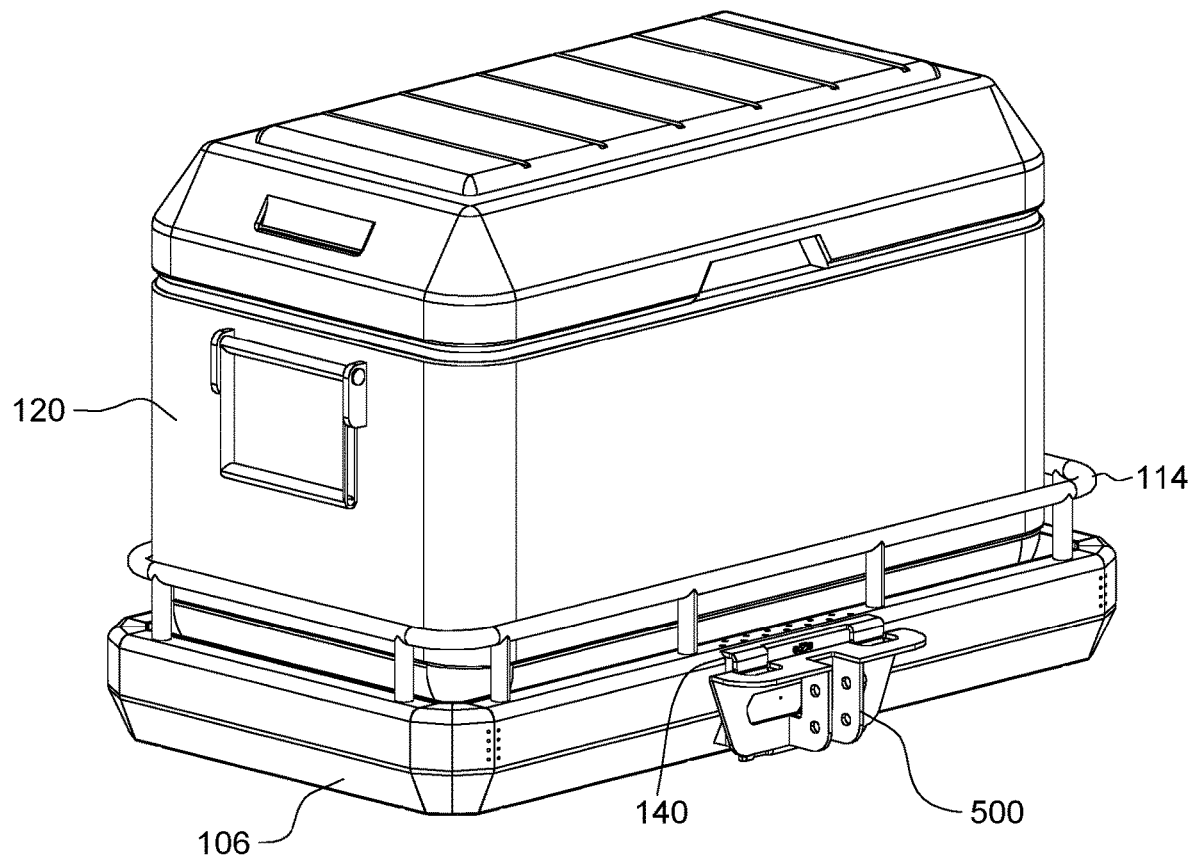

FIG. 6A is a perspective view of the top deck assembly 106 of the cart 100 and FIG. 6B shows the top deck assembly with a load 120. Load 120 may be a wide variety of items such as coolers, groceries, tool chests, sports equipment, barbeque grills, and the like. In terms of weight, in some embodiments, a load 120 may typically be up to and including approximately 500 pounds. However, in alternative embodiments, the weight of the load 120 may be higher than 500 pounds depending on the strength of materials used in the cart 100 and/or the vehicle mounted hitch receiver 400. The cart 100 is shown in FIGS. 6A-6B with an optional guardrail 114 to keep load 120 in place during operation. In alternative embodiments without the guardrail 114, larger loads may be placed on the deck 122 of the top deck assembly 106 without the hindrance of the guardrail 114 and secured by other means. FIG. 6B shows a typical load 120 which may be a fully enclosed cargo box or a cover over the deck 122. In alternative embodiments, the guardrail 114 could drop down like a tailgate. The guardrail 114 could also have attachment devices for attaching accessories.

Figure 7A:
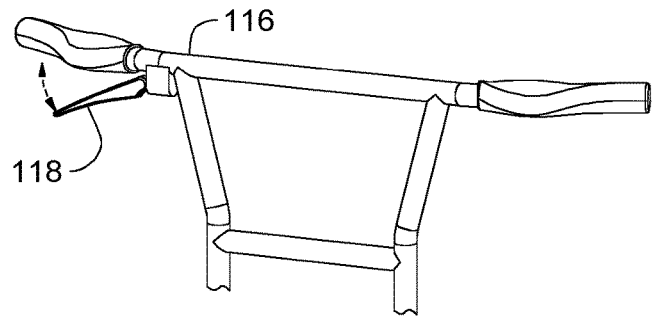
FIG. 7A is a perspective view of the handle of the cart 100 before activation of hydraulic pump release lever 118 and FIG. 7B is a perspective view of the handle of the cart 100 after activation of lever 118.
Figure 7B:
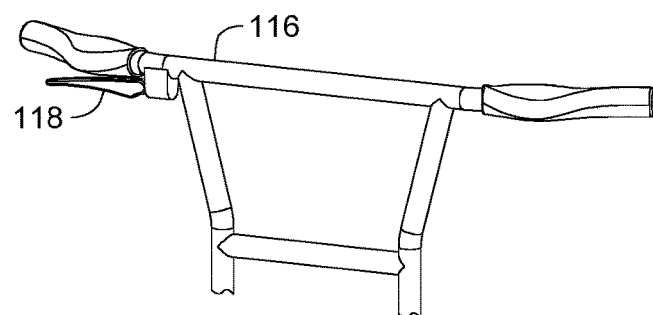

FIGS. 1, 6A, 7A and 7B show handle 116 which may be used to push or pull the cart 100 during operation. The handle 116 can remain fixed in place after cart 100 is attached to a vehicle or, in an alternative embodiment, it could be folded, collapsed telescopically or otherwise stowed under the cart 100. During a mounting operation of the cart 100 to a vehicle 404, the mount secure coupling 140 of the top deck assembly 102 will be positioned by the operator near the secure receiver 500 of the vehicle 404. The cart 100 is typically maneuvered into place for mounting through the operator pushing handle 116 until the mount secure coupling 140 is substantially aligned with and raised over the secure receiver 500 as shown in FIGS. 21A-22C which will be discussed in detail below. Handle 116 includes a hydraulic pump release lever 118 connected by a hydraulic release cable 117 to a hydraulic cylinder pump 150 located in the undercarriage assembly 107. When activated, the hydraulic pump release lever 118 lowers the mount secure coupling 140 onto secure receiver 500 by releasing pressure in the hydraulic cylinder pump 150 which controls the height of the undercarriage assembly 107 during coupling of the mount secure coupling 140 to the secure receiver 500. FIG. 7A is a perspective view of the handle of the cart 100 before activation of hydraulic pump release lever 118. In FIG. 7A, lever 118 is at rest with the pressure valve of the hydraulic cylinder pump 150 (shown in FIG. 11) closed before activation. FIG. 7B is a perspective view of the handle of the cart 100 after activation of lever 118. In FIG. 7B with lever 118 activated, the pressure valve of hydraulic cylinder pump 150 is opened. Hydraulic pump release lever 118 may be used to lower the top deck assembly 106 (also described in detail below) while hydraulic pump foot pedal 162 may be pumped by the operator to raise the top deck assembly 106. (In an alternative embodiment, instead of a hydraulic cylinder pump 150 an electric motor and linear actuator may be used to raise and lower the top deck assembly 106 which will be discussed in connection with FIGS. 34-41D). Once the cart 100 is aligned above the secure receiver 500, the operator squeezes the hydraulic pump release lever 118 to open the pressure valve releasing pressure in the hydraulic cylinder pump 150 and allow cart 100 to begin the mounting coupling sequence (or mount secure receiver coupling sequence) of the mount secure coupling 140 to the secure receiver 500 of the vehicle 404 (see FIGS. 21A-21B). The hydraulic pump release lever 118 will typically be held in actuated position throughout the mounting coupling sequence process. This allows a sequence of events to unfold including the following: top tines 144 and lower tines 145 of the mount secure coupling 140 descend into the top and bottom openings respectfully in the secure receiver 500 which is attached to the vehicle; the secure coupling lock assembly 202 engages and secures the cart 100; retraction of the undercarriage assembly 107; and the axle lock trigger 146 releases stow axles 155 and folds wheels 108, 109 into an inward stowed position under the top deck assembly 106.

Figure 8:
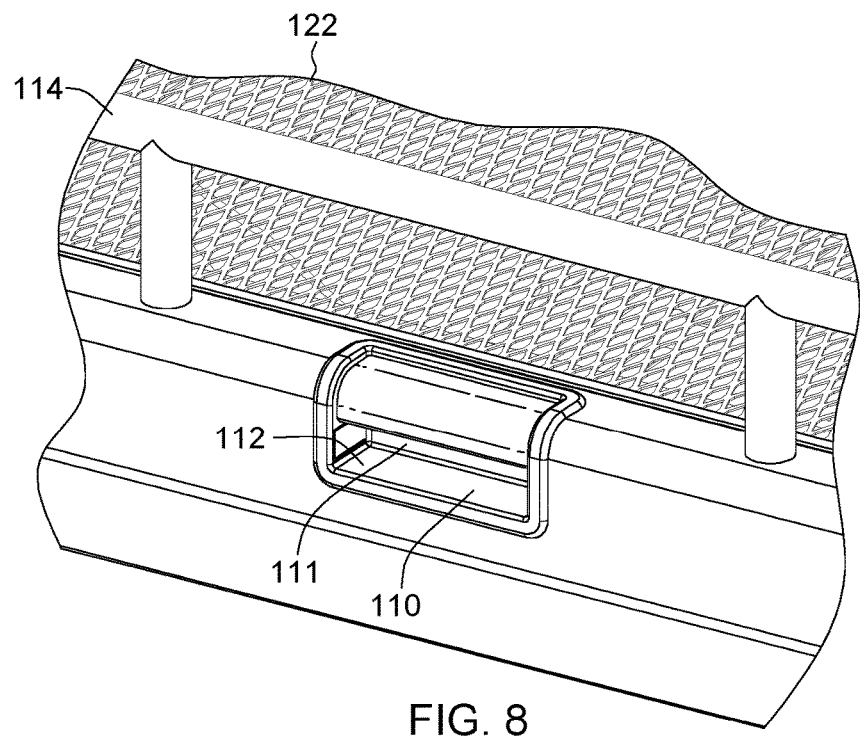
FIG. 8 is a detailed perspective view of the secure coupling lock release lever 111 of the secure coupling lock release lever assembly 110 shown in a locked position.

FIG. 8 is a detailed perspective view of the secure coupling lock release lever 111 of the secure coupling lock release lever assembly 110 shown in a locked position. As a failsafe measure the operator must manually pull the secure coupling release lever 111 out to release a secure coupling latch bolt 212 from the secure receiver 500 to allow the cart 100 to be lifted off the secure receiver 500 during the detaching of the cart 100 from the vehicle. The secure coupling lock latch bolt 212 will then reset for the next coupling of the cart 100 to the vehicle.

Figure 9:
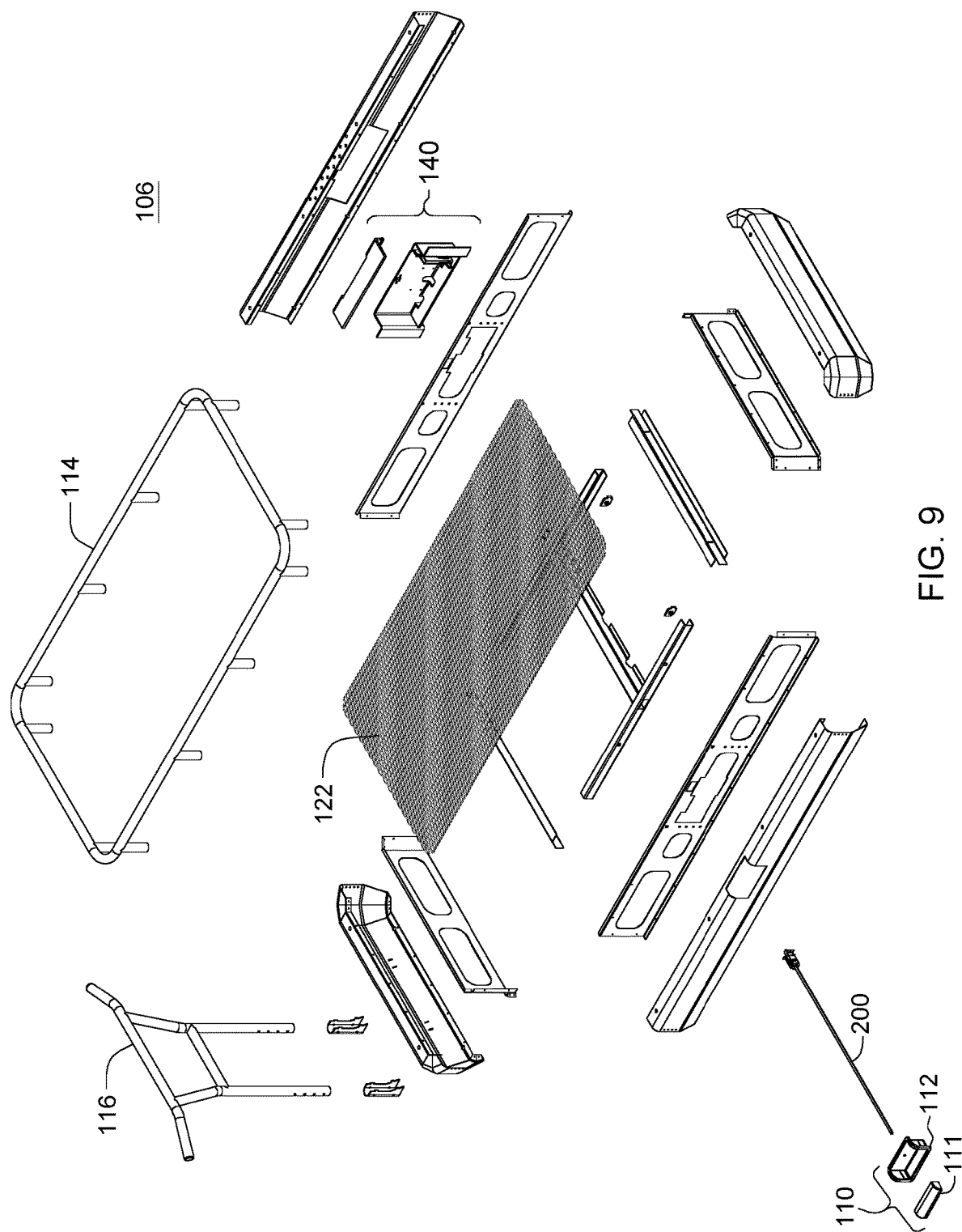
FIG. 9 is an exploded view of the components of the top deck assembly.

FIG. 9 is an exploded view of the components of the top deck assembly 106. Deck 122 is part of top deck assembly 106 to provide support for a load 120 placed on the cart 100. Deck assembly 106 and individual components; guardrail 114, handle 116 and deck 122 may all be made of steel, aluminum, titanium, carbon fiber, or perhaps plastic (e.g., the deck surface). In alternative embodiments the handle 116 could be attached to the undercarriage 107.

Figure 10:
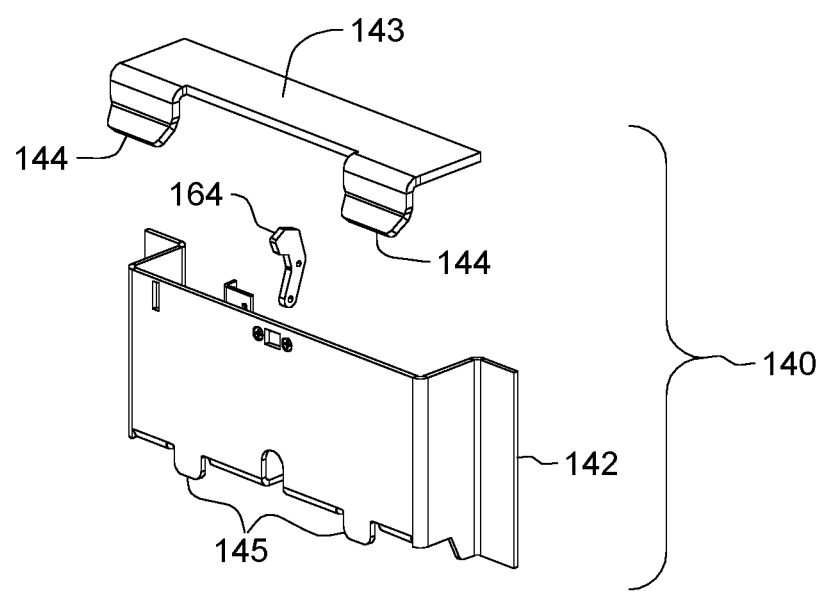
FIG. 10 is a perspective view of the mount secure coupling 140 assembly.

FIG. 10 is a perspective exploded view of the mount secure coupling 140 which is attached to cart 100 and, as previously discussed, forms the cart side coupler which attaches to secure receiver 500 mounted on a vehicle 404. The mount secure coupling 140 is an assembly of components made up of a mount secure coupling plate 142 with mount secure coupling lower tines 145; a mount secure coupling top 143 with mount secure coupling top tines 144; and axle lock trigger 164. The mount secure coupling components can typically be made of strong, durable materials such as steel. The mount secure coupling top tines 144 may be self-aligning and self-seating into upper tine retention slots 508. Tines 144 and 145 may also be known as hooks. Collectively, tines 144 and 145 maybe known as a yoke. The tines could be of any three dimensional geometry composing a male form to be inserted into an opening to allow coupling with the secure 500 receiver.

Figure 11:
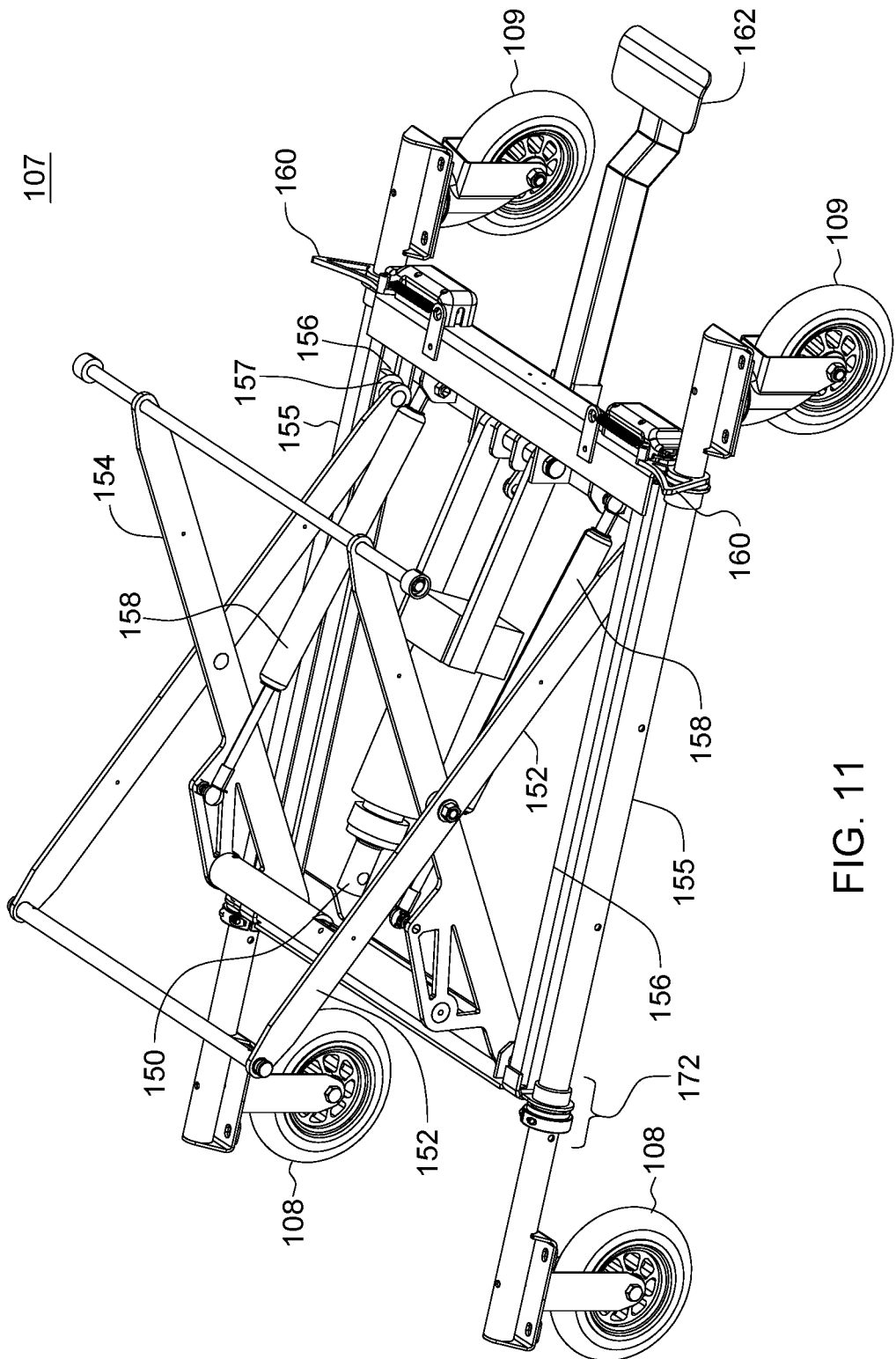
FIG. 11 is a perspective view of the undercarriage assembly 107 of the cart 100 without the top deck assembly 106 shown.
Figure 12:
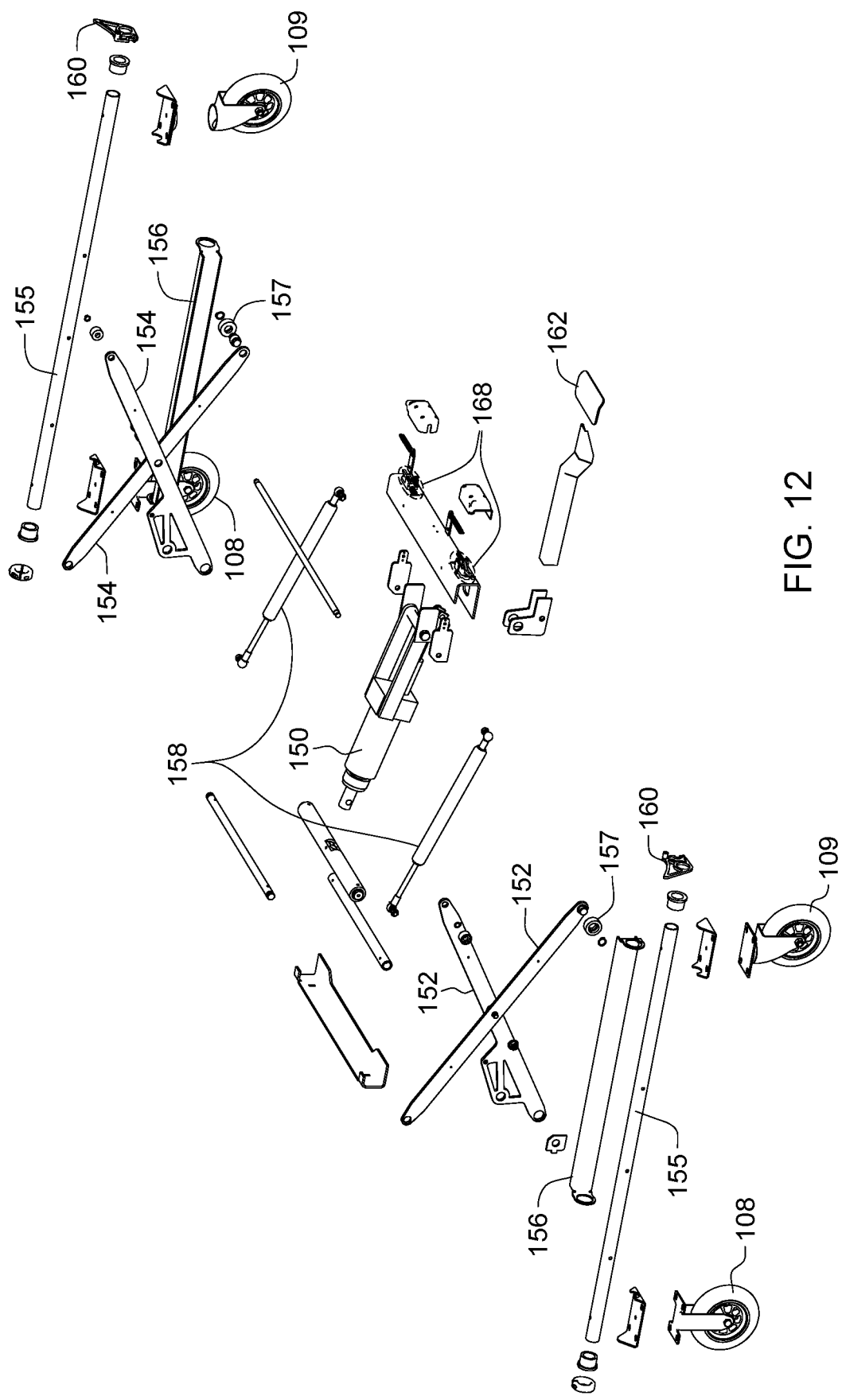
FIG. 12 is an exploded view of the parts making up the undercarriage assembly of the cart 100.

FIG. 11 is a perspective view of the undercarriage assembly 107 of the cart 100 without the top deck assembly 106 shown. FIG. 12 is an exploded view of the parts making up the undercarriage assembly 107. The undercarriage assembly 107 includes mechanisms to achieve extension (or lift) and retraction (or lowering) of the top deck assembly 106. Hydraulic cylinder pump 150 operates a pair of lift scissors 152, 154 for retraction and extension to allow the top deck assembly 106 to change its height. The scissors are made up of a first scissor arm pair 152 and second scissor arm pair 154. Alternative embodiments could use double/multi scissor arm pairs. FIG. 11 shows the cart 100 with the first scissor arm pair 152 and second scissor arm pair in full extension which would correspond to the top deck assembly 106 being at its highest height. As the top deck assembly 106 descends and mount secure coupling 140 mounts onto secure receiver 500 through mechanisms discussed below, a pair of axles capable of stowing the wheels 108, 109 (i.e., "stow axles") 155 rotate to allow the wheels 108, 109 to be lifted up and turned inward until they are fully retracted (or hidden) during the process when the cart 100 is being attached to the vehicle. A pair of subframe tracks 156 arranged substantially in parallel to allow small scissor arm pair wheels 157 connected to each of the first scissor arm pair 152 and second scissor arm pair 154 to move in a substantially horizontal direction as the scissor arm pairs 152, 154 and top deck assembly 106 move through different heights during extension and retraction. A pair of return springs 158 are configured to pull the scissor arm pairs 152, 154 back into a retraction position from the extension position upon mounting of the cart 100 onto the secure receiver 500. The return springs 158 can be simple coil, gas springs or another type of tension spring configuration, including internal within the hydraulic cylinder itself. A pair of axle rotation cams 160 are connected to and rotate with the stow axles 155 to assist with the wheels 108, 109 folding inward towards the top deck assembly 106. Hydraulic pump foot pedal 162 when activated by the operator puts more pressure into the hydraulic pump cylinder 150 to allow for control of the height of the top deck assembly 106. In particular, during attachment and detachment of the cart 100 to and from the vehicle through the use of the operator's foot in a pumping action the operator can extend the scissor arm pairs 152, 154 and elevate the cart 100. As the operator approaches the back of the vehicle with the cart 100, the operator will provide force to pump the pedal 162 and raise the cart 100 so that the mount secure coupling 140 is located over the secure receiver 500 attached to the vehicle. The operator will then align the mount secure coupling 140 above the secure receiver 500 and over the upper tine retention slots 508. This allows for attachment of the mount secure coupling 140 with the secure receiver 500 as described in more detail below. Correspondingly, the operator will pump the pedal 162 when the cart 100 is attached to the vehicle to extend the scissor arm pairs 152,154 and raise the top deck assembly 106 high enough to allow for detachment of the mount secure coupling 140 from the secure receiver 500 which also be described below in detail.

Figure 13:
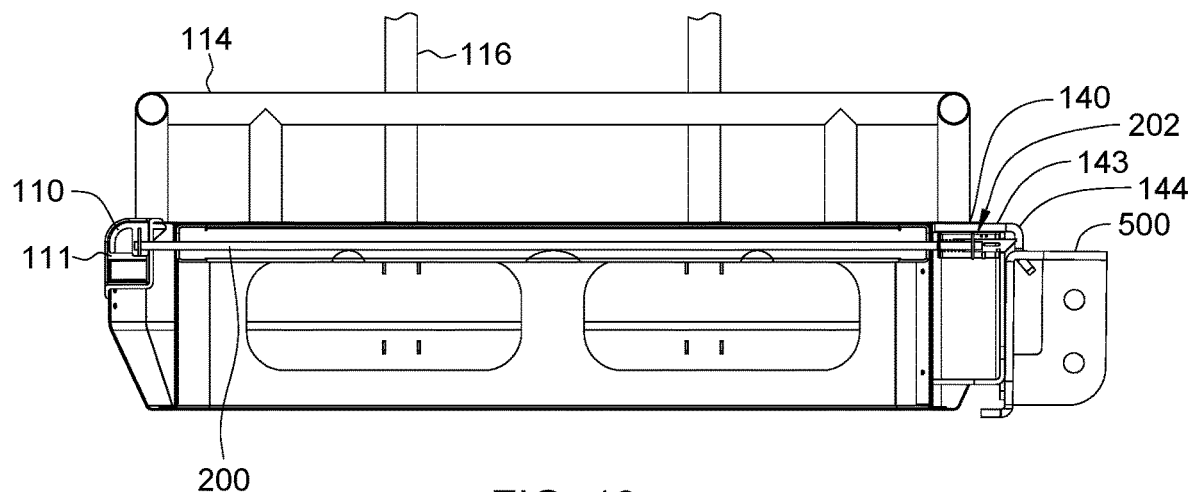
FIG. 13 is a cross-sectional view of the top deck assembly 106 of the cart 100 showing how the secure coupling lock lever assembly 110 is coupled through a secure coupling lock connecting rod which runs the width of the cart 100 from the operator side 102 to the vehicle side 104 to control operation of a secure coupling lock assembly 202.
Figure 14:
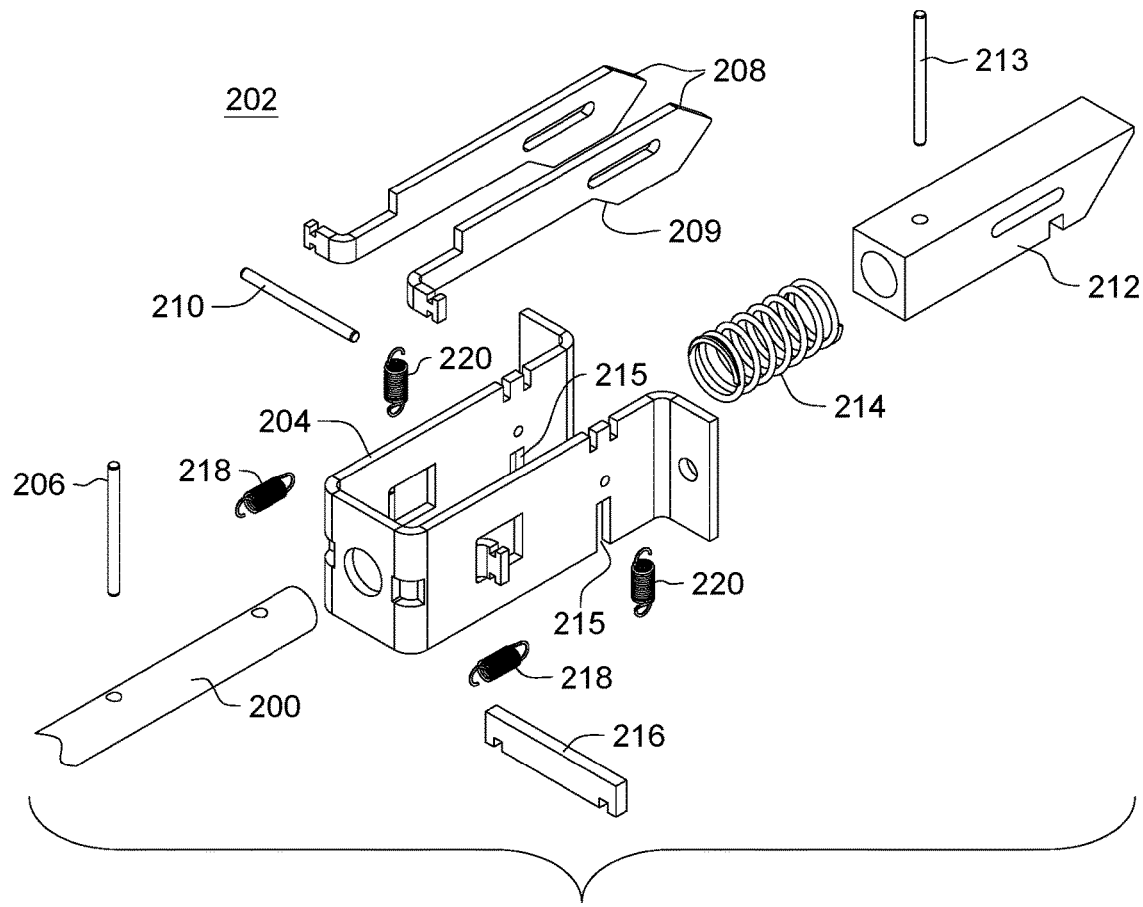
FIG. 14 is a perspective detailed exploded view of the components of a secure coupling lock assembly 202.

FIG. 13 is a cross-sectional view of the top deck assembly 106 of the cart 100 showing how the secure coupling lock lever assembly 110 is coupled through a secure coupling lock connecting rod 200 which runs the width of the cart 100 from the operator side 102 to the vehicle side 104 to control operation of a secure coupling lock assembly 202. The secure coupling lock assembly 202 is positioned as substantially centrally located on the long side of the mount secure coupling 140. FIG. 14 is a perspective detailed exploded view of the components of the secure coupling lock assembly 202. During operation, the secure coupling lock connecting rod 200 slides in and out of a secure coupling lock bracket 204 as far as permitted by secure coupling lock connecting rod stop pin 206. As a conscious failsafe measure the operator will need to manually pull the secure coupling lock release lever 111 out to retract the passive latch bolt 212 from the secure receiver 500. The passive latch bolt 212 is held back by the secure coupling locking catch (or sear) 216 to allow the cart 100 to be lifted off the secure receiver 500. Further components which make up the secure coupling lock assembly 202 and the functions of which will be described further below include the following: secure coupling lock release 208; secure coupling lock release guide pin 210; secure coupling lock latch bolt 212; secure coupling lock latch bolt pin 213; secure coupling lock latch bolt spring 214; secure coupling locking catch slot 215; secure coupling locking catch 216; secure coupling release springs 218; and secure coupling catch springs 220.

FIG. 15 is a perspective of a vehicle mounted (or trailer mounted) hitch receiver 400 shown attached to a hitch receiver mounting arm & bracket 402 configured to connect to a vehicle 404. FIG. 16 is a perspective view of the secure receiver 500 by itself and FIG. 17 is a perspective view of a load bar adjustable extender 406. These elements 500, 406 in combination are shown in FIG. 18 ready for attachment to the vehicle mounted hitch receiver 400. The load bar adjustable extender 406 can be used in an up or down orientation to adjust for varying centerline heights of the vehicle mounted hitch receiver 400. In FIG. 17, the load bar adjustable extender 406 is shown in a down position. FIG. 18 illustrates the secure receiver 500 mounted on the load bar adjustable extender 406 (which is in an up position). In an alternative embodiment, the secure receiver 500 and load bar adjustable extender 406 could be one integrated piece. The secure receiver 500 is shown attached to the load bar adjustable extender 406, vehicle mounted hitch receiver 400 and a vehicle 404 in FIG. 19. In addition to acting as an attachment mechanism for the mount secure coupling 140 of cart 100, the secure receiver 500 may act as a foot step when configured in a step shape. This secure receiver as a step configuration would be able to support the operator's weight and enable the operator to reach into the cargo area of the vehicle, the bed of a pickup, and/or the roof of the vehicle 404.

The secure receiver 500 is a device to substantially align, safe-secure couple and lock a cart 100 to the hitch receiver 400 using mount secure coupling 140. As the cart 100 is mounted on the secure receiver 500 this mounting process will also allow for inward turning and clearance of the retracted wheels 108, 109 of the cart 100 from the ground. Referring to both FIG. 10 with regard to the mount secure coupling 140 and FIG. 16 secure receiver 500, has a lower flange 502 containing lower tine retention slots 504. These slots 504 receive corresponding mount secure coupling lower tines 145 of mount secure coupling 140 when the mount secure coupling 140 mates with the secure receiver 500. During coupling of the cart 100 to the vehicle, the secure coupling lock latch bolt 212 slides along the face of the secure receiver 500 and inserts itself into secure coupling lock opening 506. Upper tine retention slots 508 of secure receiver 500 receive corresponding top tines 144 of the mount secure coupling 140 upon coupling. Collectively, inserting the mount secure coupling top tines 144, mount secure coupling lower tines 145 and the secure coupling lock latch bolt 212 into their respective openings in the secure receiver 500 constrain, secure and safely lock the cart 100 to the vehicle 404 to withstand substantially all dynamic and static forces the cart 100 will encounter (i.e., shear, torsion, and rotational/torque forces) while stationary or moving across mostly any surface.

Figure 20A:
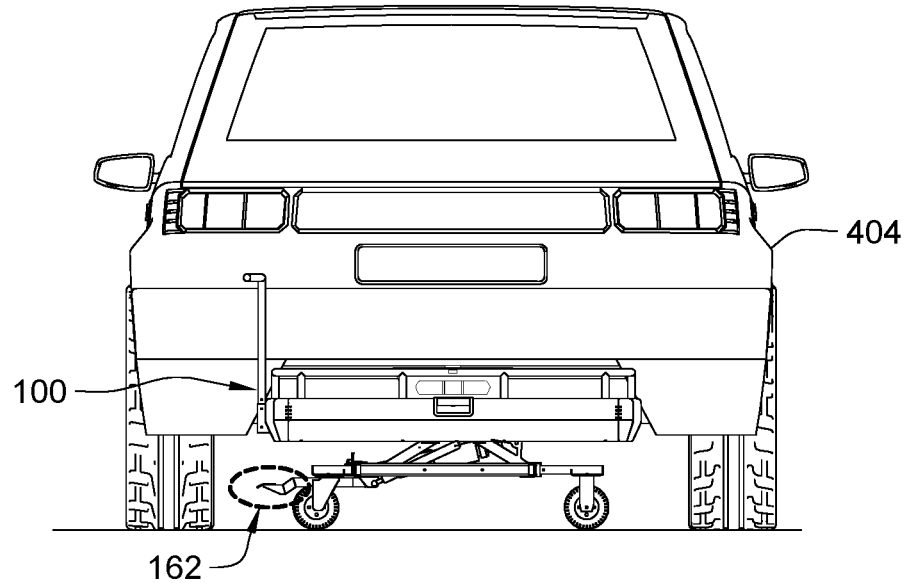
FIGS. 20A-20C illustrate a side view and FIGS. 21A-21B illustrate a top view of the initial steps of coupling the cart 100 onto a vehicle 404 and turning the cart 100 into an attached carrier.
Figure 20B:
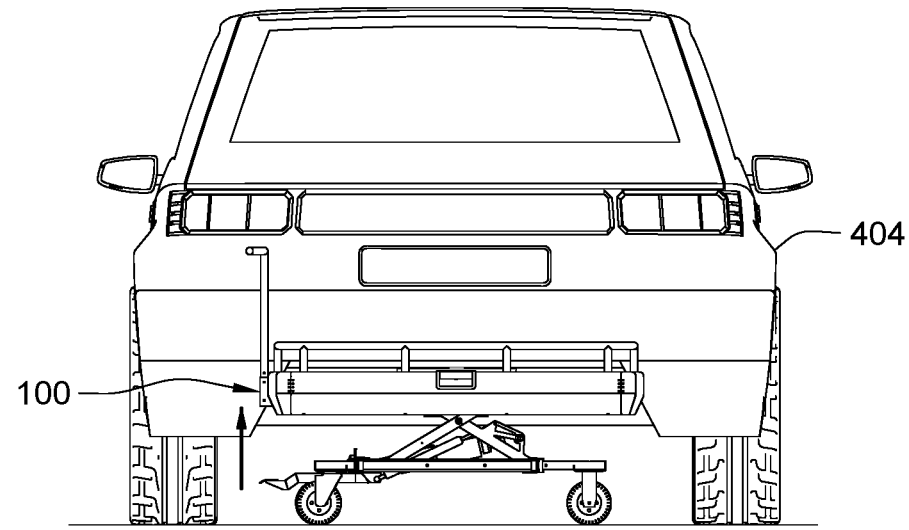
Figure 20C:
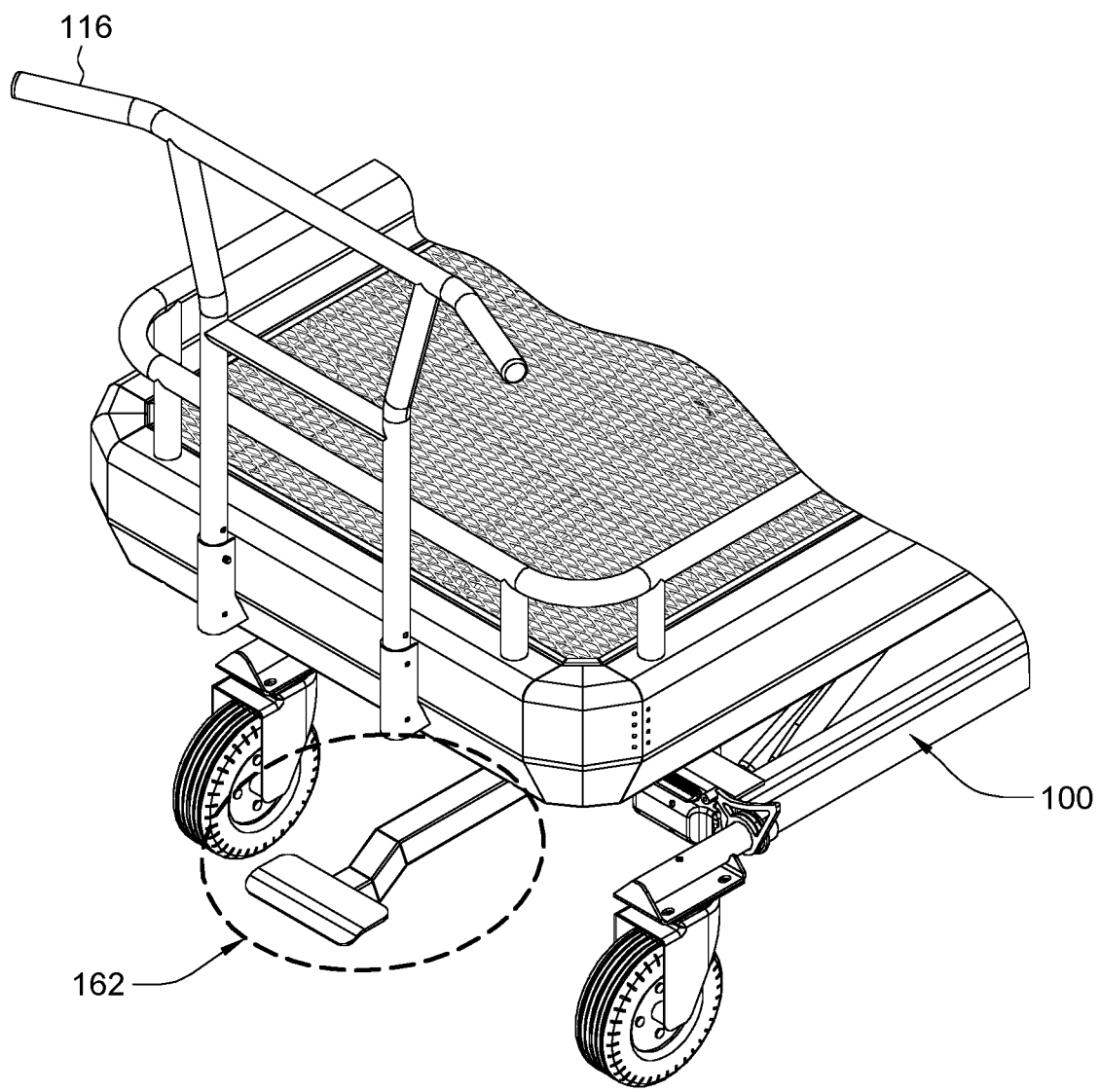
Figure 21A:
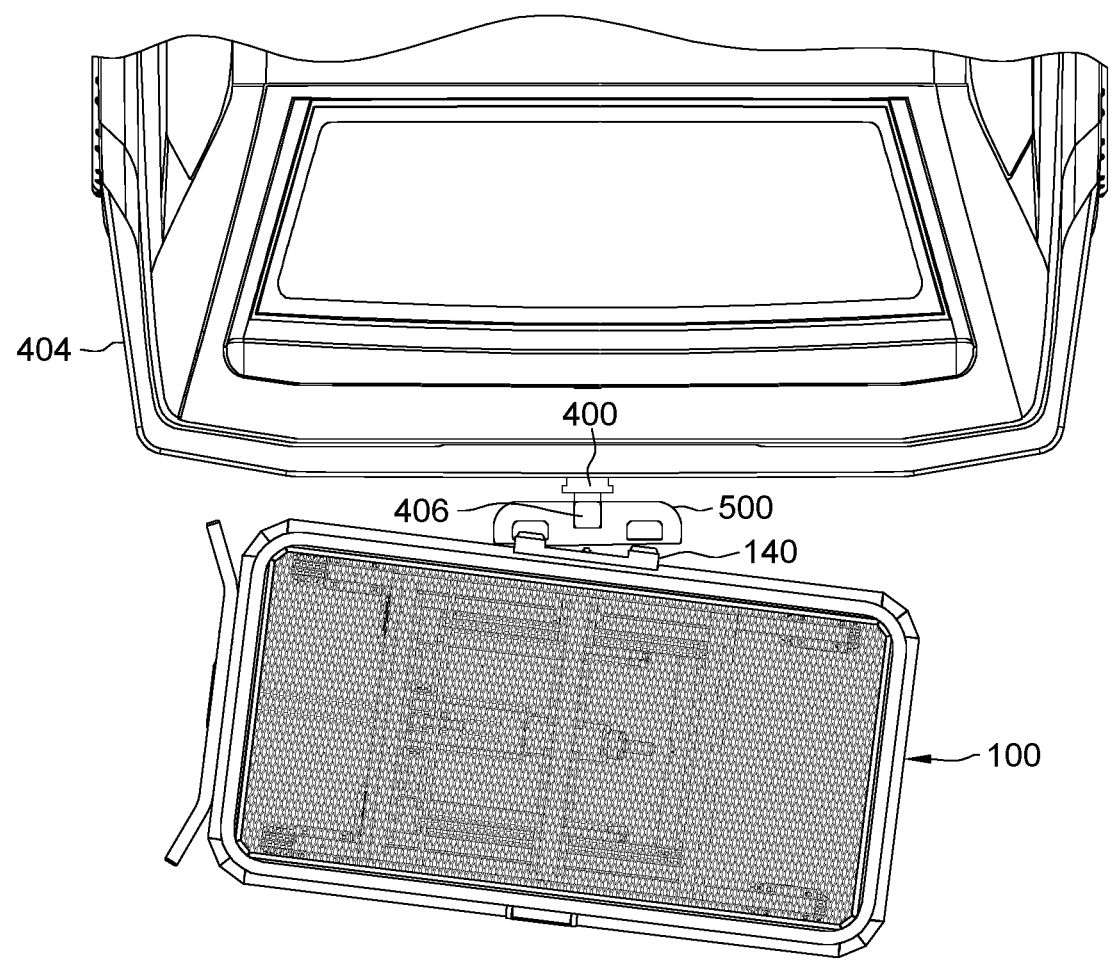
Figure 21B:
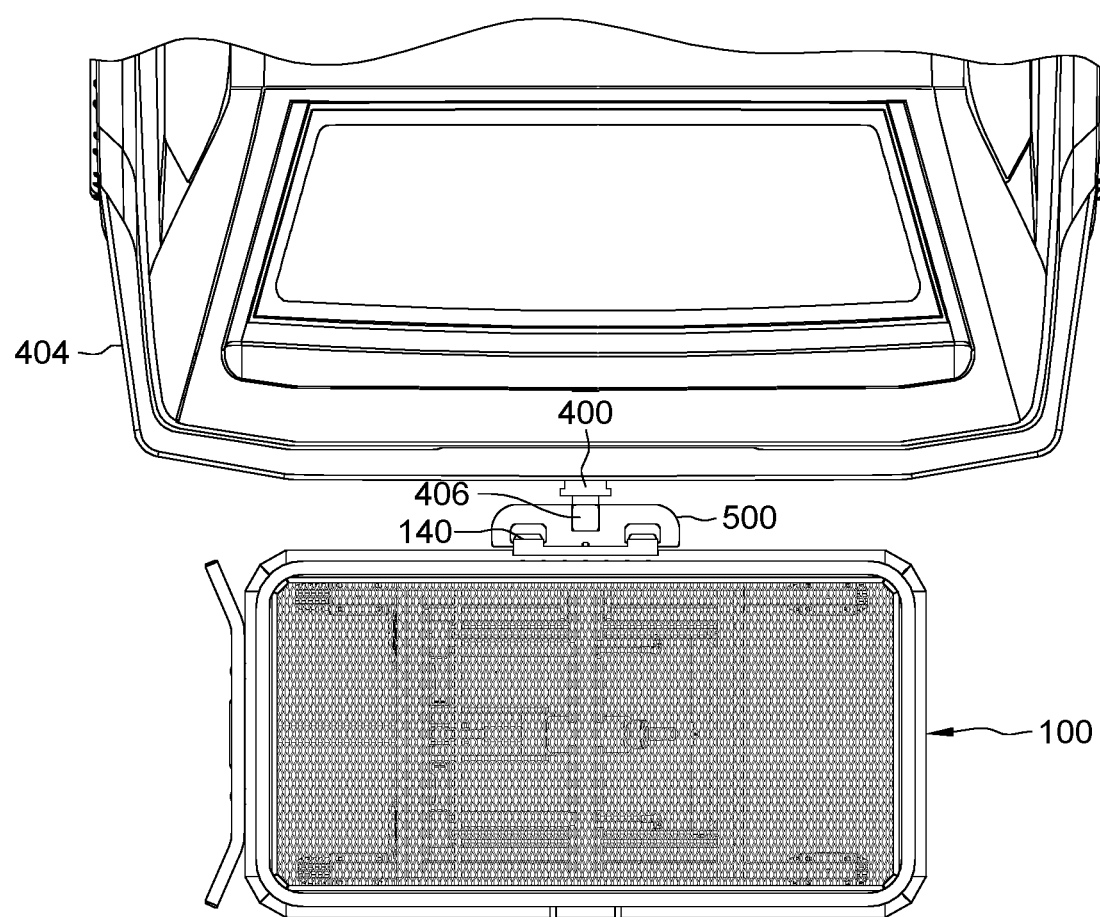

FIGS. 20A-20C illustrate a side view and FIGS. 21A-21B illustrate a top view of the initial steps of coupling the cart 100 onto a vehicle 404 and turning the cart 100 into an attached carrier. The cart 100 is rolled up to the vehicle 404 and the operator will then elevate the cart 100 (see arrow 163 in FIG. 20B) by pumping the hydraulic pump foot pedal 162 connected to hydraulic cylinder pump 150 until the mount secure coupling 140 is raised to a height over the secure receiver 500. The operator then visually substantially aligns the mount secure coupling 140 and the mount secure coupling top tines 144 otherwise known as hooks or collectively as the yoke of the cart 100 with the upper tine retention slots 508 of the secure receiver 500 of the vehicle 404 as shown in FIGS. 21A-21B.

Figure 22A:
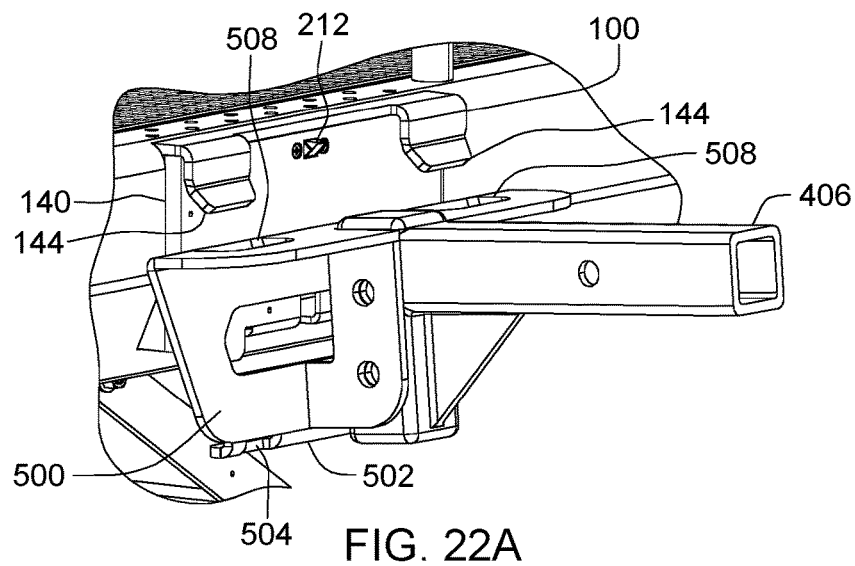
FIGS. 22A-22C show a detailed perspective view of the mount secure coupling 140 mounting onto the secure receiver 500.
Figure 22B:
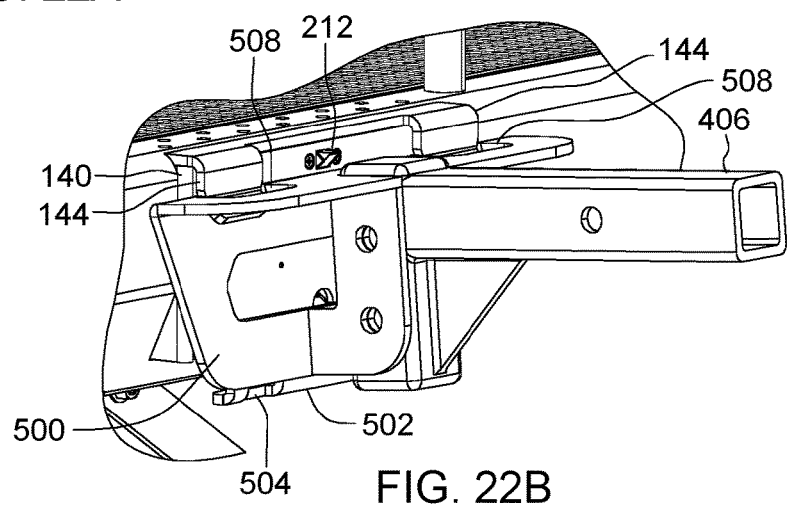
Figure 22C:
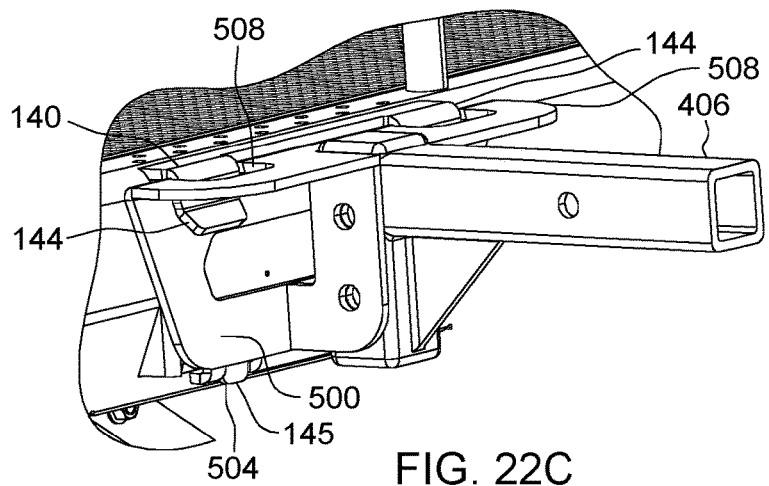

FIG. 22A shows a detailed side perspective view of a cutaway section of the cart 100 with the mount secure coupling 140 located above and substantially aligned with secure receiver 500. Upon activation of the hydraulic pump release lever 118 on handle 116 to lower the top deck assembly 106 (and subsequently raise the undercarriage assembly 107 which will be discussed in detail below), the mount secure coupling top tines 144 descend into the upper tine retention slots 508 as shown in FIG. 22B. As a result, the inner radius of the top tines 144 come to rest on a radiused edge of the secure receiver 500. Simultaneously, the mount secure coupling lower tines 145 slide into the lower tine retention slots 504 of the lower flange 502 of the secure receiver 500 as shown in FIG. 22C. The top tines 144 along with the contact surfaces of the secure receiver 500 and mount secure coupling 140 support the payload weight of the cart 100 and its load 120. The lower tines 145 prevent the mount secure coupling 140 from hopping or bouncing out of the secure receiver 500, in particular, in a rotational or counter rotational direction. Additionally, on descent, the secure coupling lock latch bolt 212 of the secure coupling lock assembly 202 of cart 100 (see FIG. 14, 22A) is pressured (or projected) out by secure coupling lock latch bolt spring 214 to slide along the face of secure receiver 500 and into place inside the secure coupling lock opening 506 on the secure receiver 500 to secure the cart 100 from coming out of the secure receiver 500 in a substantially vertical shear direction. This allows for secure coupling locking and containment of the cart 100 on the secure receiver 500 against approximately all dynamic force directions. The structural integrity of the top deck assembly 106 and secure receiver are capable of self-supporting entirety of cart 100 and payload 120 weight.

Figure 23A:
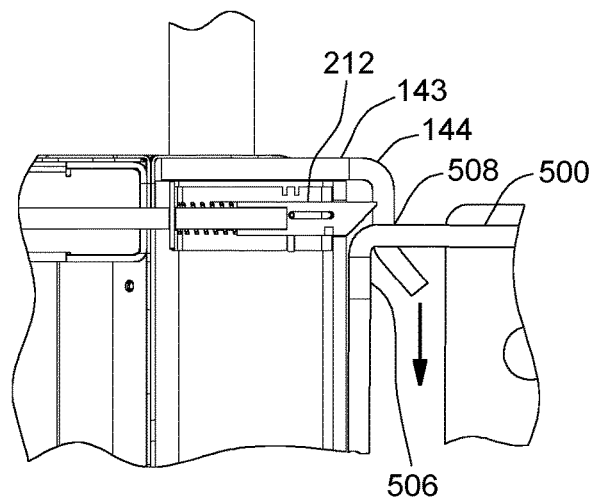
FIGS. 23A-23D show a side view of the mount secure coupling 140 mounting onto the secure receiver 500 emphasizing the secure coupling lock assembly 202 locking sequence in detail.
Figure 23B:
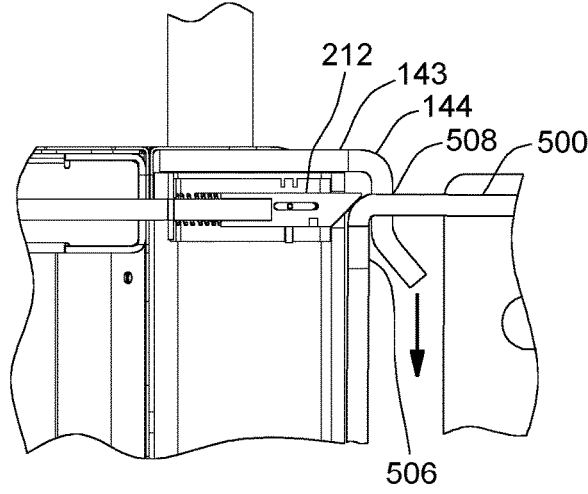
Figure 23C:
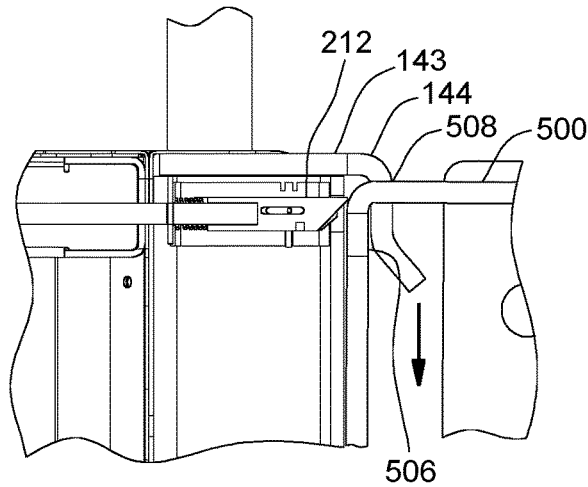
Figure 23D:
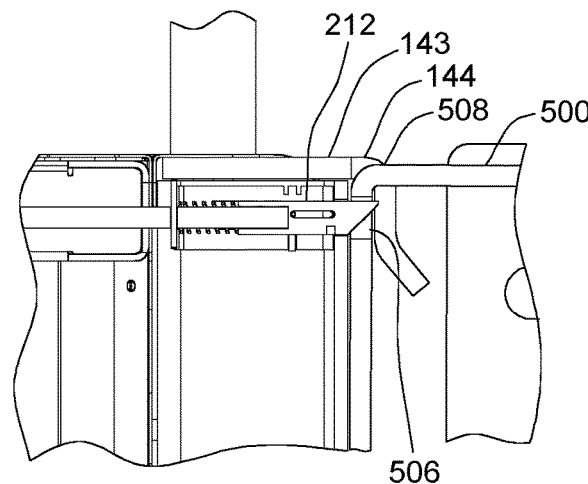

FIGS. 23A-23D show the secure coupling locking system between the mount secure coupling 140 and the secure receiver 500 in a locking sequence in detail. In FIG. 23A, secure coupling lock latch bolt 212 is in the unlocked latch bolt position in reset and ready to auto lock upon next descent of the top deck assembly 106 with mount secure coupling 140. In FIG. 23B, the cart 100 is shown descending with mount secure coupling top tines 144 lowering into the upper tine retention slots 508 on top of secure receiver 500. In FIG. 23C, secure coupling lock latch bolt 212 rides along the face of secure receiver 500 and pressurized by pushing back on secure coupling lock latch bolt spring 213 (e.g., a compression spring) until reaching secure coupling lock opening 506 in the secure receiver 500 where it inserts itself as shown in FIG. 23D. In FIG. 23D, the secure coupling lock is fully "locked" with secure coupling lock latch bolt 212 inside secure coupling lock opening 506. Cart 100 is now securely mounted and locked to secure receiver 500.

Figure 24A:
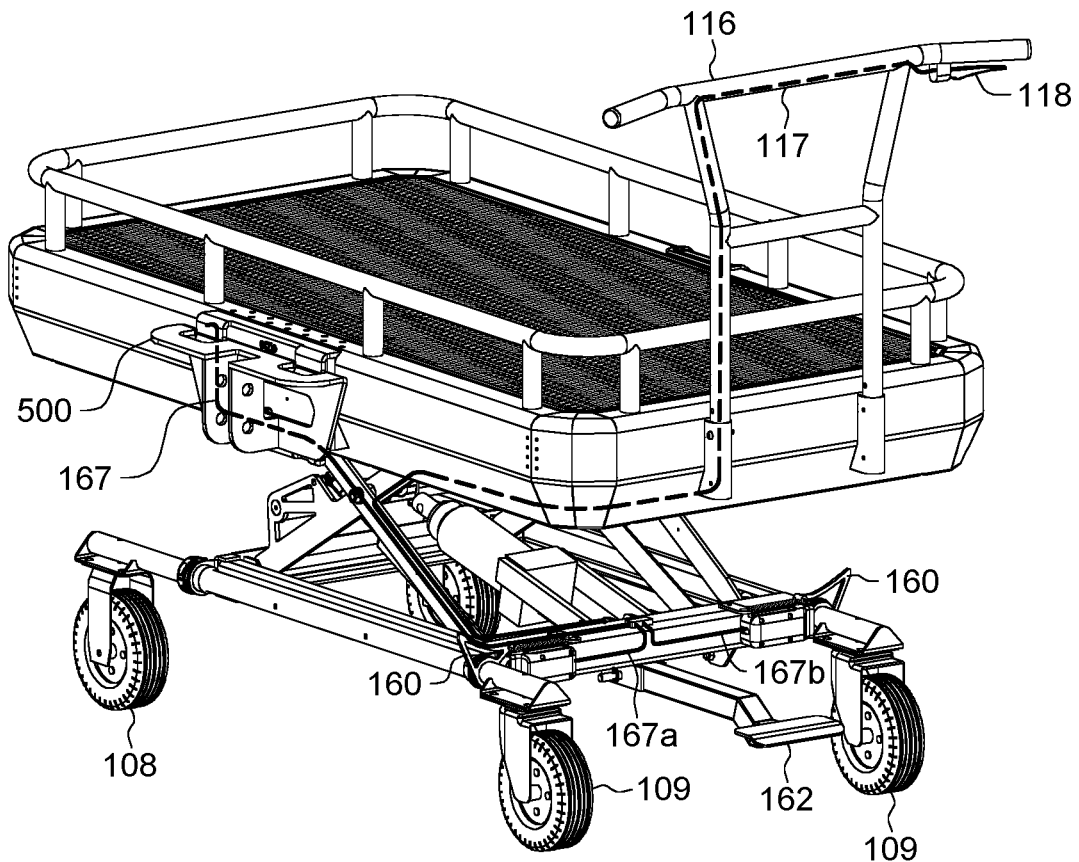
FIGS. 24A-24C show the elements of the cart 100 involved in the undercarriage assembly 107 retraction, stow axles 155 rotation and wheel 108, 109 folding and stowing.
Figure 24B:
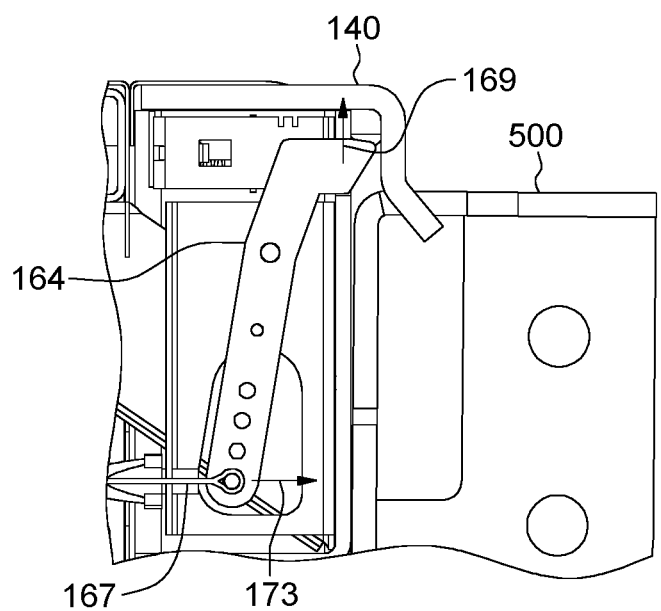
Figure 24C:
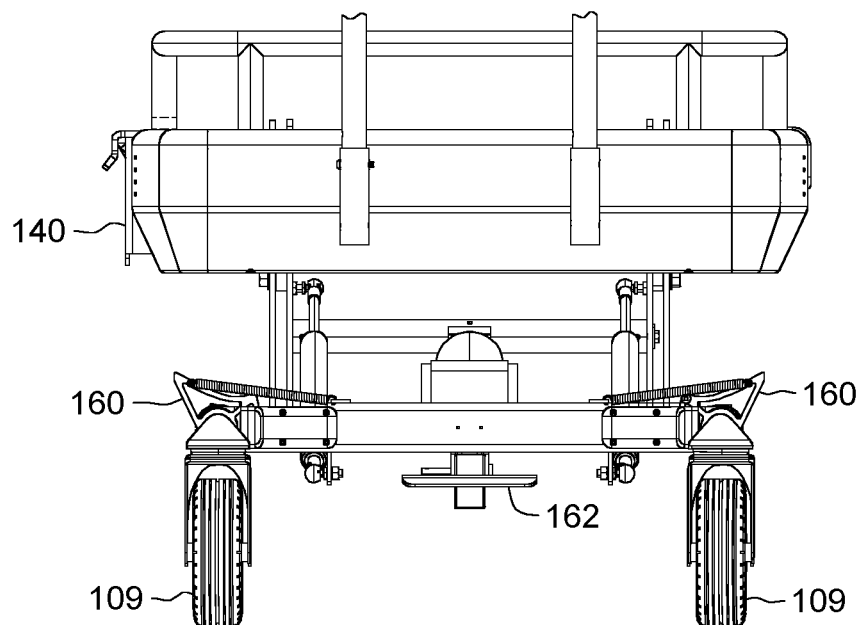

FIGS. 24A-24C show the elements of the cart 100 involved in the retraction of the undercarriage assembly 107, rotation of stow axles 155 and folding and stowing of wheels 108, 109. As shown in FIGS. 24A and 24B, as the cart 100 descends on the secure receiver 500, an axle lock trigger 164 which is housed behind mount secure coupling 140 and underneath top tines 144 is pushed back and rotated about the shoulder bolt that holds it within its bracket and also acts as an axis pivot (as shown by arrow 169 in FIG. 24B). This rotation action of the axle lock trigger 164 pulls the axle lock trigger cable 167 back (as shown by arrow 173 in FIG. 24B). The axle lock trigger 167 is connected to both axle locking mechanisms 168 through axle lock 1-into-2 cable splitter 165 (see FIG. 32) which retracts the duality of axle locking mechanism's axle lock release block 166 (see FIG. 26F) and allows the stow axles 155 to rotate in their respective axle bearing mounts 172. FIG. 24C shows the axle rotation cams 160 operation of which will be discussed below.

Figure 25A:
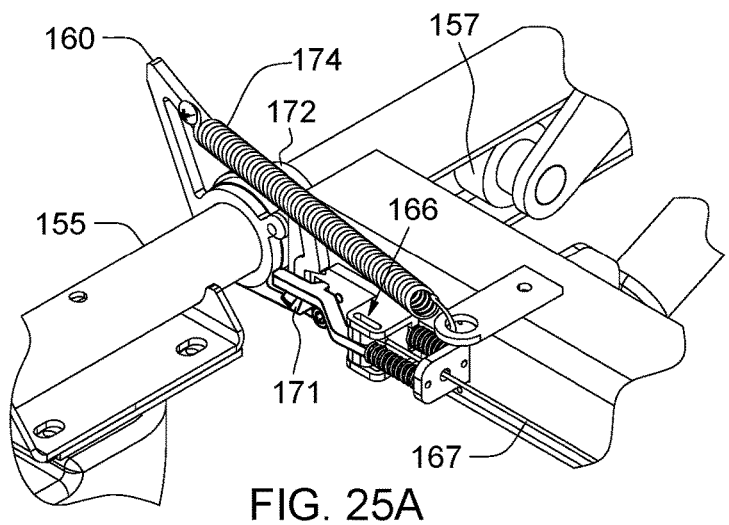
FIGS. 25A-25E show the elements of the undercarriage assembly involved in the stow axle 155 locking mechanism, rotation and wheel 108, 109 folding and stowing.
Figure 25B:
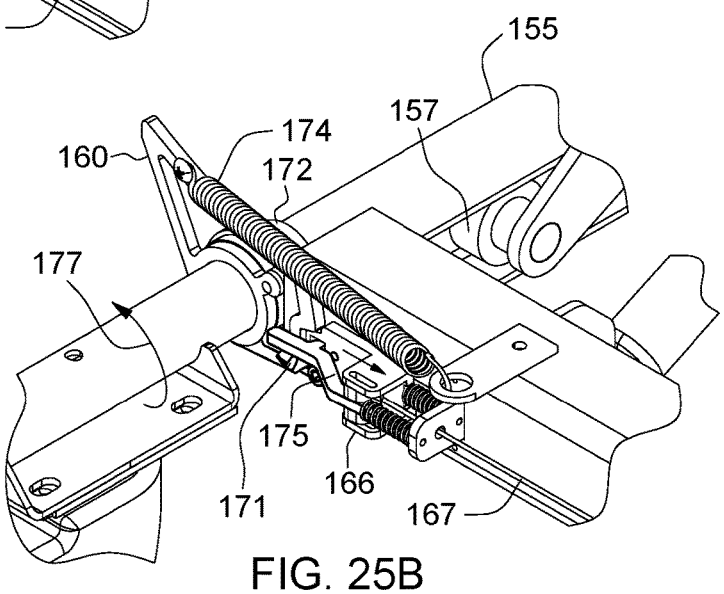
Figure 25C:
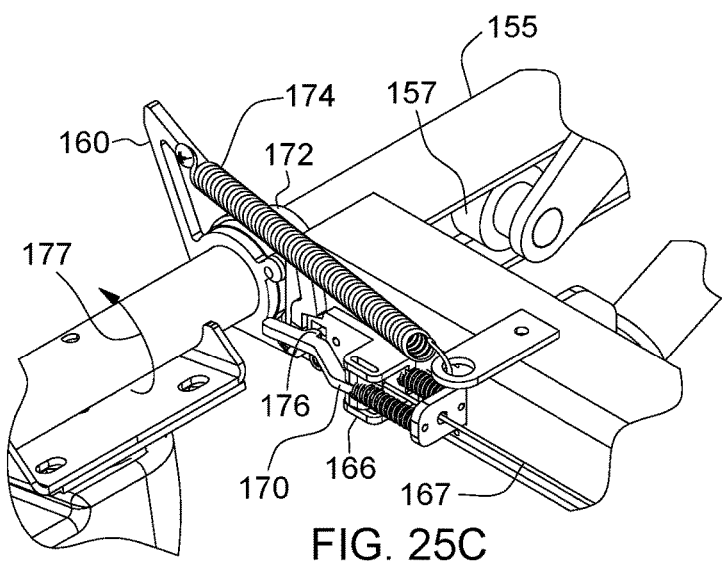
Figure 25D:
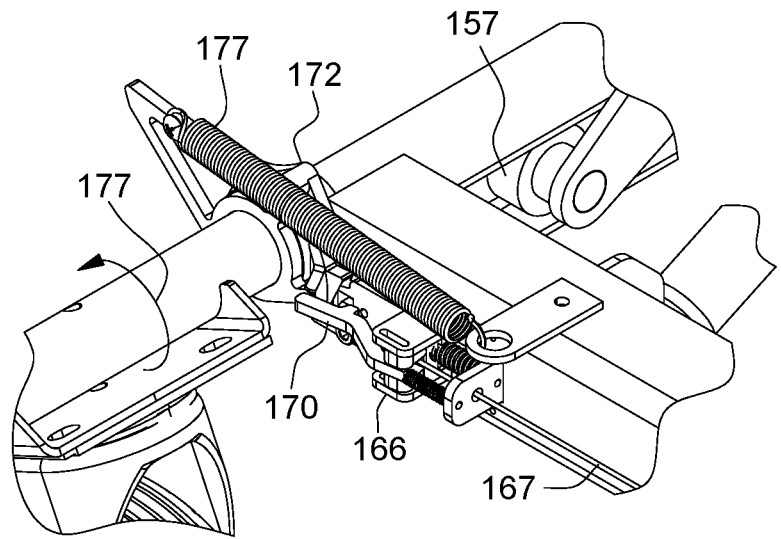
Figure 25E:
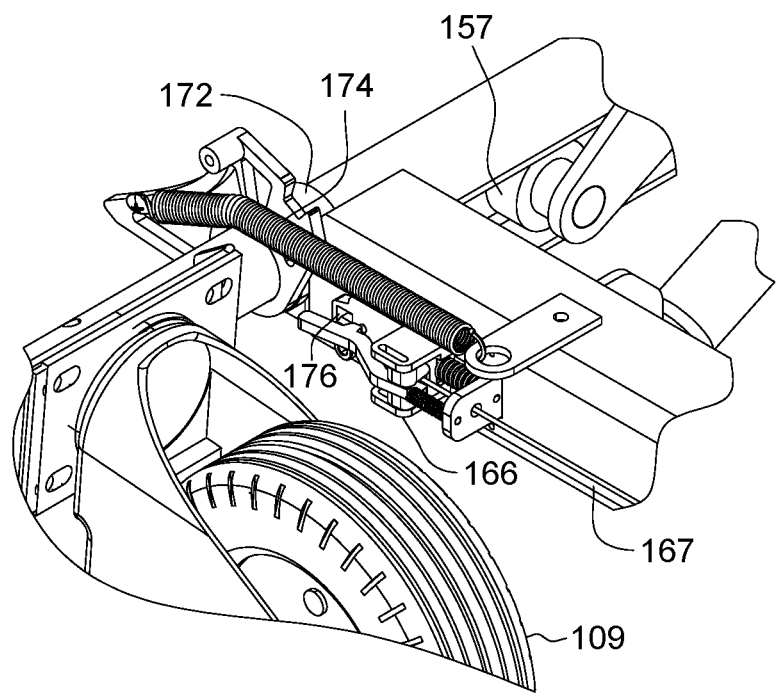

FIGS. 25A-25E show operation of the elements of the undercarriage assembly 107 involved in the rotation of the stow axles 155 and the folding inward and stowing of wheels 108, 109. In FIG. 25A, the axle lock trigger cable 167 attached to the axle lock trigger 164 pulls axle release block 166 (see FIG. 26F) back against a compression spring 174 as shown in FIG. 25B (see arrow 175) which frees the axle rotation cam 160 to rotate (see arrow 177) as return springs 158 retract and axle rotation cams 160 contact top deck assembly 106. An axle lock secondary cam 171 (FIG. 25A) on the axle rotation cam 160 deflects the axle locking mechanism latch 170 out of the axle locking latch slot 176 in the axle lock release block 166 (FIG. 25B, 26F) as axle rotation cam 160 rotates as shown in FIG. 25C. In FIG. 25D, stow axles 155 are rotating the wheels 108, 109 inward and the axle locking mechanism latch 170 will come to rest on the top surface of axle lock release block 166 as shown in FIG. 25D where it will remain ready for re-latching when the wheels are re-deployed. In FIG. 25E, stow axles 155 are shown fully rotated and wheels 108, 109 are folded in a stowed position where they are held in place by the retracted force of the return springs 158 and effectively positioning the axle locking mechanism 168 for redeploying the wheels.

Figure 26A:
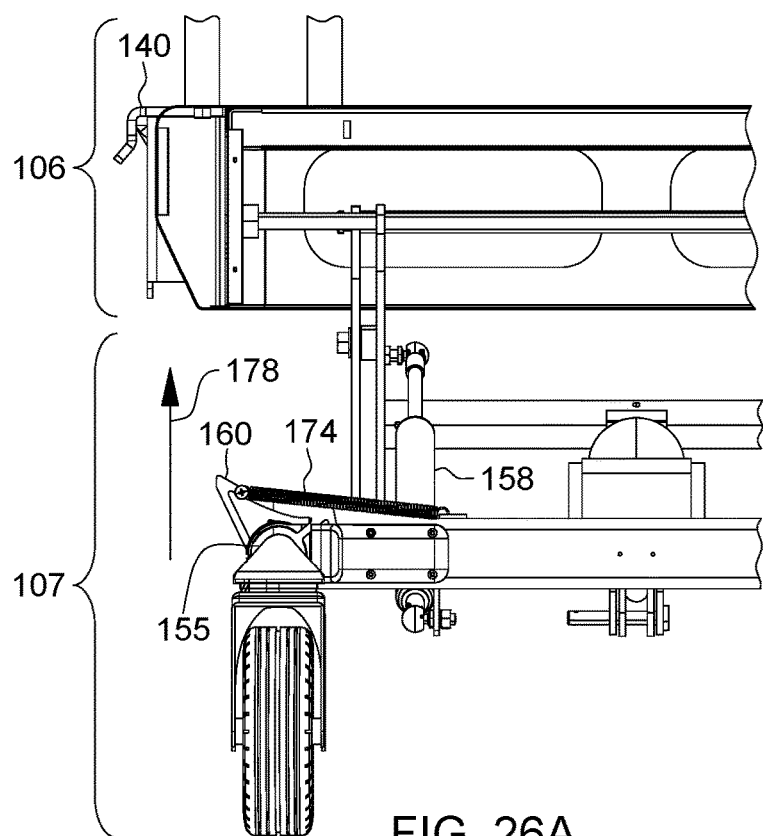
FIGS. 26A-26F show the elements of the cart 100 involved in the stow axle 155 rotation and wheel 108, 109 folding and stowage with an emphasis on axle rotation and wheel stowage.
Figure 26B:
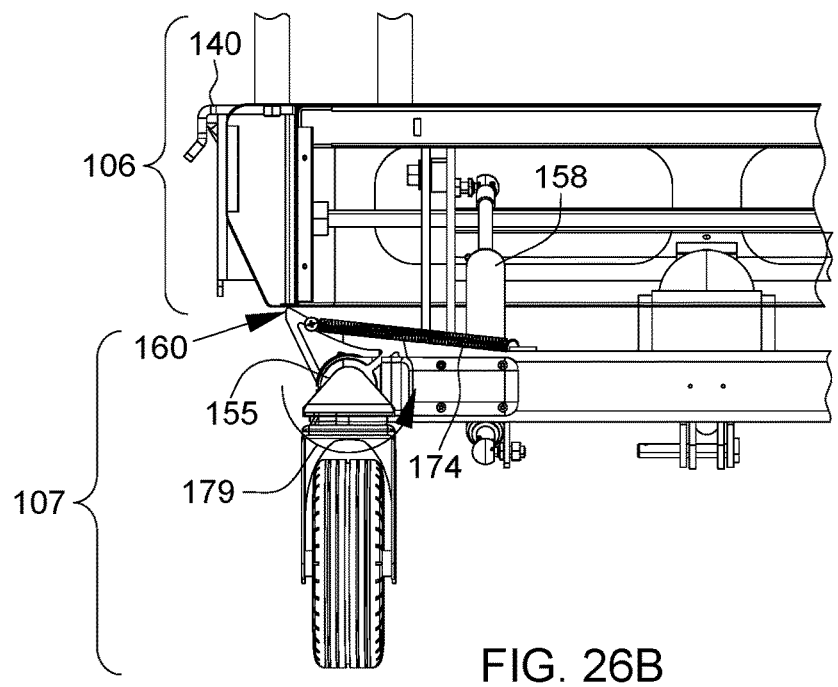
Figure 26C:
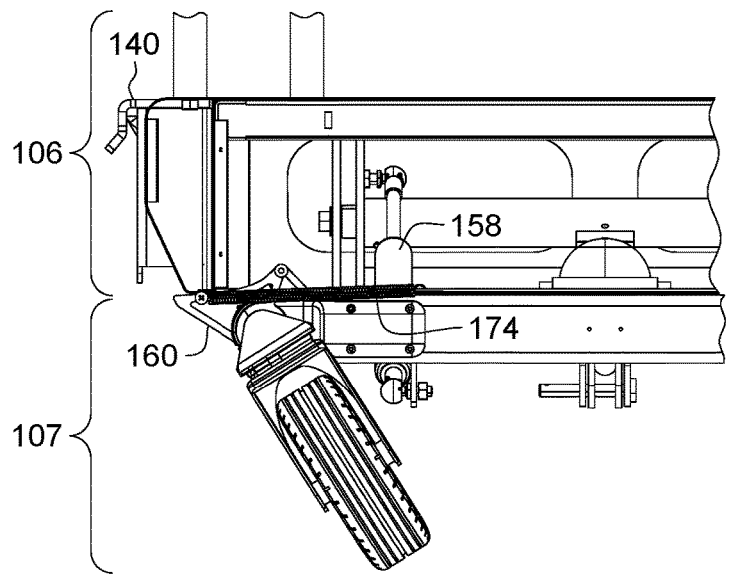
Figure 26D:
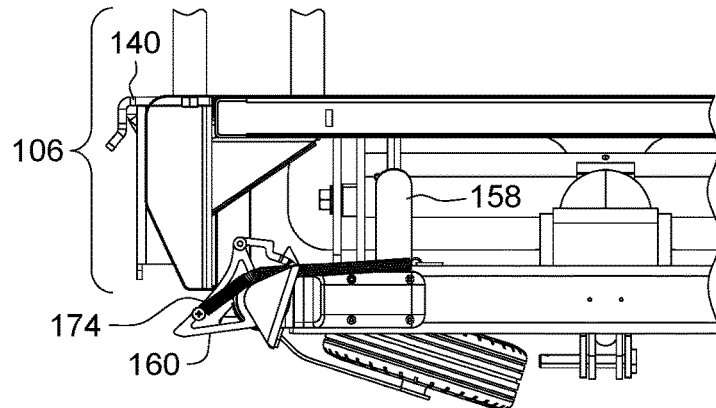
Figure 26E:
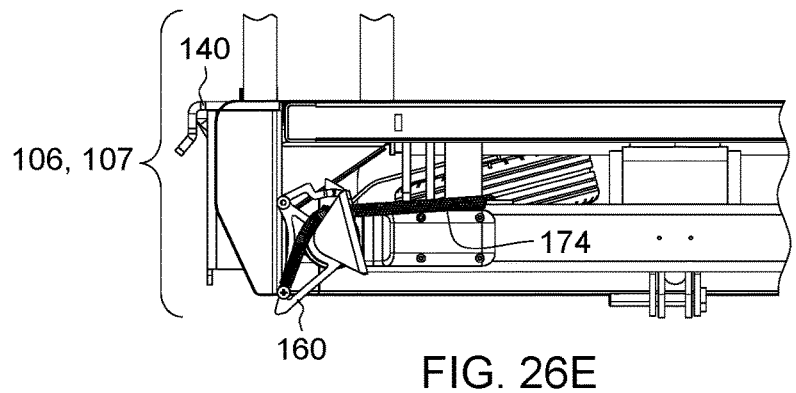
Figure 26F:
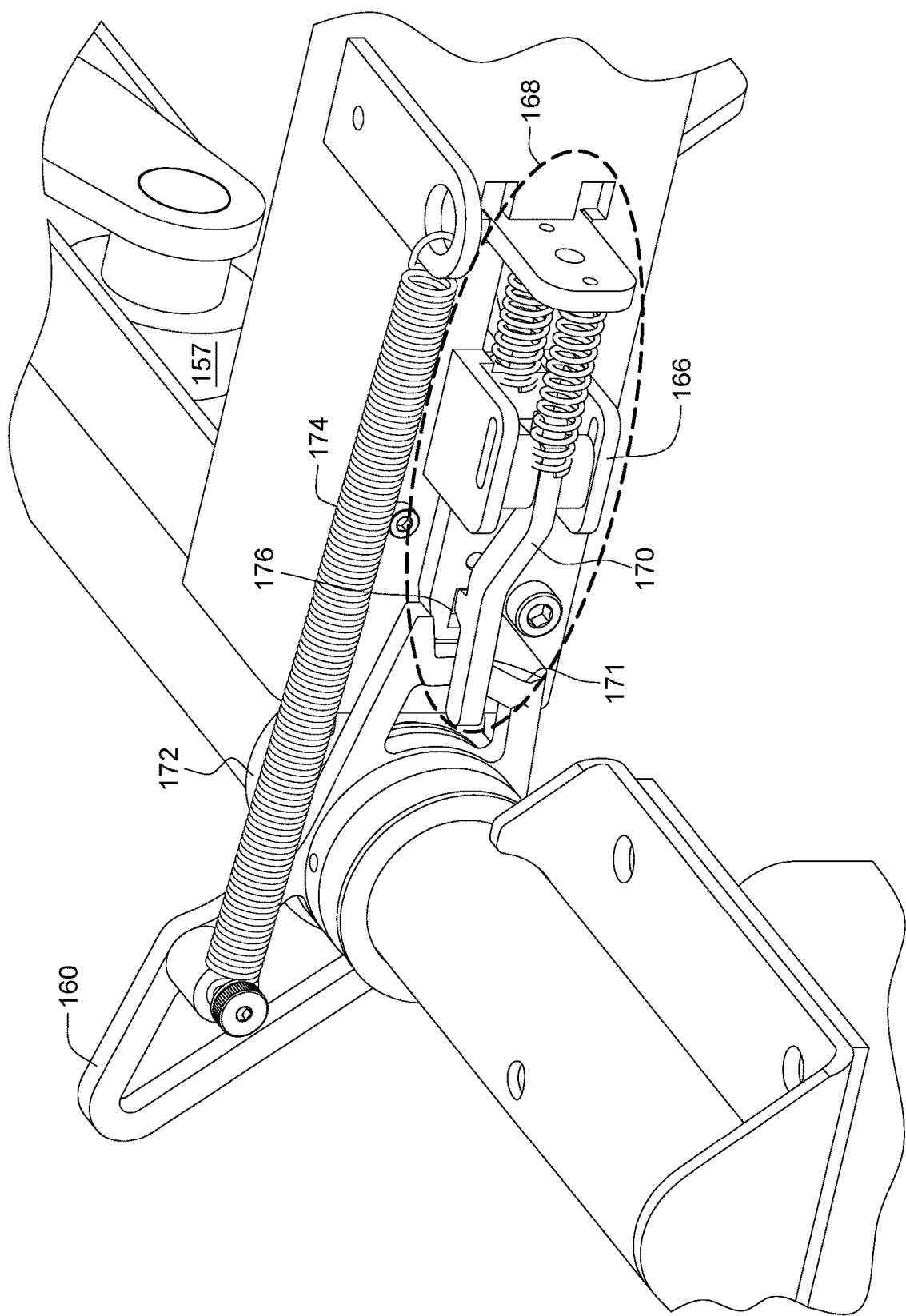

FIGS. 26A-26F show further elements of the cart 100 involved in rotation of the stow axles 155 and wheels 108, 109 folding and stowage with an emphasis on the wheels stowage. In FIG. 25 and in FIG. 26A-C, wheel element 109 is shown in the foreground immediately adjacent to the axle locking mechanism 168 to represent how the axle locking mechanism "unlocks" and the axles freely rotate within the axle bearing mounts 172 to stow the wheels inward and upward under top deck assembly 106. In FIGS. 26D and 26E the operator side wheels 109 are not shown but the front wheel pair 108 are shown indicating their dependency on the same activation and their rotation inward and upward. In FIG. 26A, when the top tines 144 of the mount secure coupling 140 seat into the upper tine retention slots 508 of the secure receiver 500 and are constrained from descending further, the undercarriage assembly 107 retracts (or lifts as shown by arrow 178) by force of return springs 158. In FIG. 26B, axle rotating cam 160 is also brought into contact with the underside of top deck assembly 106 by the force of return springs 158. It is dependent on the axle lock trigger 164 pulling axle lock trip cable 167 to release axle lock release block 166 (see FIGS. 25A-25E) freeing stow axle 155 to rotate inside axle bearing mounts 172 (as shown by arrow 179). Wheels 108, 109 fold up as shown in FIGS. 26C-26E as a dependent action to the undercarriage assembly 107 being retracted (i.e., ascending) by the tension/pull force of the return springs 158. As the undercarriage assembly 107 ascends the axle rotation cam 160 stays in contact with top deck assembly 106 (as shown in FIGS. 26C-26E) which rotates the axle 155 inside the axle bearing mounts 172 and folds the wheels 108, 109 up and inward. FIG. 26B-26F all depict various stages of this stowing process from the axle rotation cam 160 contacting the underside of top deck assembly 106 and creating rotation of the stow axles 155 as contact continues along the top radius of axle rotation cams 160. As the undercarriage assembly 107 continues to be retracted upward, the stow axle 155 travels through 90 degrees approximate to the horizontal and comes to rest as shown in FIG. 26E. This wheel stowage operation is occurring simultaneously on both stow axles 155 and all four wheels 108, 109 although it is only shown depicted on one wheel in FIGS. 26A-26F.

Figure 27A:
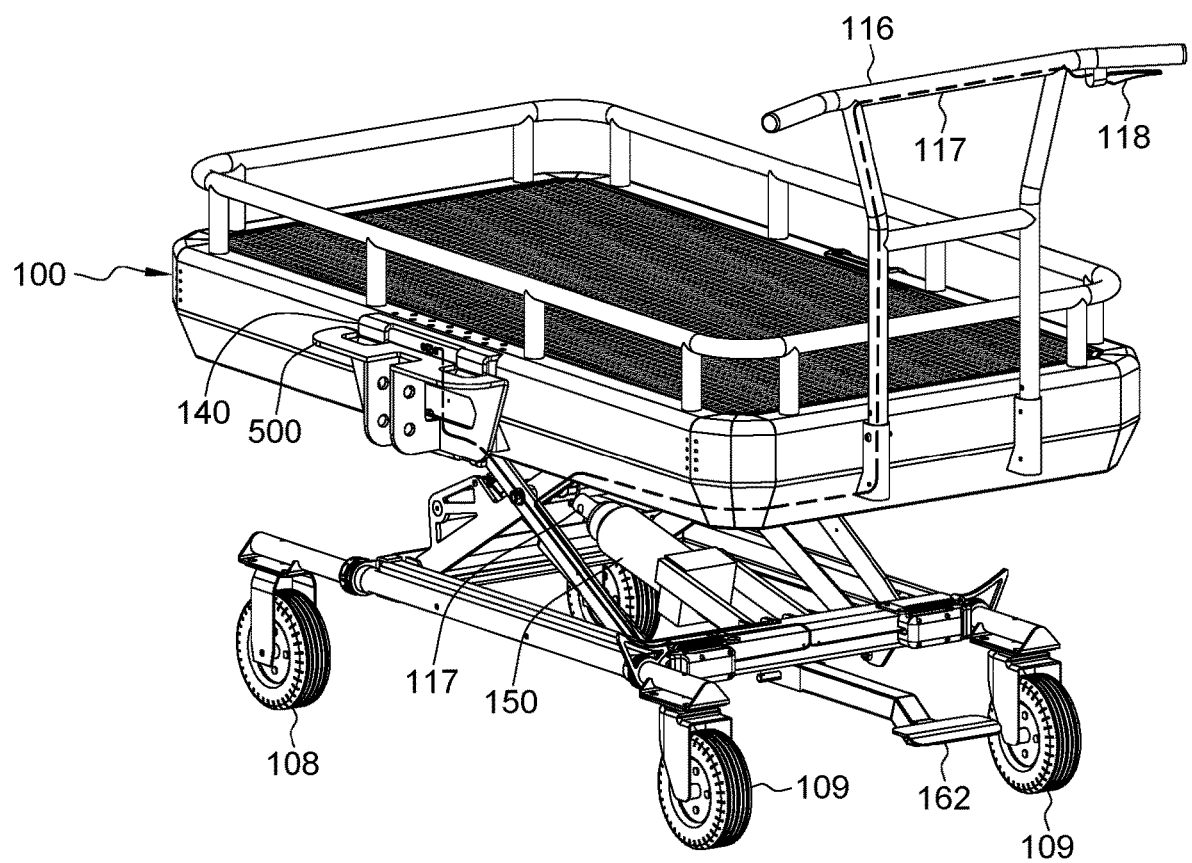
FIGS. 27A-27D show another view of the undercarriage assembly 107 retraction and wheel folding and stowing of the cart 100 during the mounting of the cart 100 onto the vehicle 404.
Figure 27B:
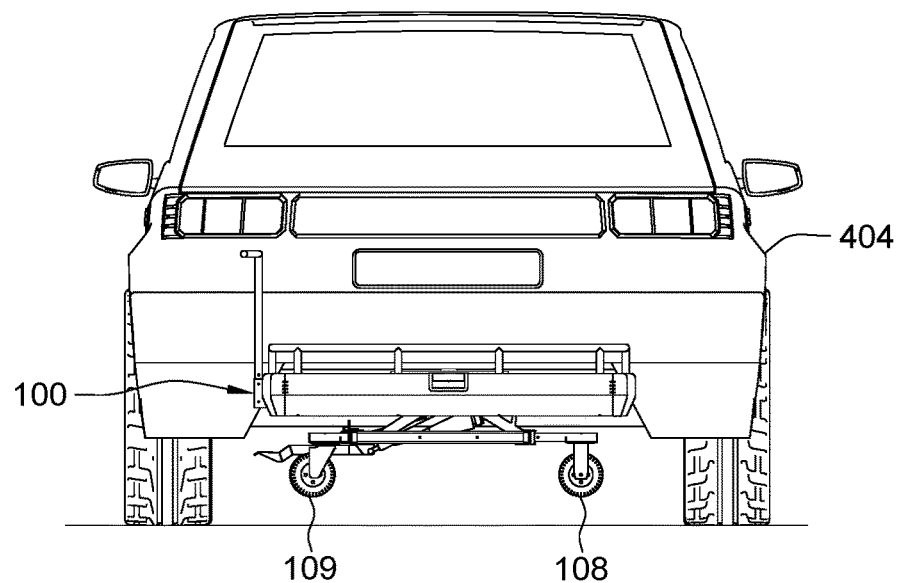
Figure 27C:
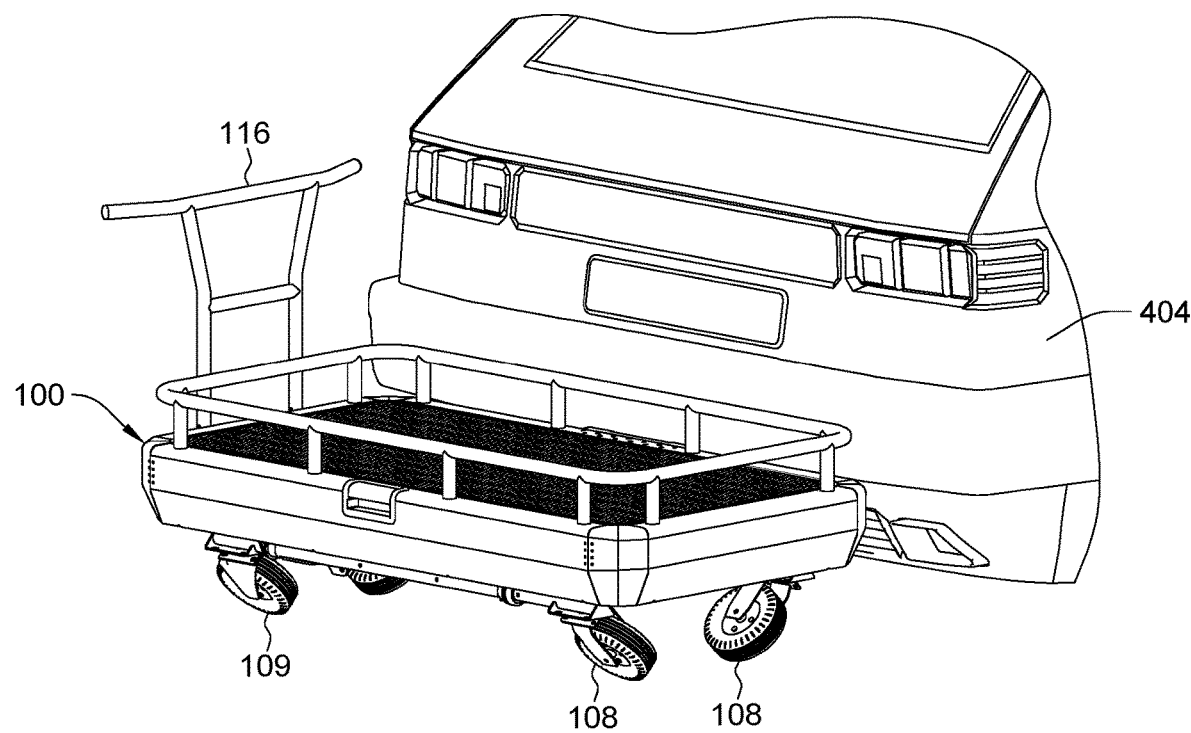
Figure 27D:
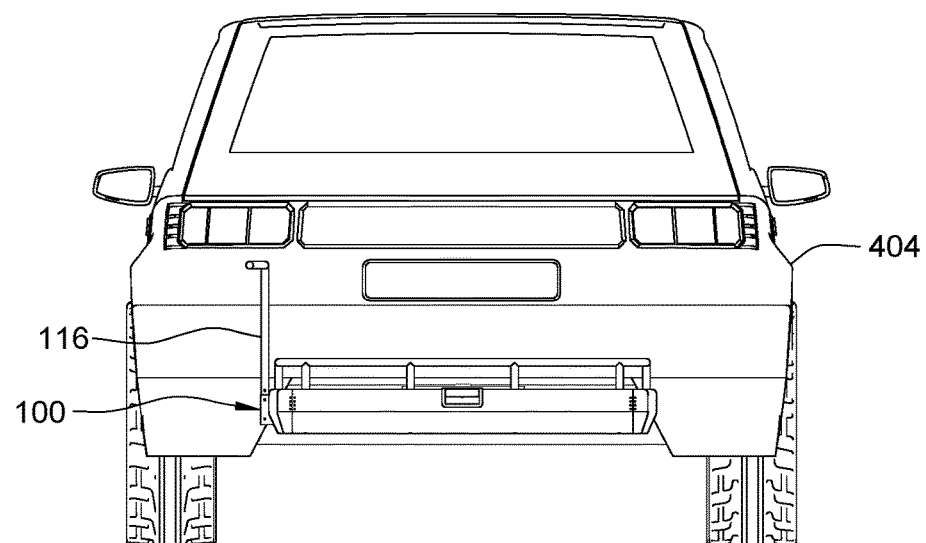

FIGS. 27A-27D show another view of the undercarriage assembly 107 retraction and wheel folding and stowing of the cart 100 during the mounting of the cart 100 onto the vehicle 404. As shown in FIG. 27A, the operator pulls hydraulic pump release lever 118 to activate hydraulic handle cable 117 attached to hydraulic cylinder pump 150 release valve. This action simultaneously lowers the top deck assembly 106 to allow the mount secure coupling 140 to descend on and mount (e.g., secure) to the secure receiver 500 and subsequently allowing for raising of the undercarriage assembly 107. When the mount secure coupling top tines 144 have bottomed onto the radiused edge of the secure receiver 500, the top deck assembly 106 is constrained and the remaining hydraulic cylinder pump 150 pressure is overcome by the return spring 158 tension force. The return springs 158 are shown externally connected to the undercarriage assembly 107 and lift it up (in alternative embodiments the return springs could be internal within the hydraulic cylinder), retracting the undercarriage assembly 107 underneath the top deck assembly 106. As the return springs 158 retract the undercarriage assembly 107 underneath the top deck assembly 106, and with the axle locking mechanism 168 retracted the stow axles 155 are free to rotate inside the axle bearings 172. Further, the bottom surface of the top deck assembly 106 contacts the axle rotation cam 160. This provides a force and path to rotate the stow axles 155 and connected wheels 108, 109 inward and underneath the top deck assembly 106. Simultaneously, as shown in FIGS. 27B and 27C, the undercarriage assembly 107 retracts and wheels 108, 109 are turned in and stored allowing proper clearance from the ground for operation of the vehicle 404. In FIG. 27D, the cart 100 is safely and securely locked in place, the undercarriage assembly 107 including wheels 108, 109 are retracted and the operator is able to drive the vehicle 404 off.

Figure 28A:
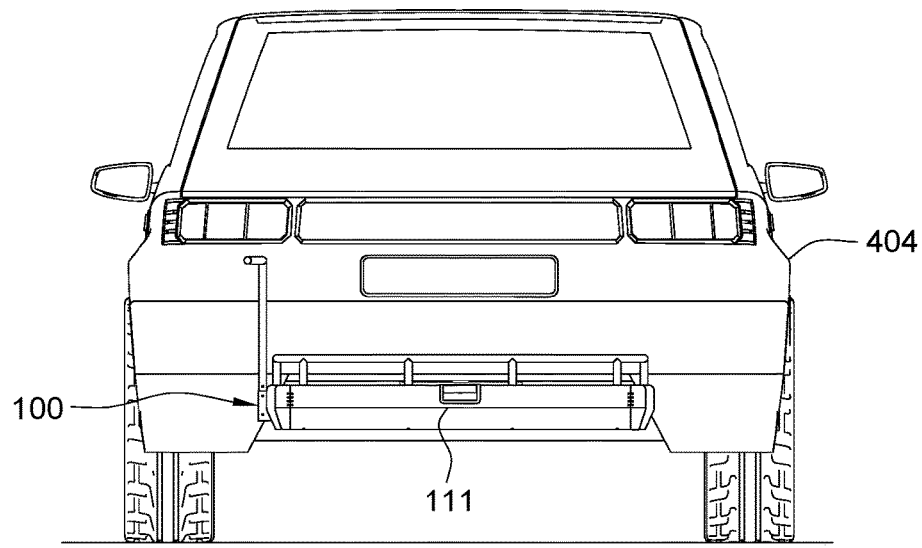
FIGS. 28A-28F show the deployment and lock out of the wheels 108, 109 during uncoupling of the cart 100 from the vehicle 404.
Figure 28B:
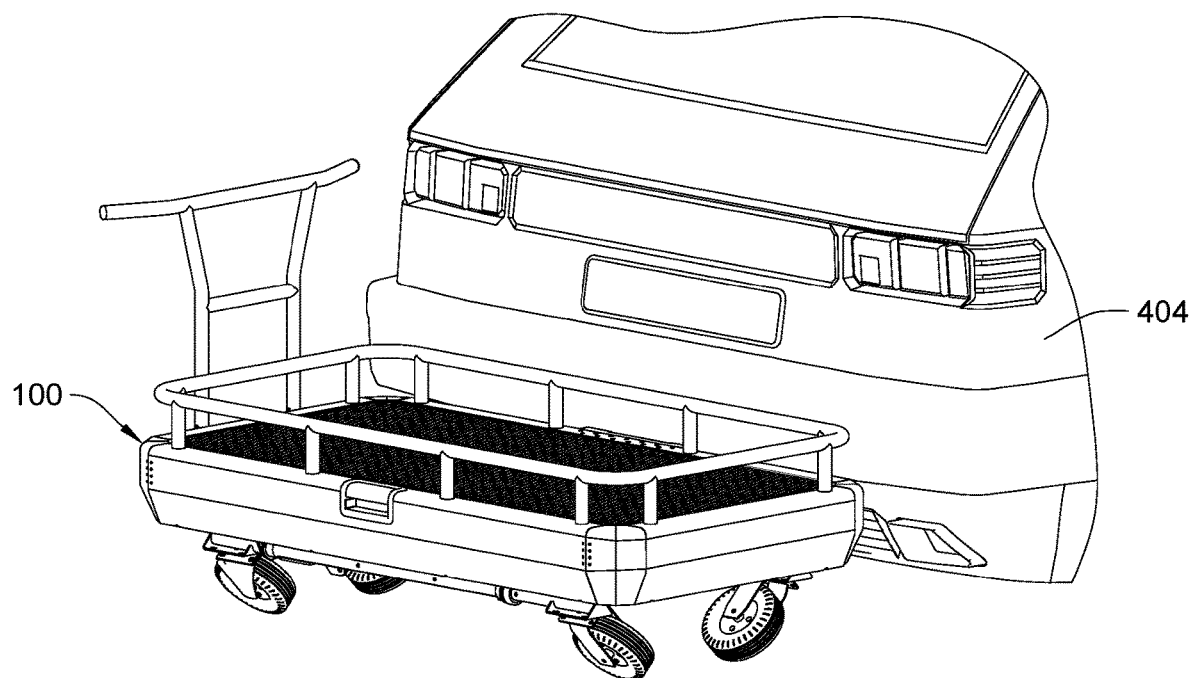
Figure 28C:
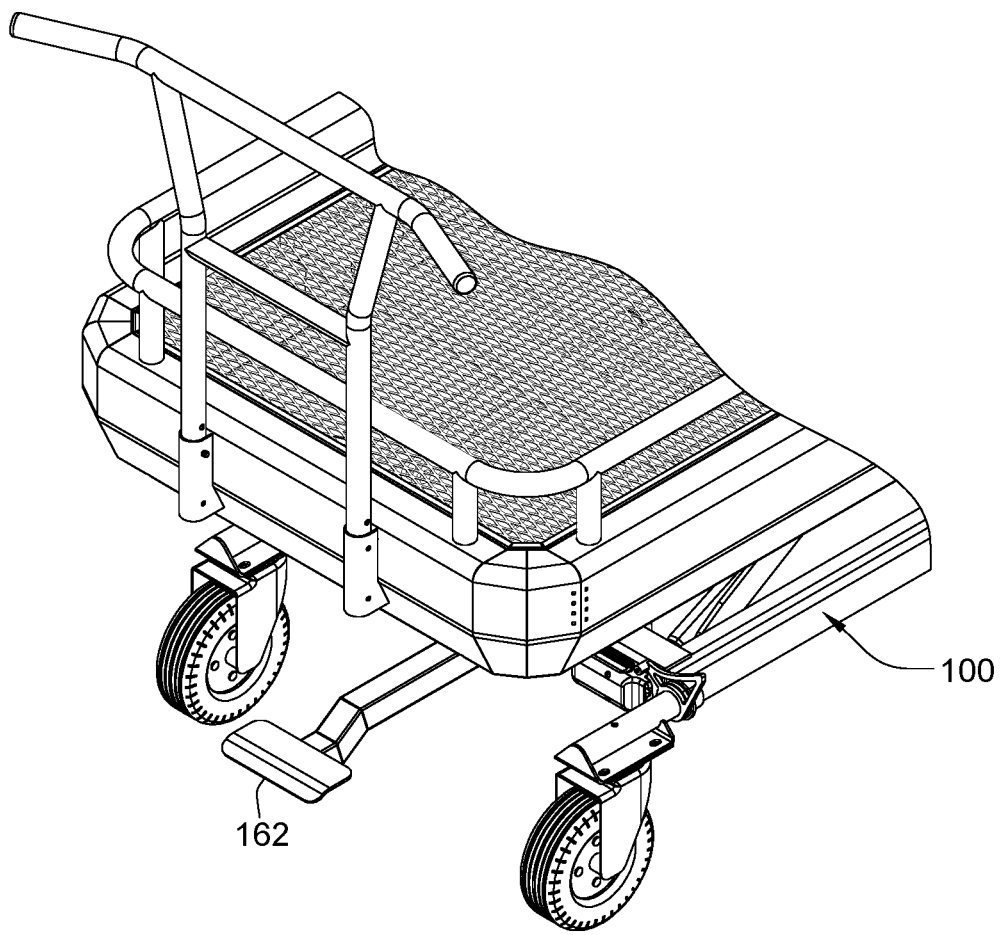
Figure 28D:
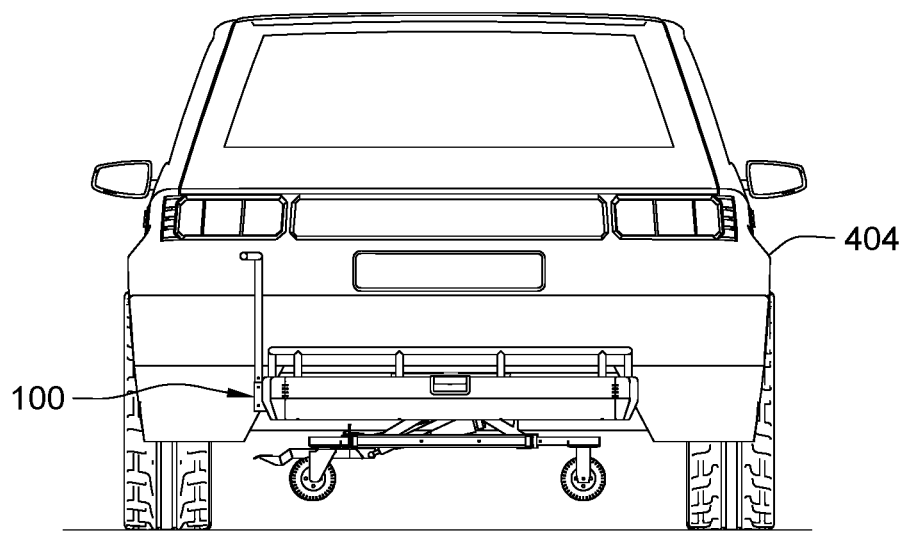
Figure 28E:
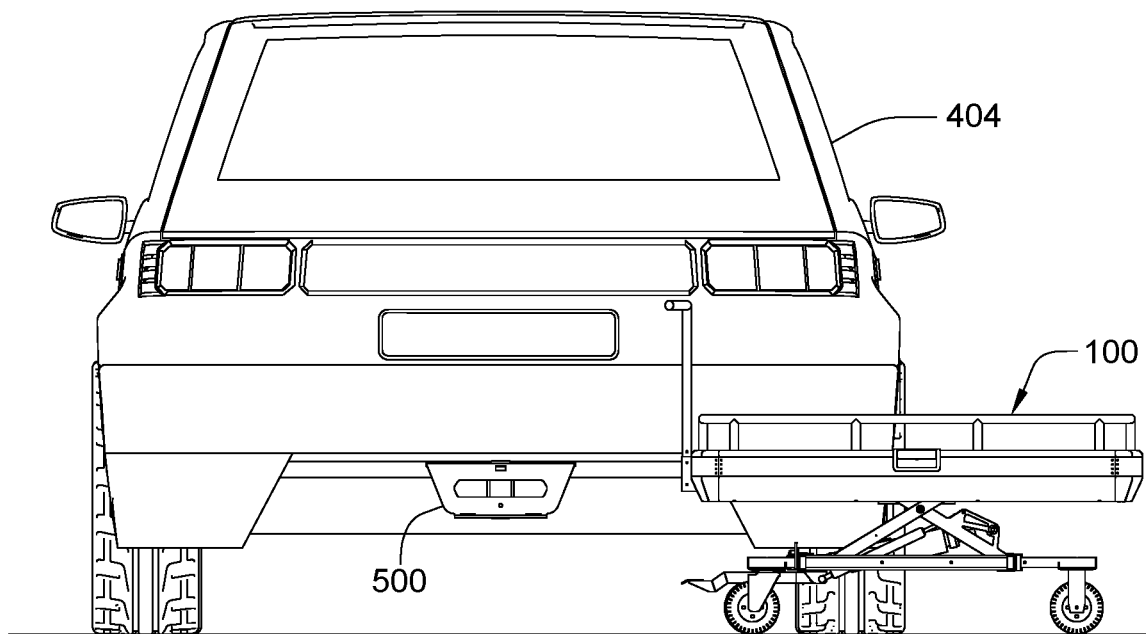
Figure 28F:
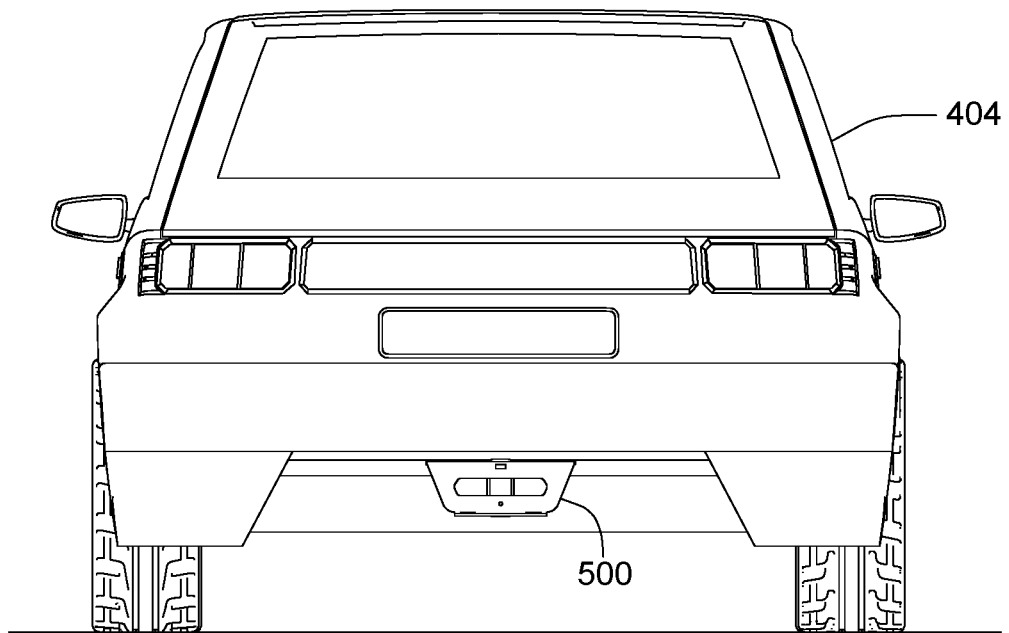
Figure 29A:
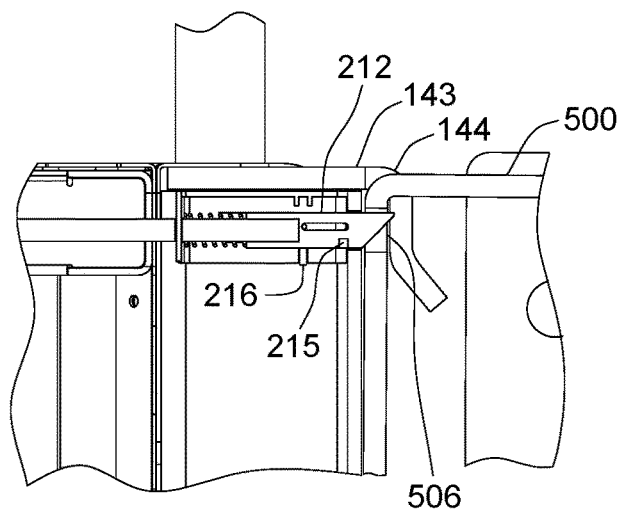
FIGS. 29A-29E show the secure coupling lock assembly unlocking, retraction, and resetting sequence in detail.

The discussion will now turn to removing (or demounting) the cart 100 from the vehicle 404. FIGS. 28A-28F and 29A-29E show the deployment and lock out of the wheels 108, 109 during uncoupling of the cart 100 from the vehicle 404. In FIGS. 28A and 29A, to uncouple the cart 100 the operator will unlock the secure coupling release lever 111, pulling the secure coupling lock latch bolt 212 out of secure coupling lock opening 506 and allowing the cart 100 freedom to rise above the secure receiver 500. As shown in FIGS. 28B and 28C, the operator will use the hydraulic pump foot pedal 162 to deploy the undercarriage assembly 107. As the hydraulic cylinder pump 150 is pressurized, the scissor arm pairs 152, 154 move along their subframe tracks 156 (as shown in FIGS. 11 and 12) and thereby extending the scissor arm pairs 152, 154 and effectively lowering undercarriage assembly 107 toward the ground. As undercarriage assembly 107 descends, the axle rotation cam 160, the stow axle 155 and wheels 108, 109 will rotate until they reach an approximately ninety degree vertical position as shown in FIG. 28D. The axle lock trigger 164 and axle locking mechanism 168 will reset to "locked" and prohibit the stow axles 155 from rotating when undercarriage assembly 107 including wheels 108, 109 are fully extended. The operator will continue to pump the hydraulic pump foot pedal 162 and the top deck assembly 106 will gradually lose contact with the secure receiver 500 as the mount secure coupling top tines 144 and mount secure coupling lower tines 145 of the mount secure coupling 140 rise above the secure receiver 500. The cart 100 is then elevated from the secure receiver 500 and released. The cart 100 is now able to be rolled away as shown in FIG. 28E with the secure receiver 500 remaining on the vehicle 404 as shown in FIG. 28F.

Figure 29B:
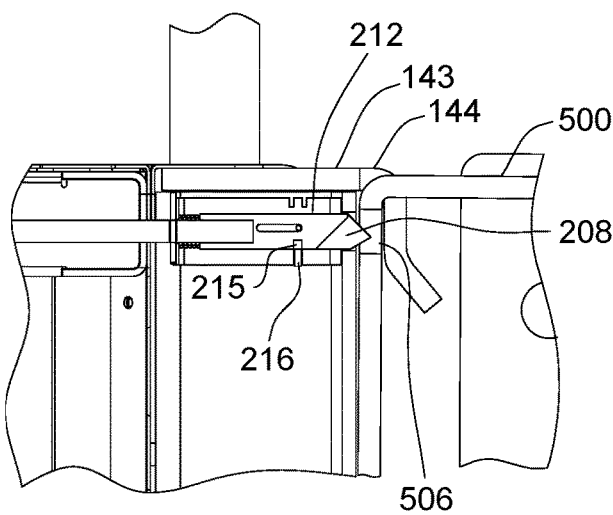
Figure 29C:
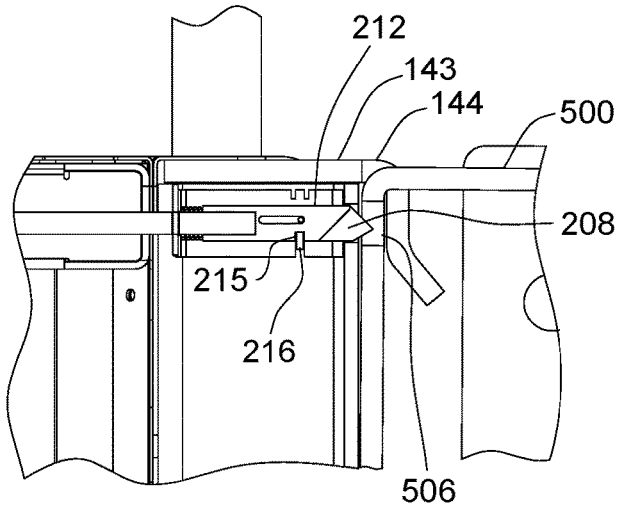
Figure 29D:
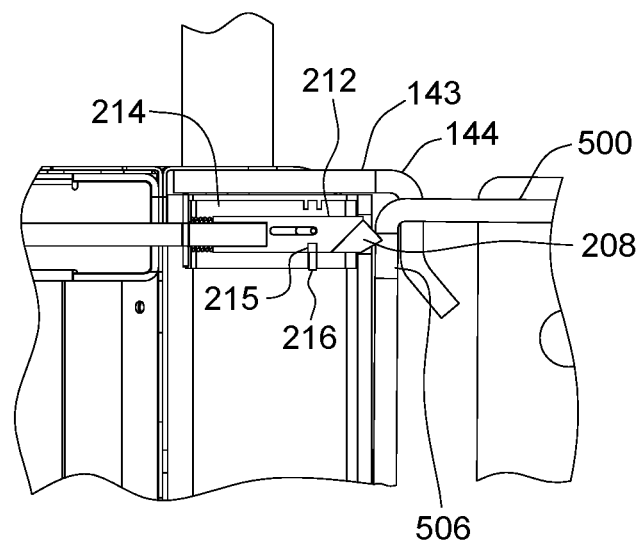
Figure 29E:
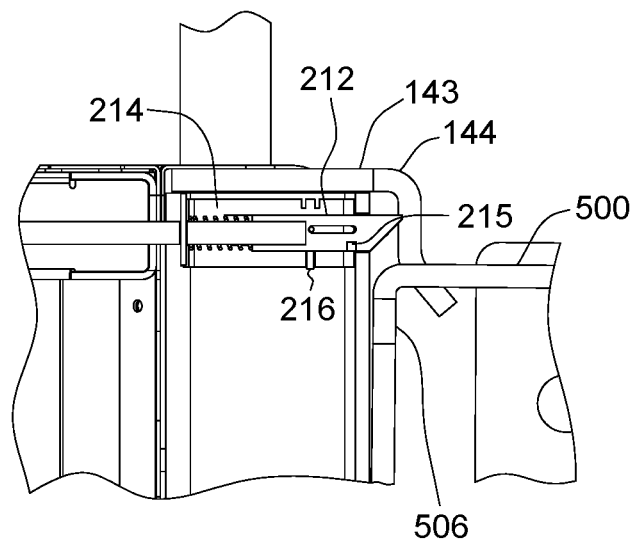

FIGS. 29A-29E show the locking system unlocking and retraction sequence in detail during uncoupling of the cart 100 from the vehicle 404. In FIG. 29A, the secure coupling lock assembly 202 is fully "locked" with secure coupling lock latch bolt 212 inside secure coupling lock opening 506. In FIG. 29B, secure coupling lock release lever 111 is "pulled" which causes secure coupling lock connecting rod 200 to extract the secure receiver latch bolt 212 from secure receiver 500 positioned above secure coupling locking catch 216. This allows the secure receiver catch springs 220 to pull the secure coupling locking catch 216 into a secure coupling locking catch slot 215 on the secure coupling lock latch bolt 212 and hold it in a retracted position as shown in FIG. 29C. In FIGS. 29C-D, as cart 100 rises for takeoff from secure receiver 500 the secure coupling lock release 208 slides up the face of the secure receiver 500 along its angular top geometry and out of secure coupling lock opening 506. This begins to slide/push the secure coupling lock release 208 backwards and push the secure coupling locking catch 216 down via the angled bottom surface 209 of the secure coupling lock release 208 (FIG. 14). As the cart 100 continues to rise the secure coupling locking catch 216 disengages from the secure coupling locking catch slot 215 in the bottom of secure coupling lock latch bolt 212 freeing it to spring forward from the force of the secure coupling lock latch bolt spring 214 to reset to a fully extended position as shown in FIGS. 29D and 29E. In FIG. 29E, secure coupling lock assembly 202 is fully unlocked and the unlocked secure coupling lock latch bolt 212 is in reset position ready to auto lock upon the next descent of the top deck assembly 106 and mount secure coupling 140 onto the secure receiver 500.

Figure 30A:
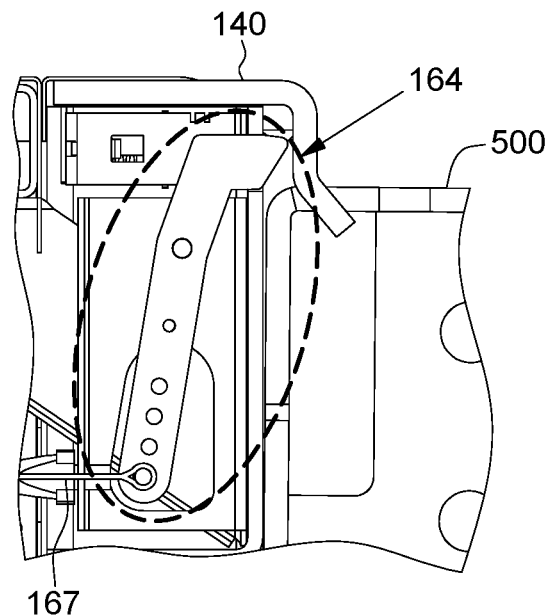
FIGS. 30A-30B are cross sectional views of cart 100 and show the elements of the mount secure coupling 140 and secure receiver 500 involved in the stow axle 155 rotation and wheel 108, 109 unfolding and unstowing.
Figure 30B:
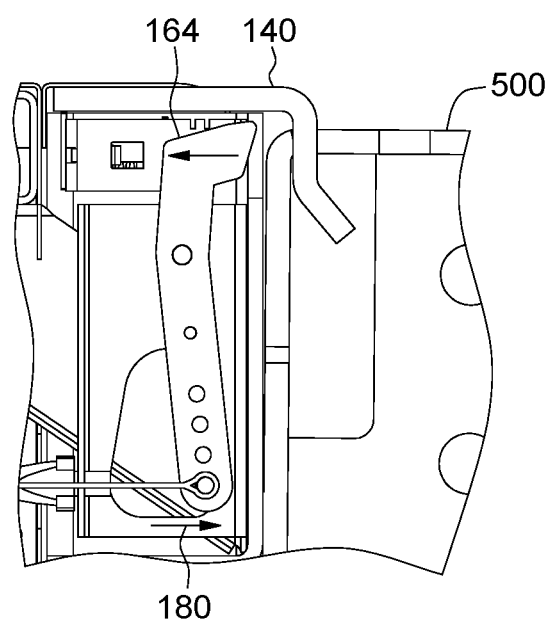
Figure 31A:
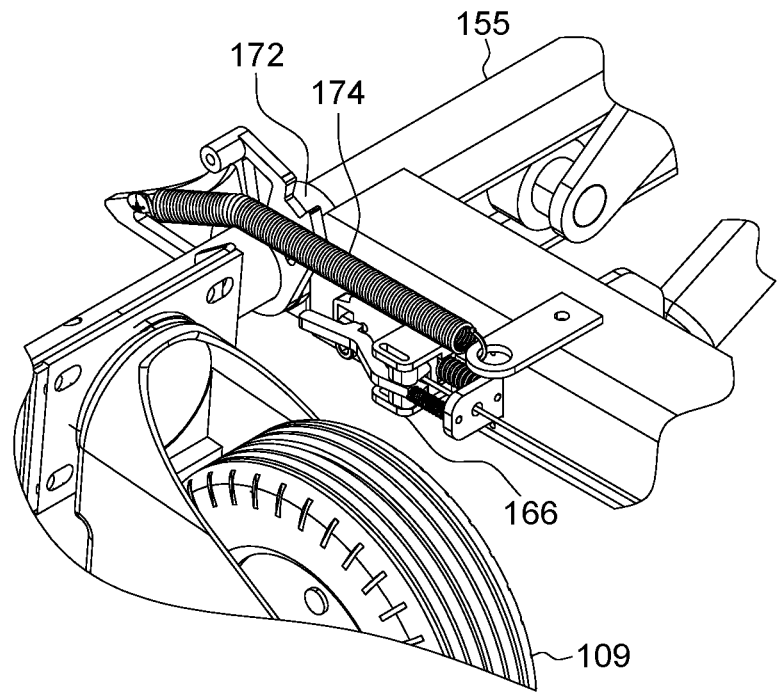
FIGS. 31A-31D illustrate a perspective view of deployment of the wheels 108, 109 during demounting of the cart 100 from the vehicle 404.
Figure 31B:
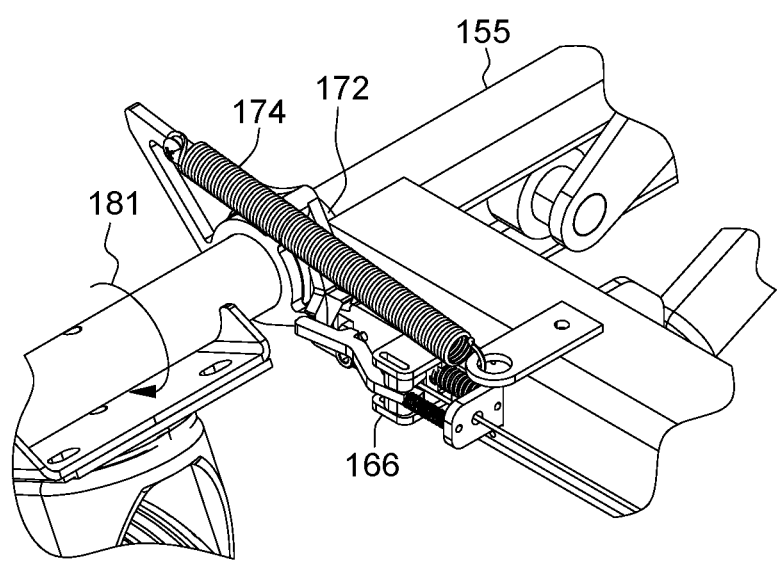
Figure 31C:
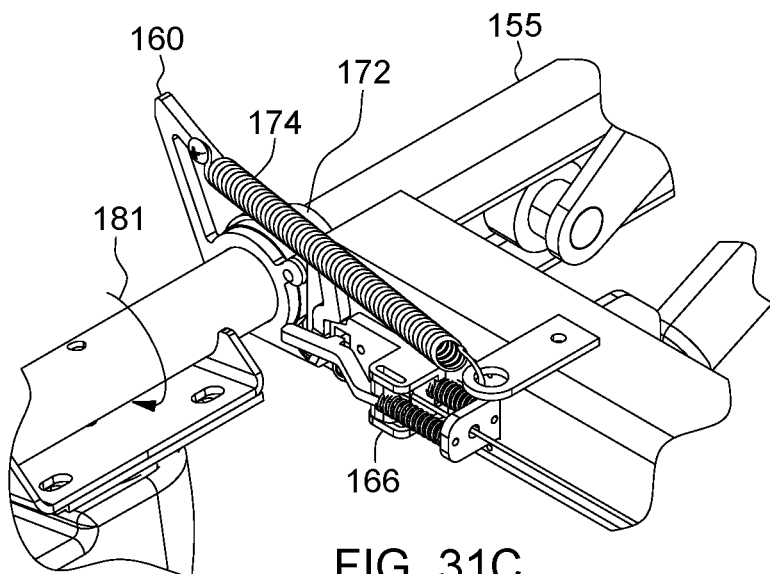
Figure 31D:
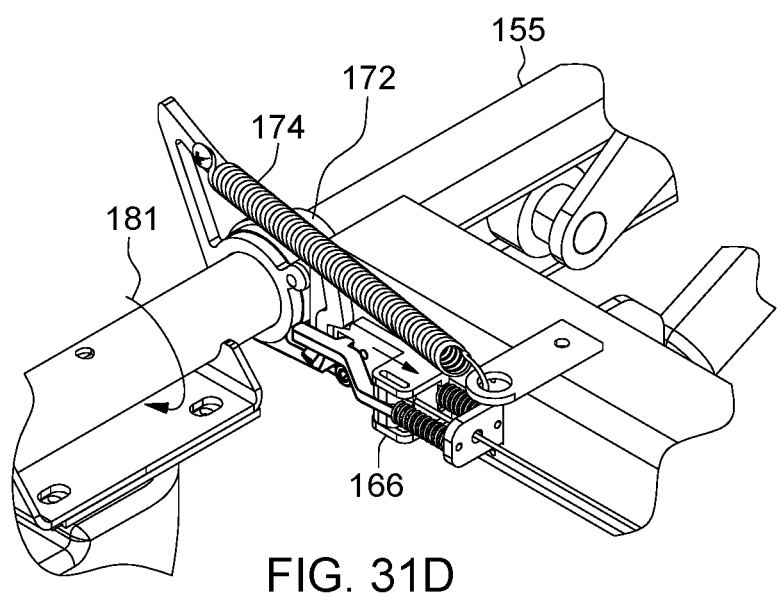

FIGS. 30A-30B are cross sectional views of cart 100 and show the elements of the mount secure coupling 140 involved in the stow axle 155 rotation and wheel 108, 109 unfolding and unstowing. FIG. 30A shows axle lock trigger 164 inside the mount secure coupling 140 as the top deck assembly 106 rises. FIG. 30B illustrates that as the cart 100 lifts off the secure receiver 500, the axle lock trigger 164 is pushed inward and a connected cable 167 is pulled (as shown by arrow 180) through a 1-into-2 cable splitter 165 (see FIG. 32). This action releases the axle lock release block 166 (shown in FIGS. 31A-31D) freeing each stow axles 155 to rotate inside axle bearing mounts 172.

FIGS. 31A-31D illustrate a perspective view of deployment of the wheels 108, 109 during uncoupling of the cart 100 from the vehicle 404. As an independent action, the operator pulls secure coupling lock release lever 111 to allow cart 100 to be uncoupled from secure receiver 500. As a next step, the operator then begins to pump the hydraulic foot pump pedal 162 and the hydraulic cylinder pump 150 will build pressure and force the return springs 158 and scissor arm pairs 152,154 to extend which will move the undercarriage assembly 107 downward toward the ground. This action allows axle rotation cams 160 to rotate about the bottom surface of top deck assembly 106 until fully losing contact with the top deck assembly 106 and allows gravity force of wheels 108, 109 and force of tension springs 174 (FIG. 31C) to assist rotation of stow axles 155 (see arrow 181) inside axle bearing mounts 172 back to substantially vertical and engaging axle locking mechanism latch 170 into axle locking latch slot 176 on axle lock release block 166 of axle locking mechanism 168. Stow axles 155 are now locked (FIG. 31D) with the wheels 108, 109 fully extended and ready to roll.

Figure 32:
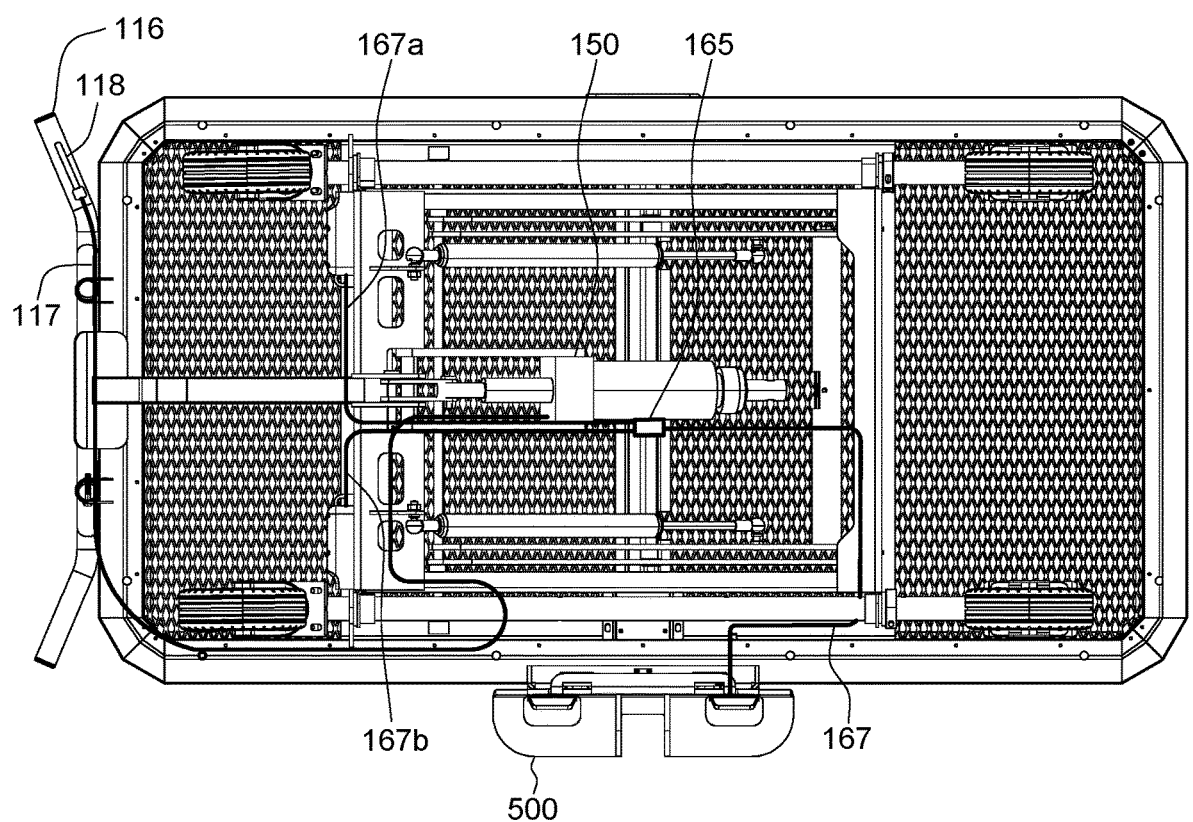
FIG. 32 is bottom view of the cart 100 showing the operation of the hydraulic pump release lever 118, hydraulic handle cable 117 and axle lock trigger cable 167.

FIG. 32 is bottom view of the cart 100 showing the operation of the hydraulic pump release lever 118, hydraulic release cable 117 and axle lock trigger cable 167. The axle lock trigger cable 167 splits into first axle lock trigger cable split 167a and second axle lock trigger cable split 167b. Hydraulic release cable 117 connects hydraulic pump release lever 118 directly to a hydraulic pump 150 release valve to release pressure when pulled by operator. Axle lock trigger cable 167 connects axle lock trigger 164 to axle lock 1-to-2 cable splitter 165. When cart 100 descends onto secure receiver 500, axle lock trigger 164 deflects and pulls axle lock trigger cable 167. At axle lock 1-to-2 cable splitter 165, the axle lock trigger cable 167 splits into first axle lock trigger cable split 167a and second axle trigger cable split 167b which connect to axle locking mechanisms 168 to unlock stow axles 155.

Figure 33:
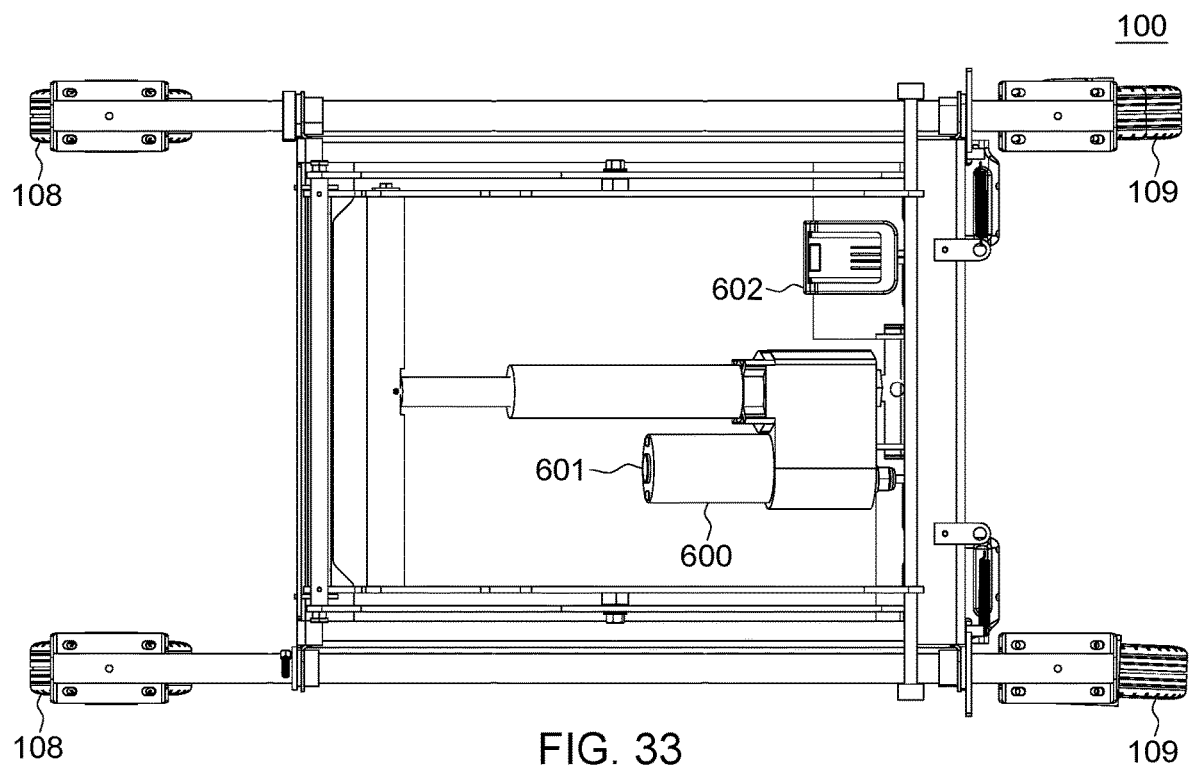
FIGS. 33-37 are views of an alternative embodiment of the undercarriage assembly with a linear actuator 600 powering the extension and retraction of the undercarriage assembly 107 (instead of the hydraulic cylinder pump 150).
Figure 34:
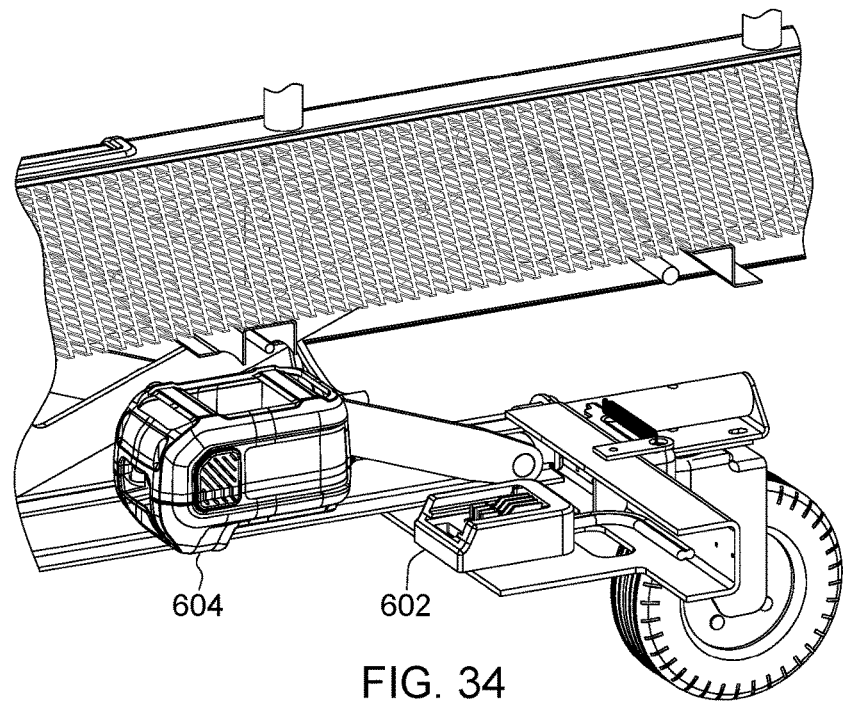
Figure 35:
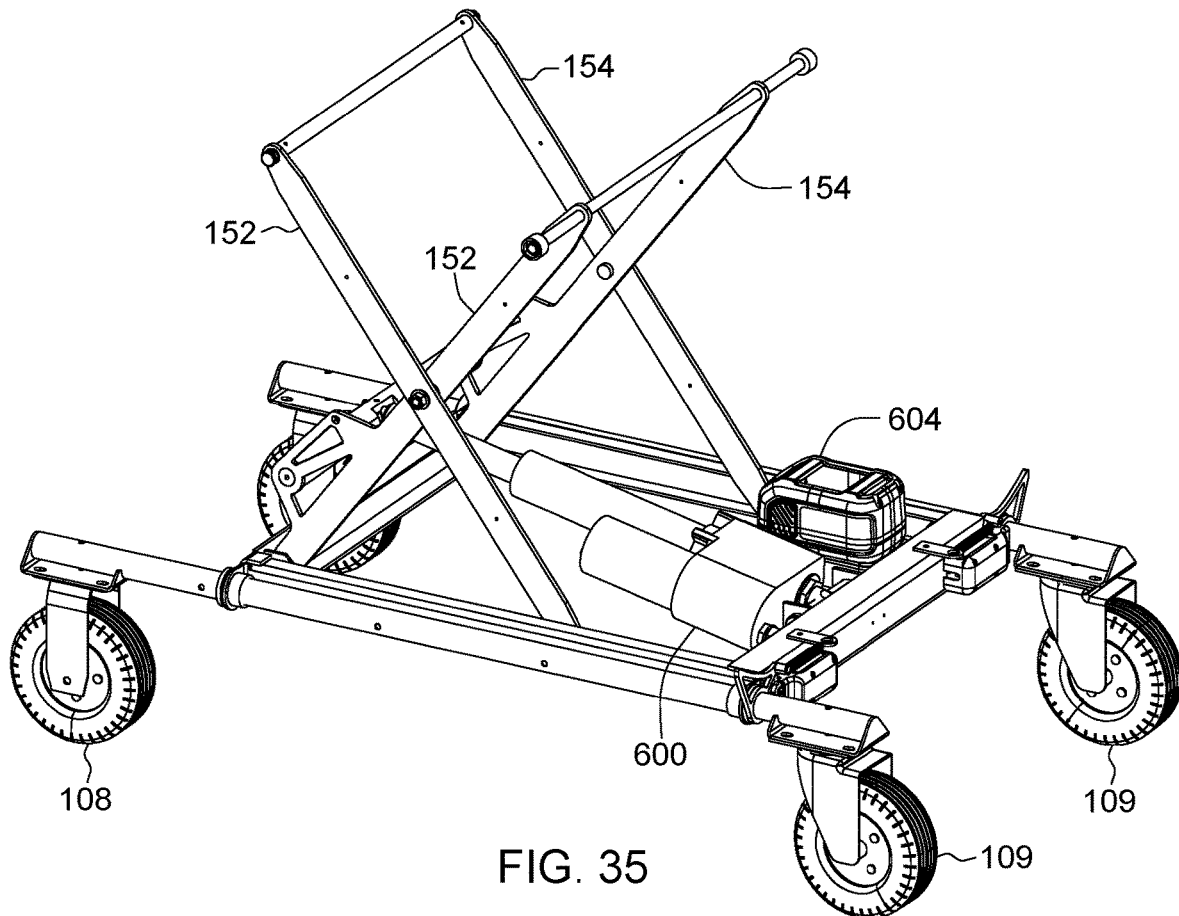
Figure 36:
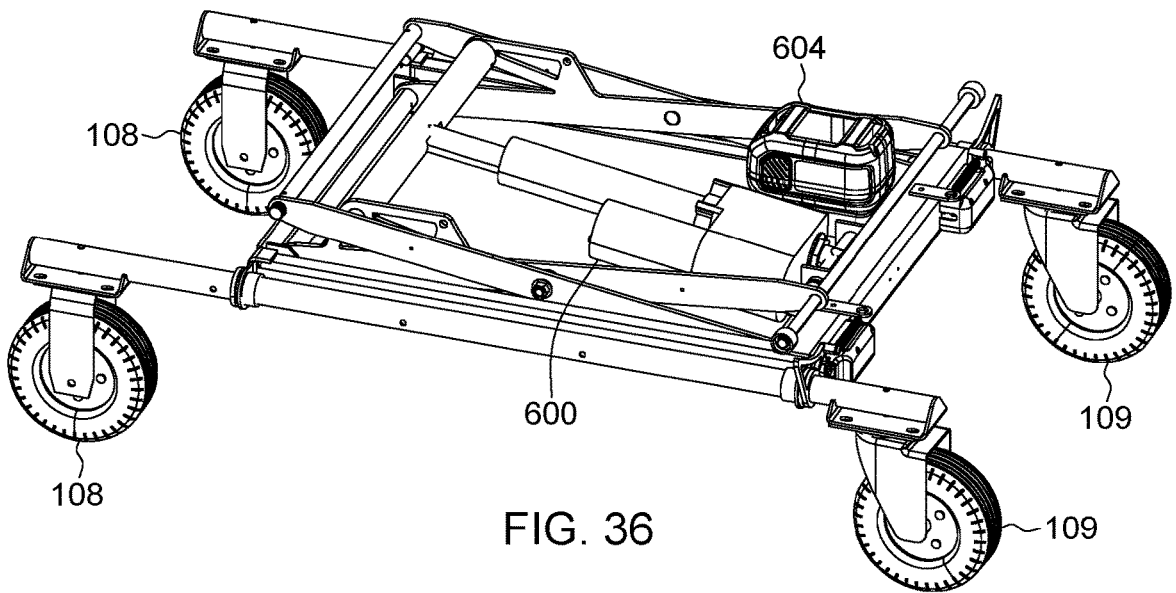
Figure 37:
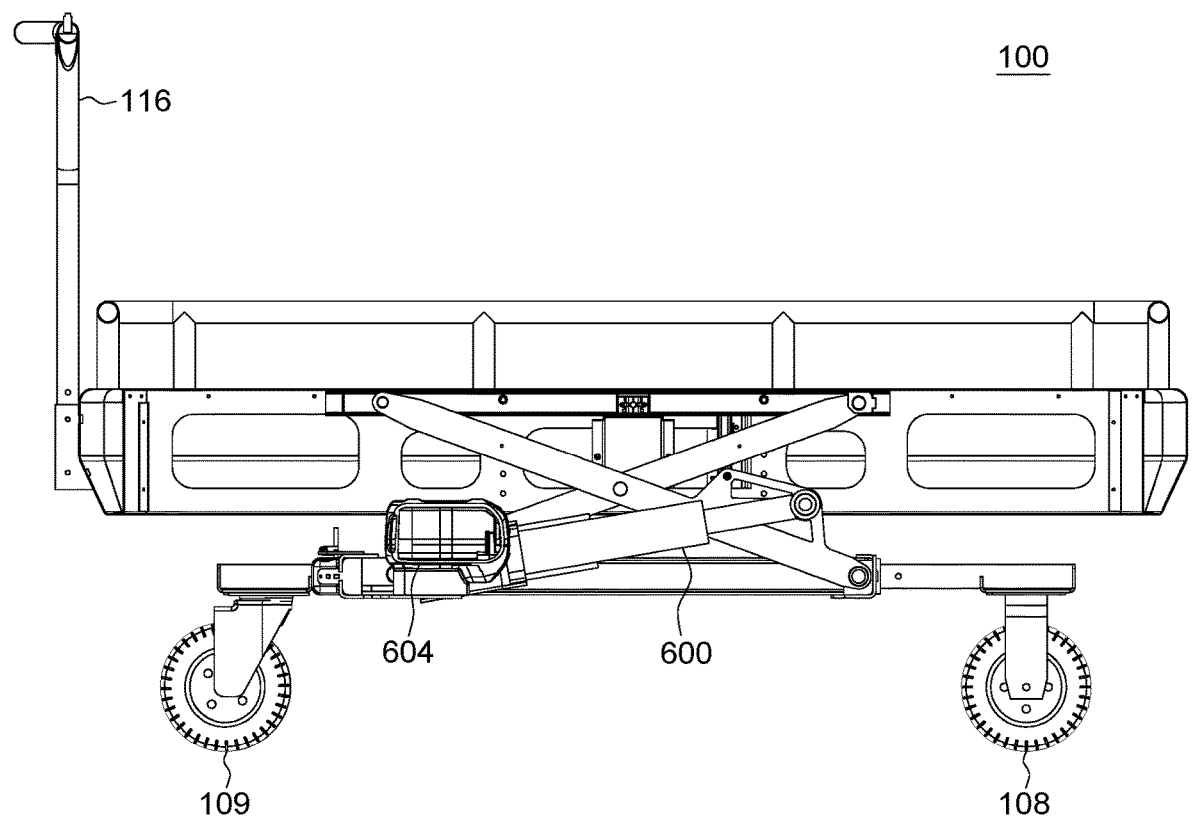

FIGS. 33-37 are views of an alternative embodiment of the undercarriage assembly. FIG. 33 is top view of an alternative embodiment of the undercarriage assembly showing a linear actuator 600 and a battery receiver 602. Electro-mechanical actuators are similar to mechanical actuators (e.g., hydraulic cylinder pump 150) except that the source of power/leverage is replaced with an electric motor. Rotary motion of the motor is converted to linear displacement. The following is a description of the electro-mechanical linear actuator 600 used in this alternative embodiment. An electric motor is mechanically connected to rotate a lead screw. A lead screw has a continuous helical thread machined on its circumference running along the length (similar to the thread on a bolt). Threaded onto the lead screw is a lead nut or ball nut with corresponding helical threads. The nut is prevented from rotating with the lead screw (the nut interlocks with a non-rotating part of the actuator body). Therefore, when the lead screw is rotated, the nut will be driven along the threads. The direction of motion of the nut depends on the direction of rotation of the lead screw. By connecting linkages to the nut, the motion can be converted to usable linear displacement. There are many types of motors that can be used in linear actuator 600. These include DC brush, DC brushless, stepper, or in some cases, even induction motors. The linear actuator 600 will commonly have the motor as a separate cylinder attached to the side of the linear actuator 600, either parallel with the actuator or perpendicular to the actuator. In this disclosure, a battery powered (DC) linear actuator 600 with the motor 601 attached to the side in parallel is used. In this embodiment, the linear motion of the hydraulic actuator is replaced by the electro-mechanical linear actuator with internal lead screw. The DC motor 601 replaces the need for the foot pump 162, and since the linear motion is controlled in both extension and retraction the external return springs 158 can be eliminated in this alternative embodiment (i.e., the powered retraction cycle acts as a hydraulic cylinder would with an internal return spring). Moreover, the axle locking mechanisms 168 in their entirety are eliminated as the linear actuator are controlled to specific stop points through limit or proximity switches. A limit or proximity switch replaces the axle lock trigger 164 to indicate coupling of cart 100 to secure receiver 500 is complete, and allow the full undercarriage assembly 107 retraction and stowing cycle for stow axles 155 and wheels 108, 109. Stow axles 155 are free to rotate within axle bearing mounts 172, but constrained rigid in any location including extended and vertical deployment by direct attachment to the linear actuator lead screw of the linear actuator 600. FIG. 34 shows a battery 604 (e.g., 12 volts) in relation to the battery receiver 602. FIG. 35 shows the first and second scissor arm pairs 152, 154 extended to lift the top deck assembly 106. FIG. 36 shows the first and second scissor arm pairs 152, 154 retracted to lower the top deck assembly. FIG. 37 is an elongated view cutaway with battery 604 shown. In an alternative embodiment, in addition to using a hydraulic cylinder and linear actuator to adjust the height of the cart, another method could include a hand crank (e.g., a jack) to raise and lower the scissor arms of the undercarriage assembly.

Figure 38A:
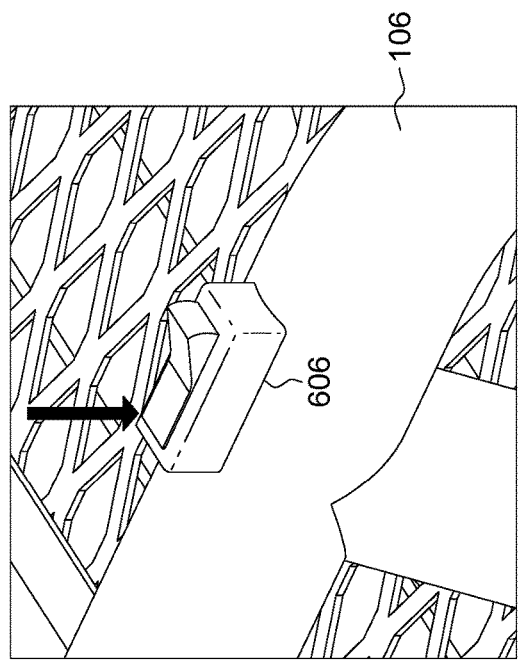
FIGS. 38A-38D show the depression of switch 606 to lower first and second scissor arm pairs 152, 154 for the mount secure coupling 140 to dock into secure receiver 500.
Figure 38B:
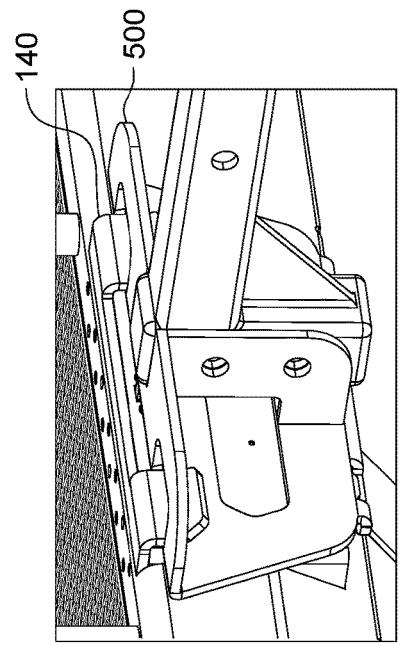
Figure 38C:
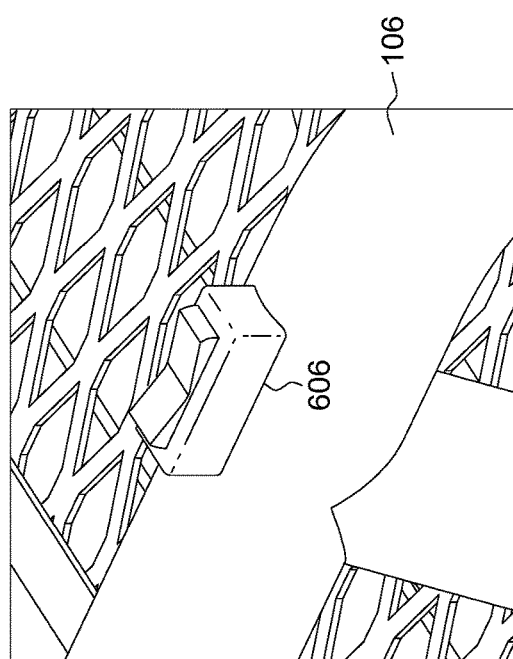
Figure 38D:
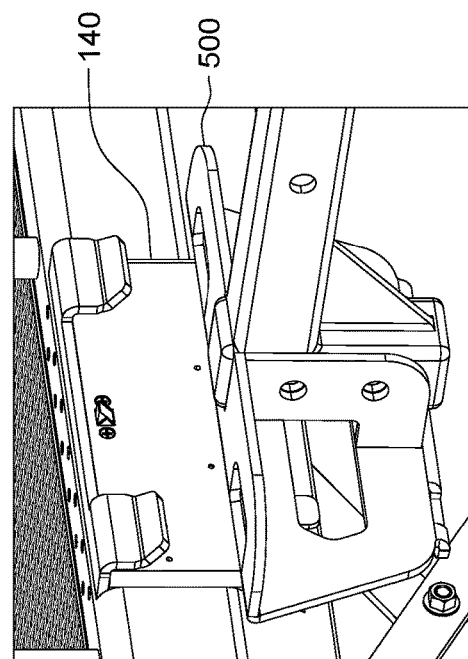

FIGS. 38A-38D show the depression of switch 606 to lower first and second scissor arm pairs 152, 154 for the mount secure coupling 140 to dock into secure receiver 500. In FIG. 38A a toggle or rocker switch 606 (e.g., double pole, double throw rocker switches with momentary on) in "neutral/stop" position is shown and correspondingly in FIG. 38B the mount secure coupling 140 is substantially aligned and prepared to descend onto the secure receiver 500. In FIG. 38C, switch 606 is depressed to descend the mount secure coupling 140 and retract the undercarriage assembly 107 into the top deck assembly. As shown in FIG. 38D, upon safe seating of the mount secure coupling 140 into the secure receiver 500, a proximity or limit switch would sense/indicate or make contact (indicating safe to continue) to allow the linear actuator 600 to continue to travel to full retraction.

Figure 39A:
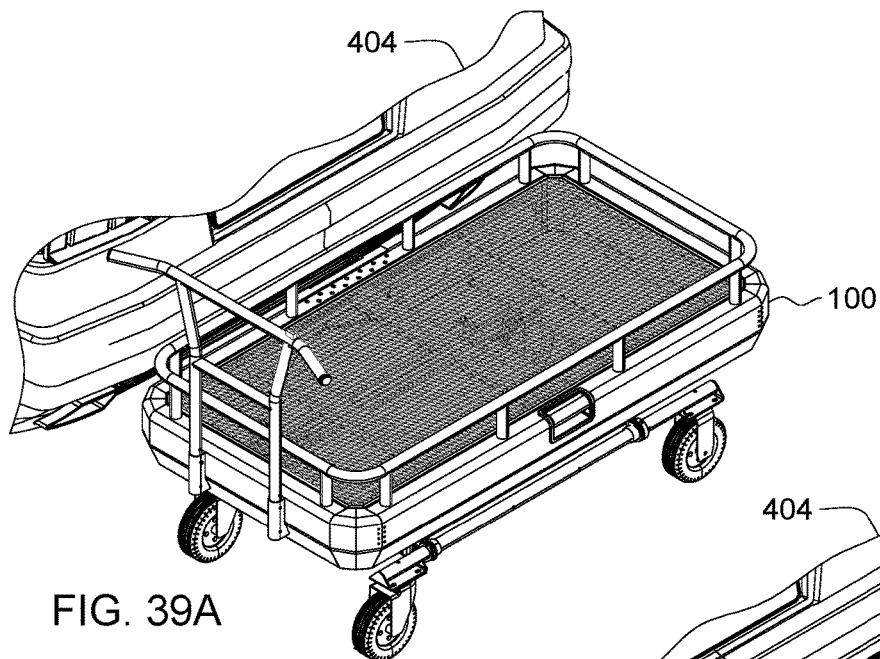
FIGS. 39A to 39C depict the continuation of the retraction of the undercarriage assembly 107 by power of the linear actuator 600 and folding of the wheels.
Figure 39B:
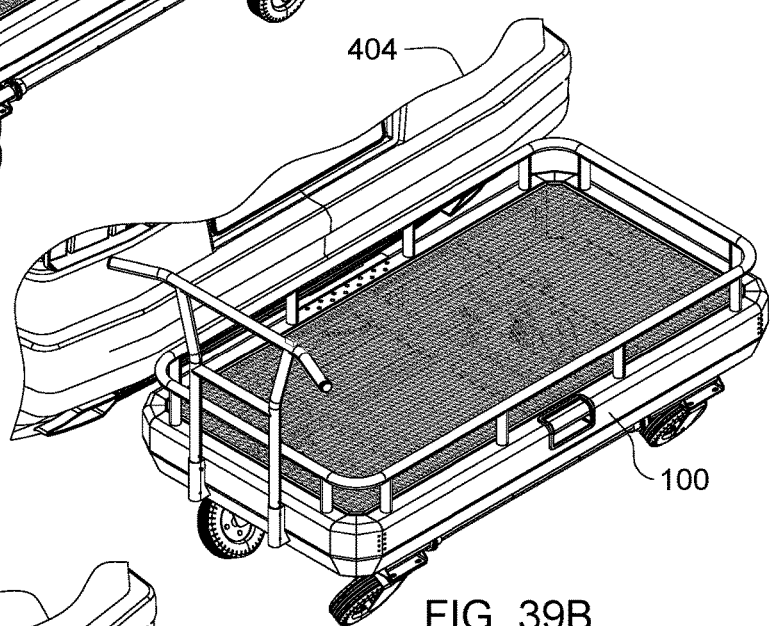
Figure 39C:
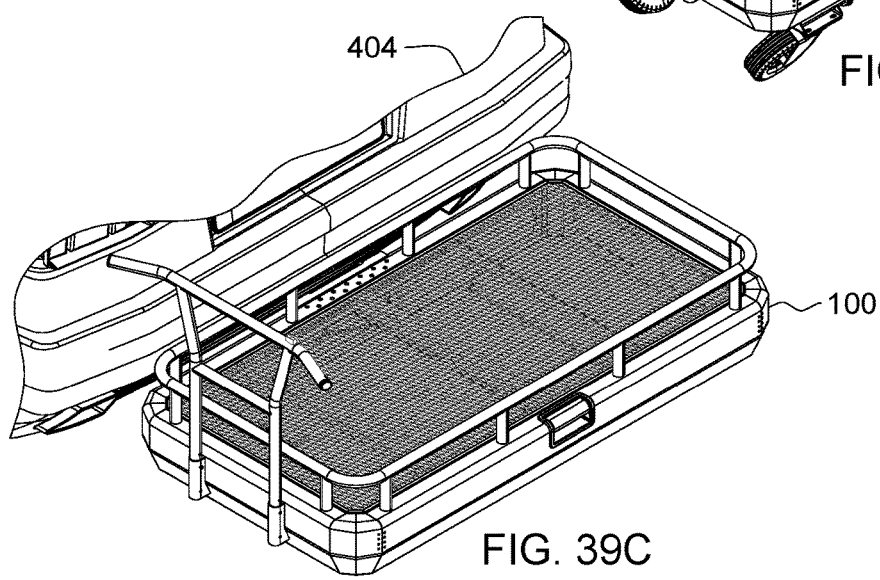

FIGS. 39A to 39C depict the continuation of the retraction of the undercarriage assembly 107 by power of the linear actuator 600 as it travels to home position. The stow axles 155 freely rotating in their axle bearing mounts 172 and rotate when the axle rotation cam 160 contacts the underside of the top deck assembly (as like the first embodiment) folding the wheels 108, 109 up and in.

Figure 40A:
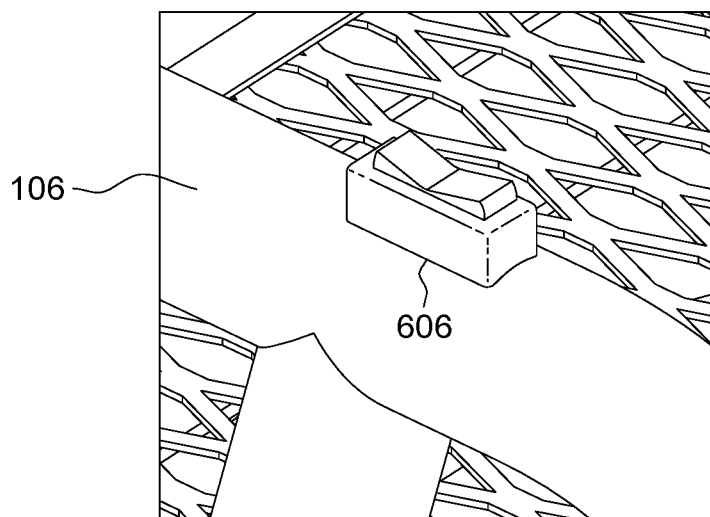
FIGS. 40A-40D shows depression of toggle switch to deploy undercarriage assembly 107 and wheels 108, 109.
Figure 40B:
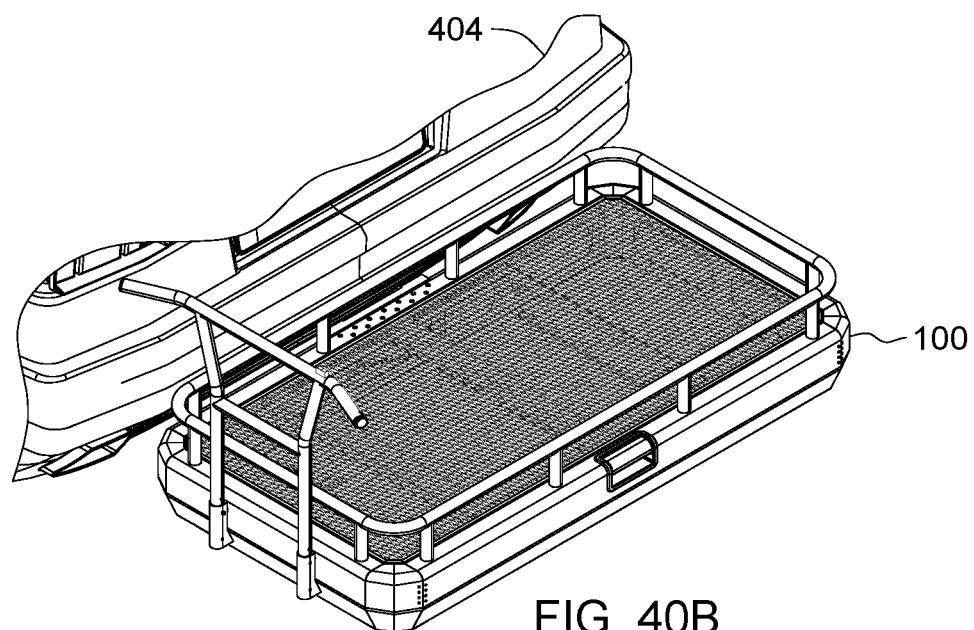
Figure 40C:
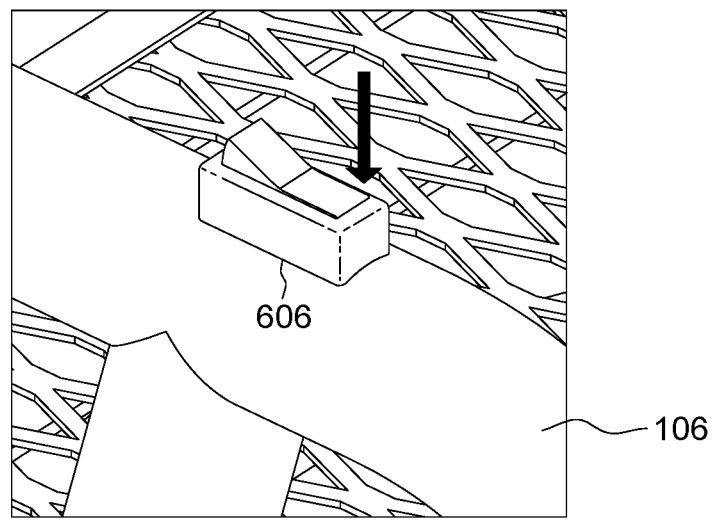
Figure 40D:
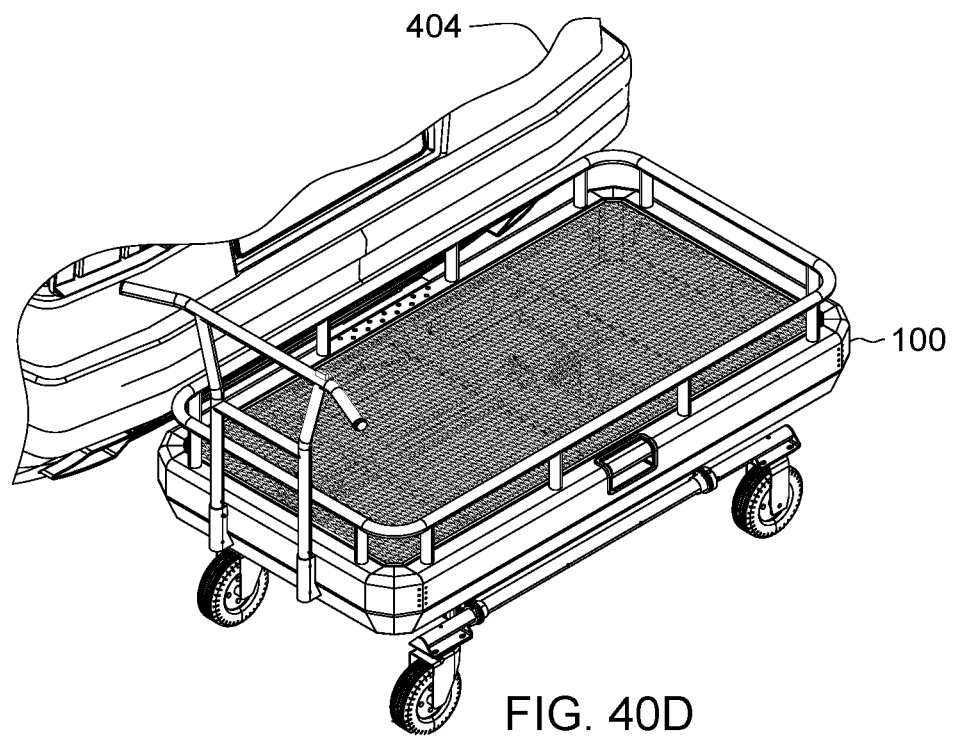

FIGS. 40A-40D shows depression of toggle switch to deploy undercarriage assembly 107 and wheels 108, 109. FIG. 40A shows the switch 606 in a neutral position with cart 100 mounted on the vehicle 404 as shown in FIG. 40B. In FIG. 40C, the switch 606 has been depressed and when energizing the switch in this direction the linear actuator 600 shaft will extend pushing the scissor pairs 152, 154 in the tracks and extending the undercarriage assembly 107 down. The stow axles 155 will rotate down till the wheels 108, 109 are vertical and ready to contact the road surface. Continuing to depress the switch will continue to extend the linear actuator 600 shaft and scissor arm pairs 152, 154 until the top deck assembly 106 ascends above the secure receiver 500 and the cart 100 can be rolled away.

Figure 41A:
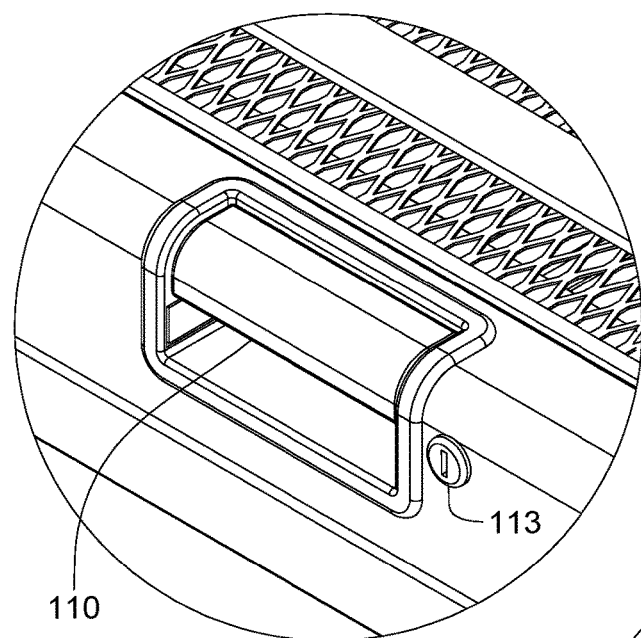
FIGS. 41A-41C show another alternative embodiment of the cart 100 with the secure coupling lock release lever assembly 110 having an associated key lock 113 to prevent the secure coupling lock release lever 111 from leaving a locked position when the key lock 113 is also locked.
Figure 41B:
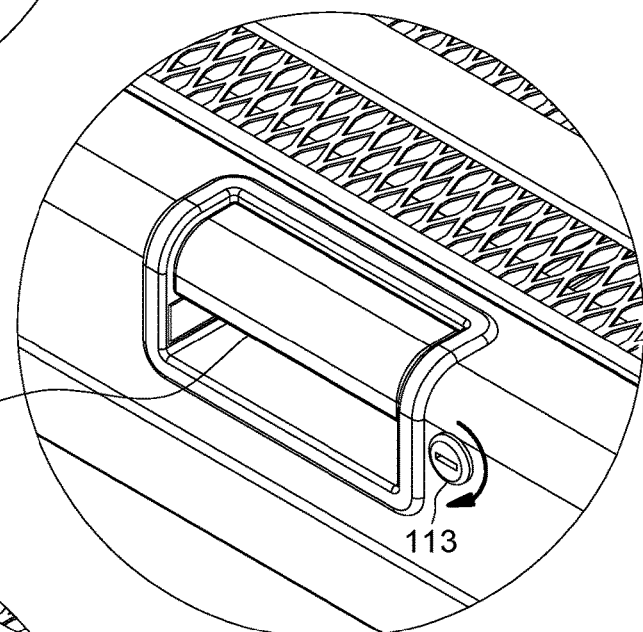
Figure 41C:
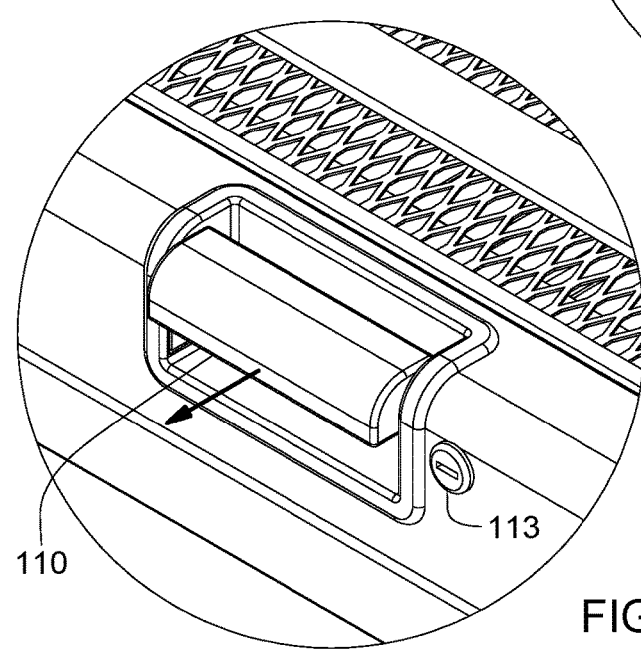

FIGS. 41A-41C show another alternative embodiment of the cart 100 with the secure coupling lock release lever assembly 110 having an associated key lock 113 to prevent the secure coupling lock release lever 111 from leaving a locked position when the key lock 113 is also locked. This will provide security to prevent someone from taking the cart 100 without permission. The secure coupling lock release lever assembly 110 shown in FIG. 41A is key locked and secure coupling lock release lever assembly 110 locked. FIG. 41B is key unlocked and secure coupling lock release lever assembly 110 unlocked. FIG. 41C is key unlocked and secure coupling lock release lever assembly 110 unlocked which would allow cart 100 to be removed from secure receiver 500.

Figure 42A:
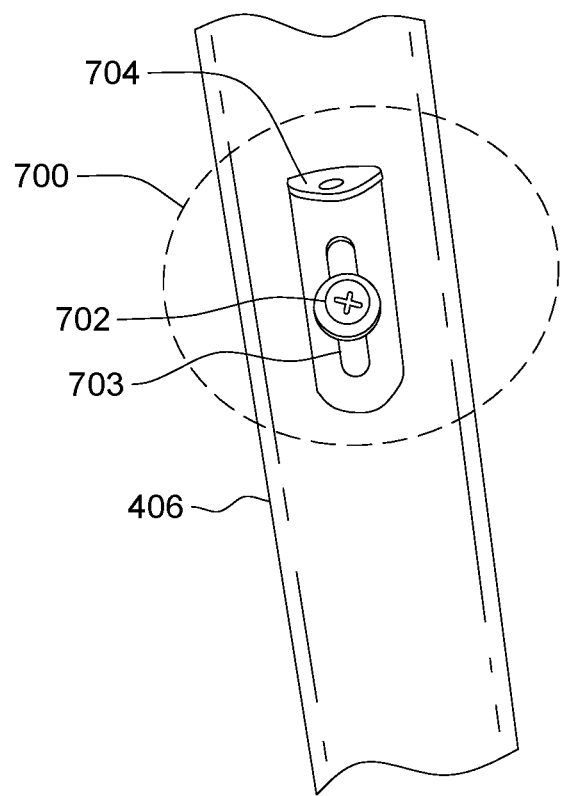
FIGS. 42A-42C shows an alternative embodiment of the secure receiver 500 with a sliding shim 700 attached directly to the load bar extender 406.
Figure 42B:
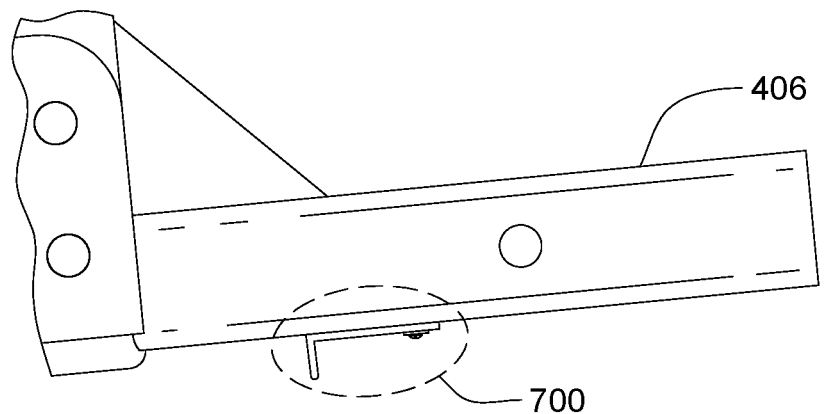
Figure 42C:
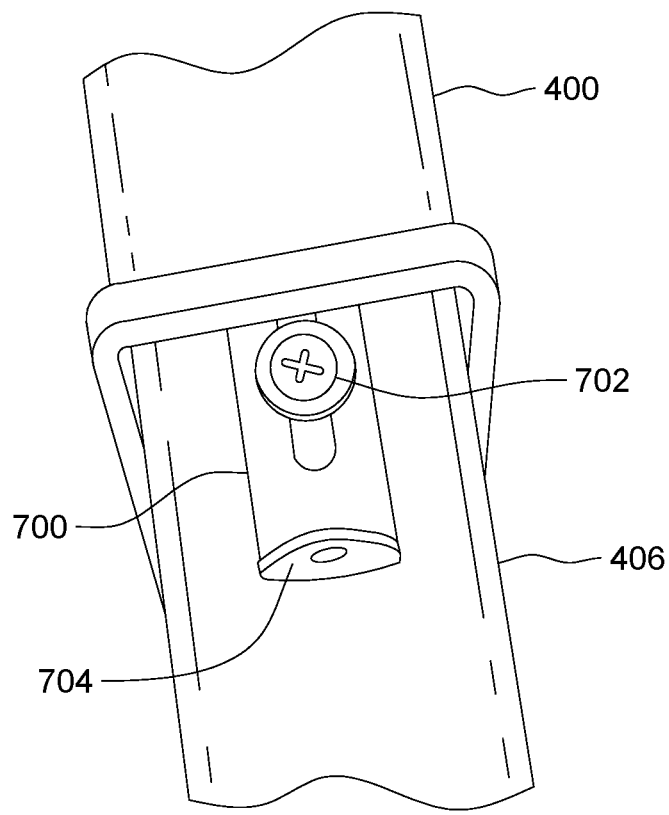

FIGS. 42A-42C shows an alternative embodiment of the secure receiver 500 with a sliding shim 700 attached directly to the load bar extender 406 (see FIGS. 17 and 18). As shown in FIG. 42A the sliding or rotational shim is attached to the load bar extender 406 through a fastener mechanism 702 such as a screw (as shown) or a rivet, or similar. FIG. 42B is a side view of the shim 700 mounted on the load bar extender 406. Sliding and rotating shim 700 adds rigidity and prevents wobbling of the secure receiver 500 and therefore the cart 100 when it is attached to a vehicle 404. Sliding and rotating shim 700 is capable of sliding back and forth along shim slot 703 or rotating about its fastener to conveniently insert or remove to and from a vehicle mounted hitch receiver 400 (see FIG. 15) to take up tolerance gap between the mating parts and minimize unwanted play or wobble. Shim grip 704 allows for easy hand location and moving of the sliding and rotating shim 700 into the gap between the mating surfaces of the load bar extender 406 and the hitch receiver 400. FIG. 42C is a bottom view of sliding and rotating shim 700 inserted between the load bar extender 406 and hitch receiver 400.

Figure 43:
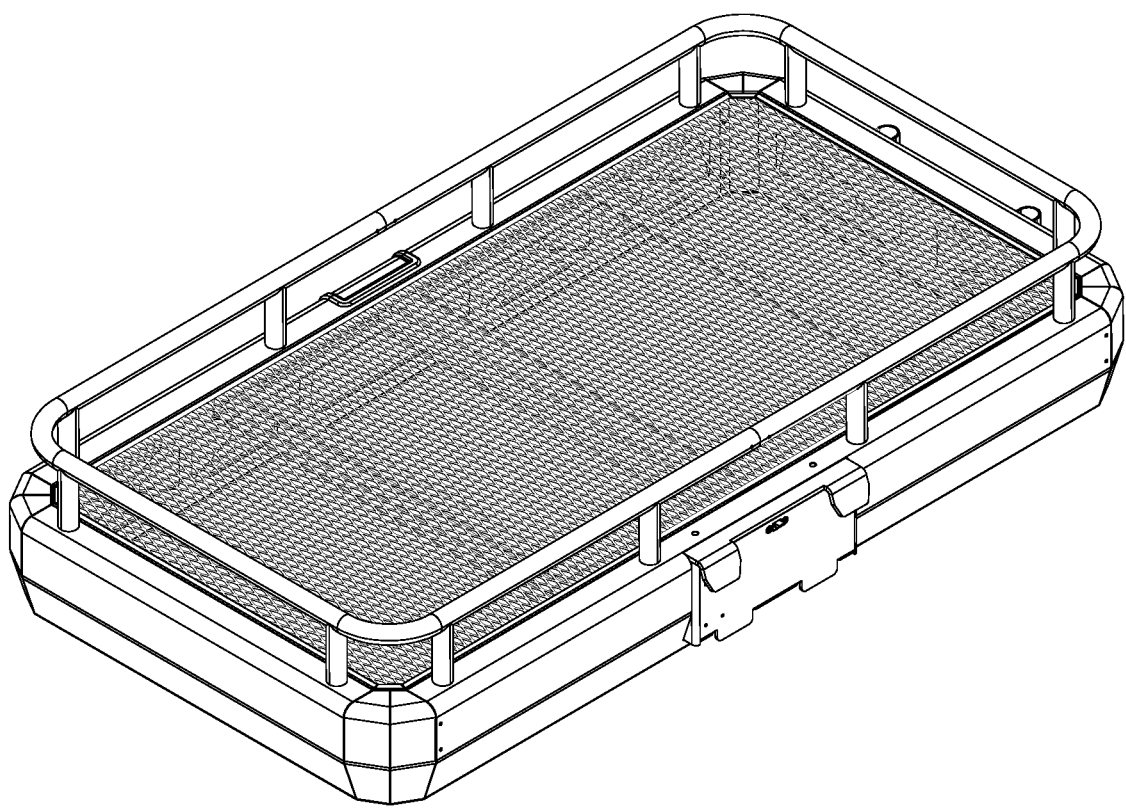
FIG. 43 shows another alternative embodiment of the cart 100 which operates through manual lift on and off of the cart 100 and mount secure coupling 140 to the secure receiver 500.
Figure 44A:
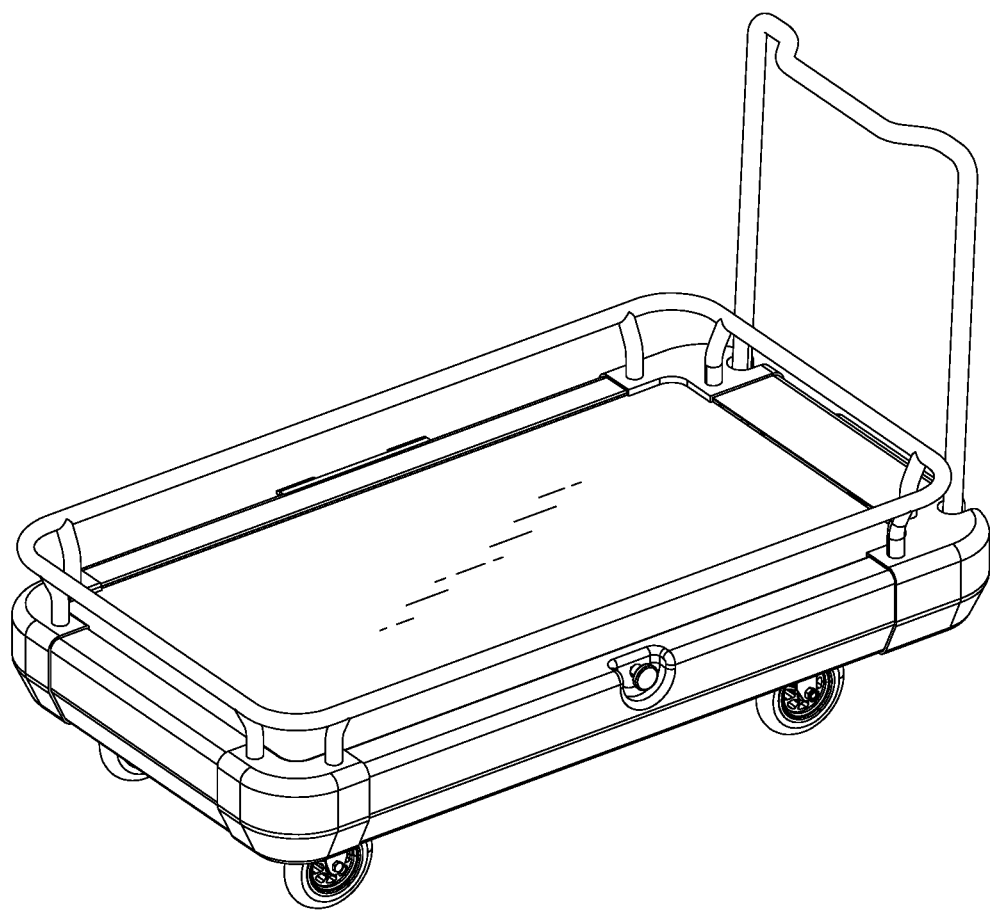
FIG. 44A-44E show an alternative embodiment of the cart with manual wheel folding.
Figure 44B:
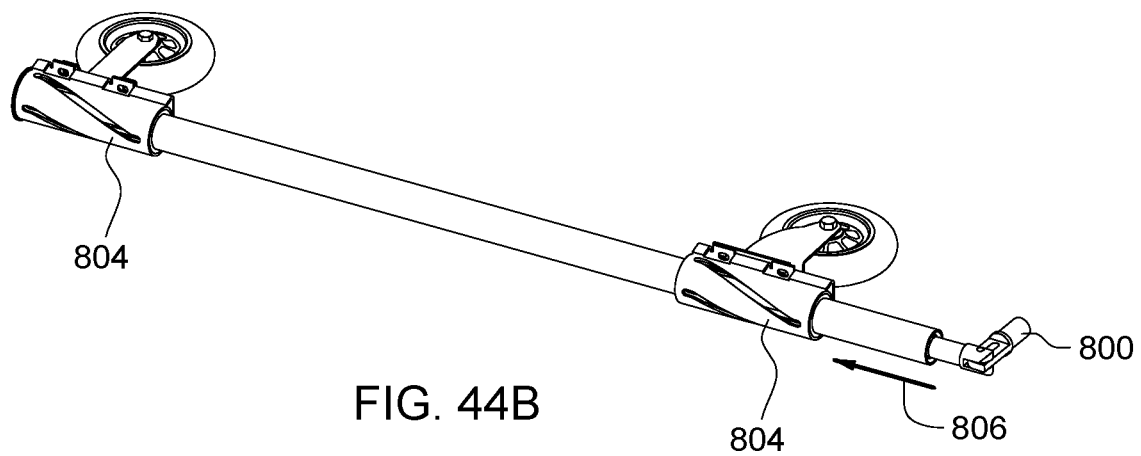
Figure 44C:
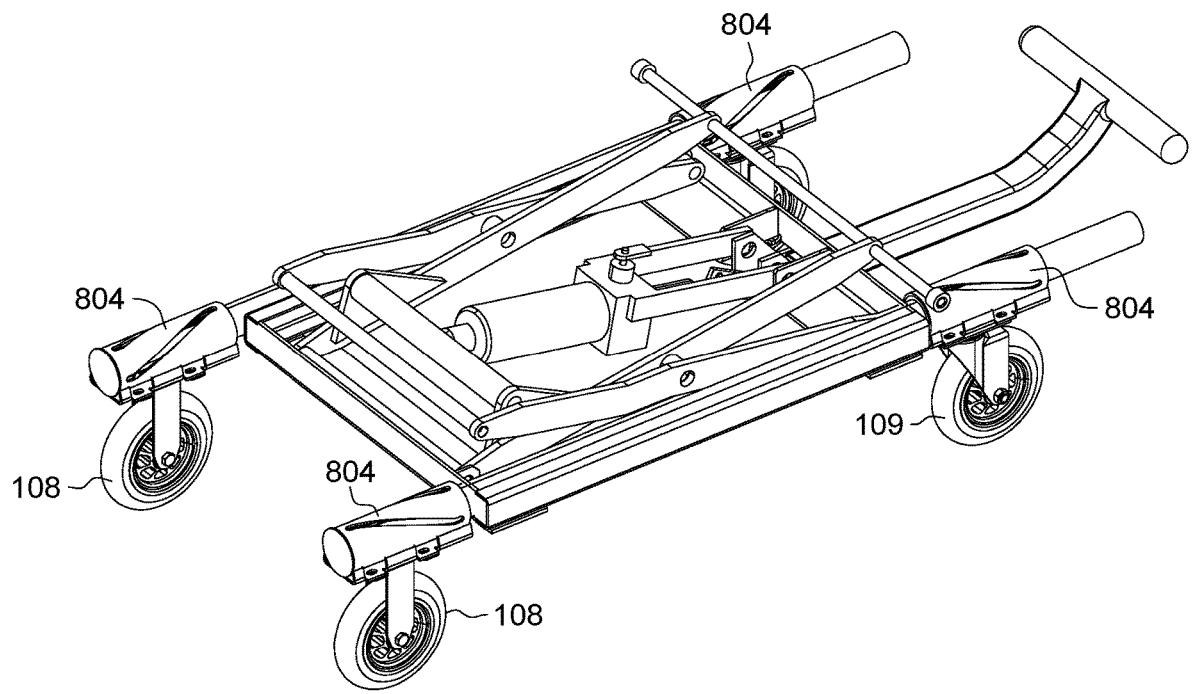
Figure 44D:
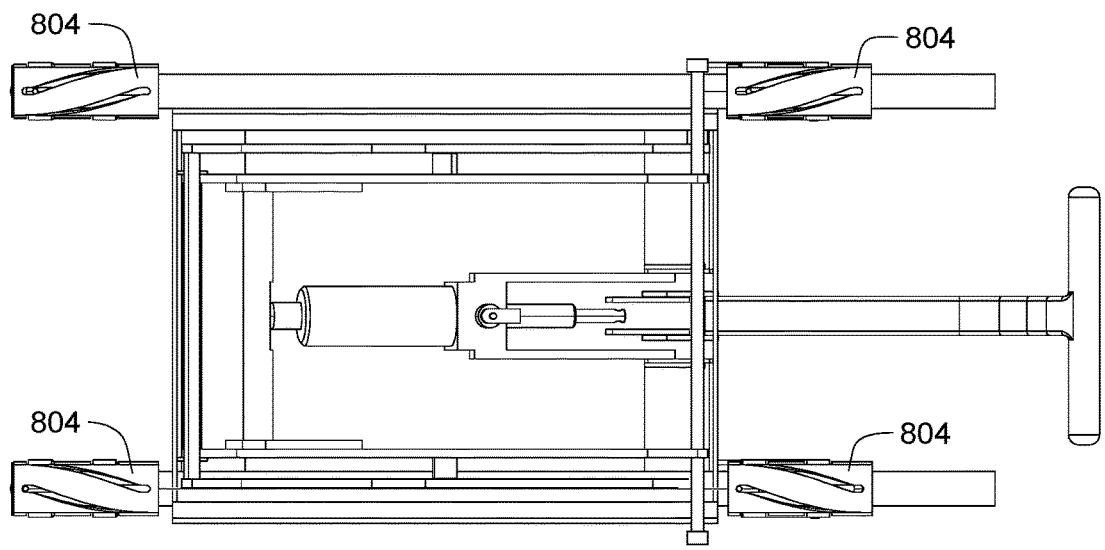
Figure 44E:
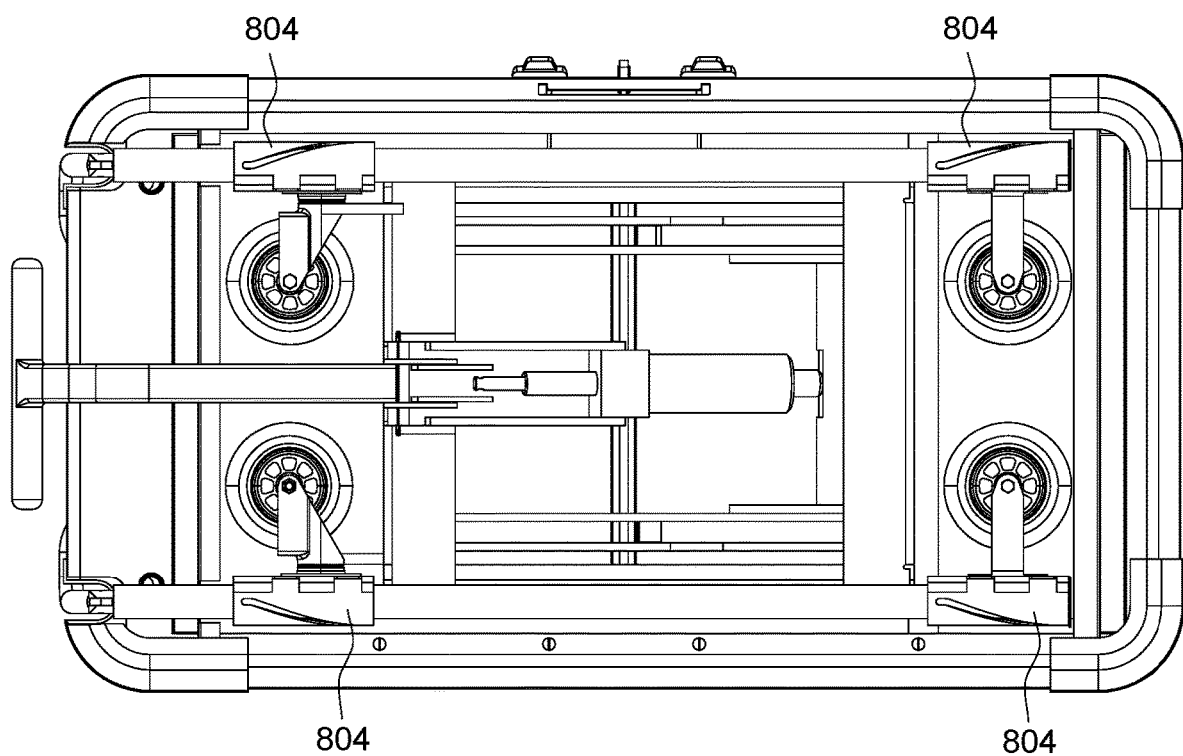
Figure 45A:
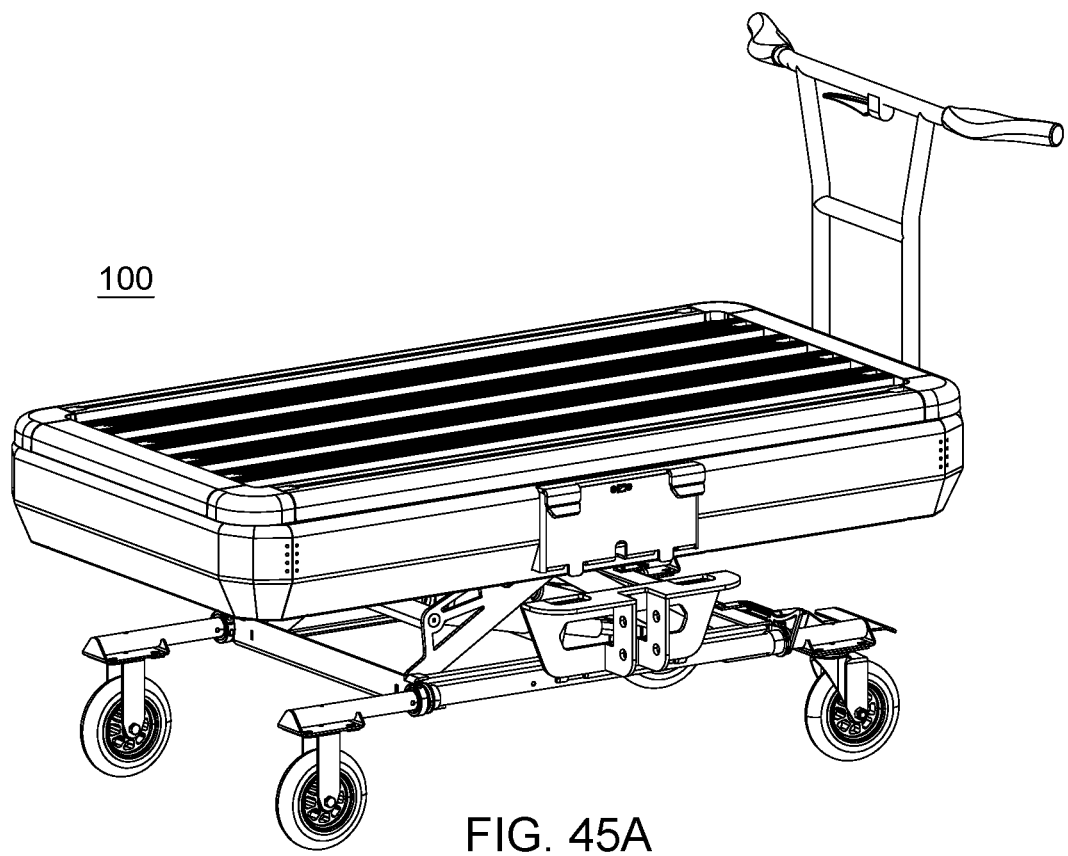
FIGS. 45A-45C illustrate an alternative embodiment of the cart 100 showing the top deck assembly 106 having a bicycle deck 123 configured to carry a load of bicycles.
Figure 45B:
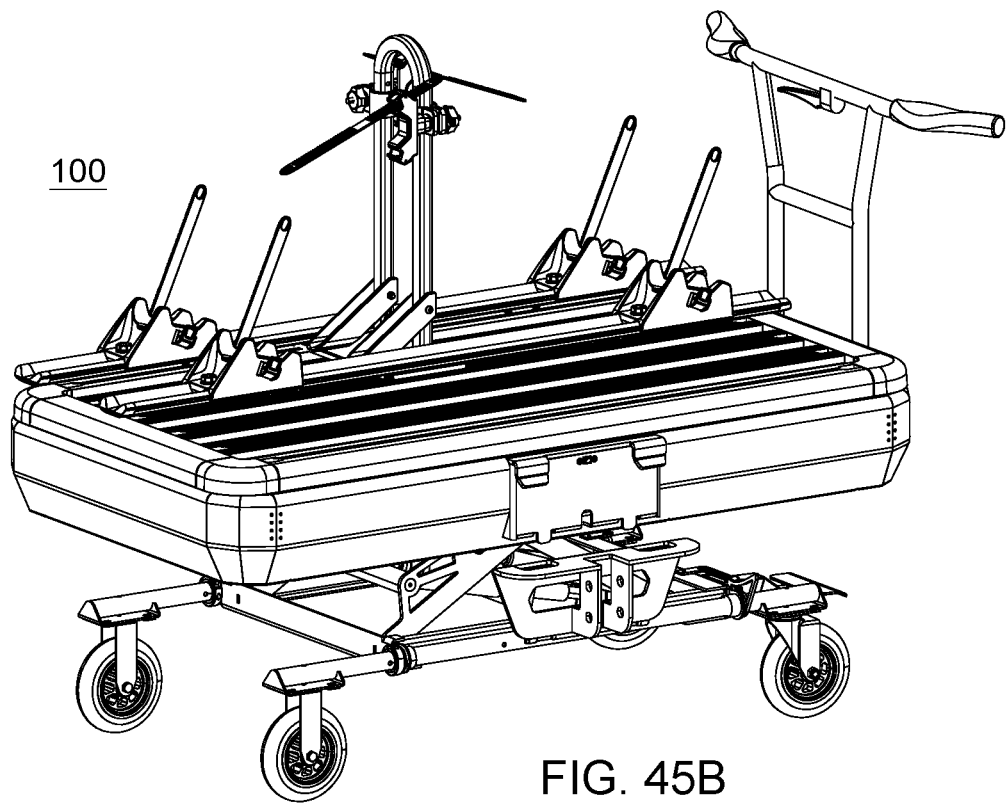
Figure 45C:
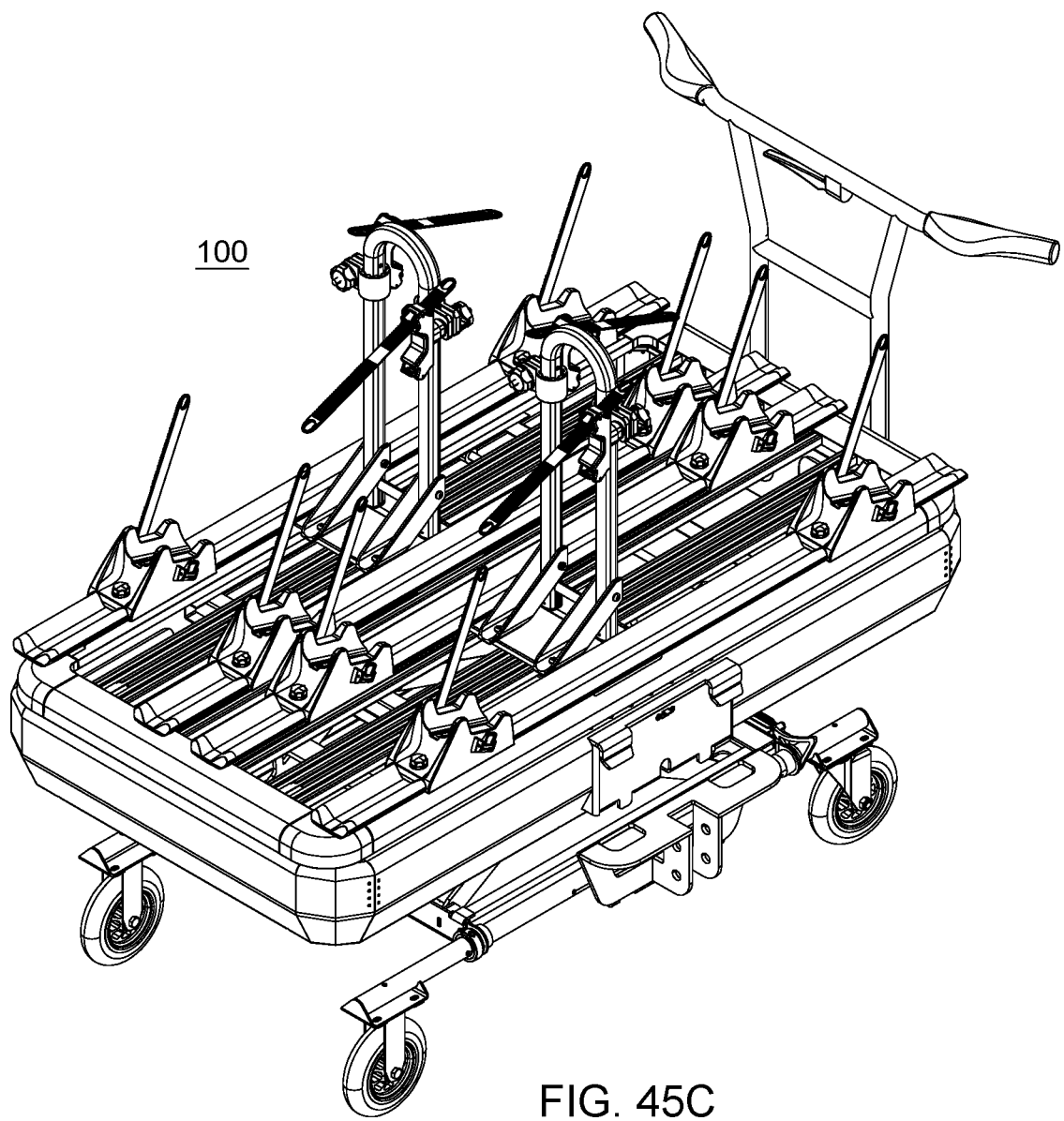

FIG. 43 shows another alternative embodiment of the cart 100 which operates through manual lift on and off of the cart 100 and mount secure coupling 140 to the secure receiver 500. The coupling of the mount secure coupling 140 to the secure receiver 500 is accomplished in the same way as described above but without the assistance of the hydraulic cylinder pump or linear actuator. In this embodiment, the top deck assembly 106 is manually maneuvered into place by an operator (or a plurality of operators depending on the weight of the load). This alternative embodiment of the cart 100 is lower cost and lighter weight, and may or may not have wheels FIG. 44A-44E show another alternative embodiment of the cart with manual wheel (108, 109) folding. Fold down handle 800 is capable of being unlatched and dropped down approximately ninety degrees until in line with a pair of nesting tubes 802. Pins attached to the fold down handle 800 and protruding through nesting tube 802 will travel along a spiral barrel cam mechanism 804 cut into the wheel mounts. As the fold down handle 800 is pushed in, the travel of the pins through the spiral groove of the barrel cam will cause the nesting tube 802 and attached wheel mounts to rotate thereby causing the wheels to fold up. Arrow 806 in FIG. 44B shows fold down and push in fold down handle 800 into nesting tubes 802. FIG. 44C is a perspective view. FIG. 44D is a top view of undercarriage assembly showing barrel cams and nesting tubes. FIG. 44E shows fold down handle pushed in and wheels 108, 109 folded up. [0084] FIGS. 45A-45C illustrate an alternative embodiment of the cart 100 showing the top deck assembly 106 having a bicycle deck 123 configured to carry a load of bicycles. This embodiment has the ability to mount and/or attach many accessories including cargo boxes, bike racks, ski containers, and the like. Attachment mechanisms would include thumb screws, lever locks, quick release latches and the like. FIGS. 45B and 45C show a universal dock surface with attachment mechanisms like grooves, t-slots, contours. Also, along perimeter surface of frame of cart 100. Combinations of accessories possible such as boxes, containers and racks, baskets, and the like.

Figure 46A:
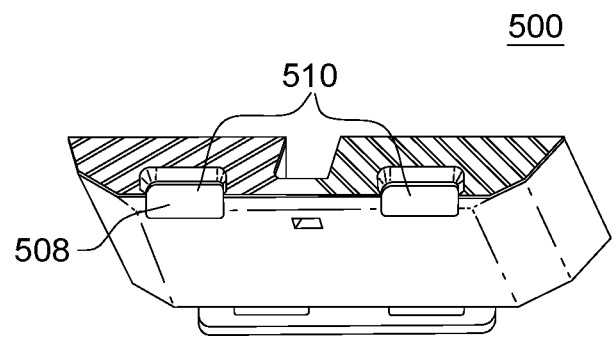
FIGS. 46A to 46B show an alternative embodiment of the secure receiver 500 having different configurations.
Figure 46B:
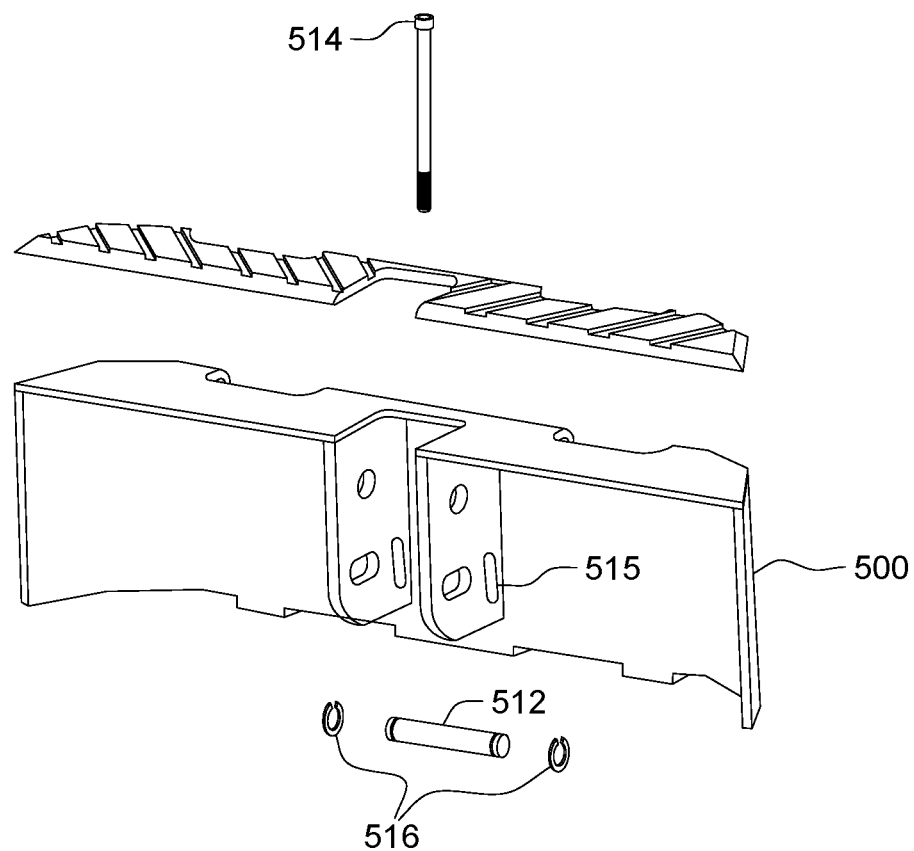

FIGS. 46A to 46B show an alternative embodiment of the secure receiver 500 having a different configuration. In FIG. 46A, a round bar element 510 at upper tine retention slots 508 functions to improve self alignment of mount secure coupling top tines 144 when coupling (i.e., upon descent of top deck assembly 106). This also results in reduction of friction and better engagement seating for the mount secure coupling 140 upon mounting of the cart 100. FIG. 46B illustrates a leveling pin 512 with self contained leveling adjustment roller 512 and set screw 514. Set screw 514 is threaded into leveling adjustment roller 512 which is retained in angled adjustment slot 515 by retention snap rings 516 or similar shoulder bolt and cotter pin. When the secure receiver 500 is fastened to a load bar extender 406 the set screw 514 can be tightened which will draw the leveling adjustment roller 512 upward following the path of the angled slot 151 and along the face of the load bar to take up tolerance between the fasteners and the fastener holes in both the secure receiver 500 and the load bar extender 406 to effectively rotate the secure receiver 500 to level and plumb.

Figure 47A:
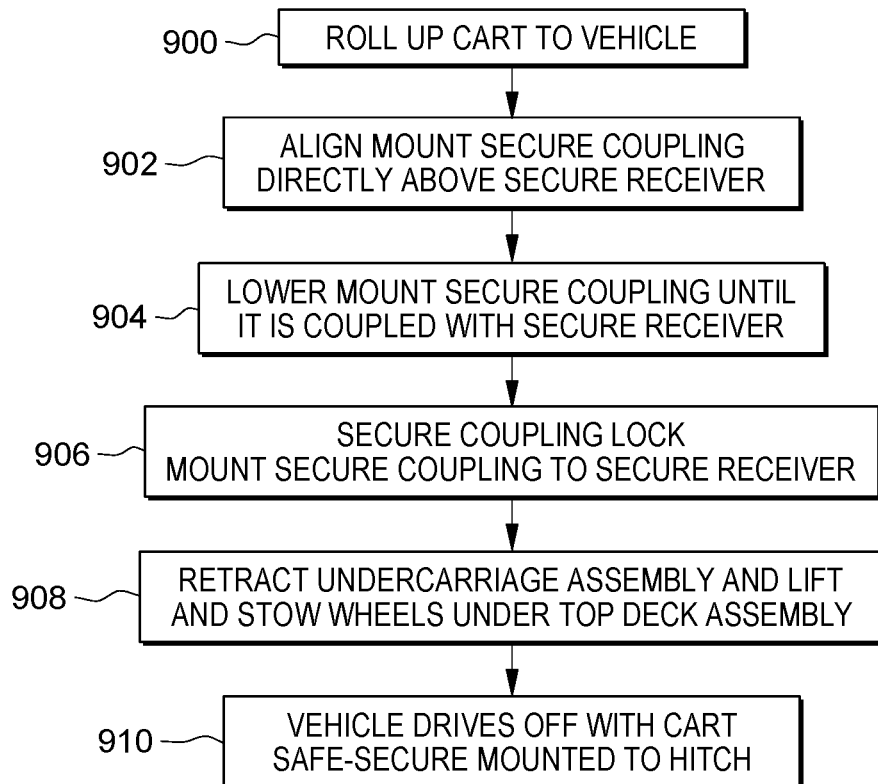
FIG. 47A is a flowchart outlining the method of mounting the cart 100 to a vehicle and FIG. 47B is a flowchart outlining the method of demounting the cart 100 from a vehicle.

FIG. 47A is a flowchart outlining the method of mounting the cart 100 to a vehicle. In step 900, the cart 100 is rolled up to the vehicle. In step 902, the mount secure coupling 140 is aligned directly above the secure receiver 500. In step 904, the mount secure coupling 140 is lowered onto the secure receiver 500 by the hydraulic cylinder pump 150, linear actuator 600 or manually by the operator (depending on the embodiment). In step 906, the undercarriage assembly 107 is retracted along with the wheels 108, 108 which are stowed under the top deck assembly 106. In step 908, the mount secure coupling 140 is locked to the secure receiver 500. In step 910, the vehicle drives off with the cart 100 acting as a carrier.

Figure 47B:
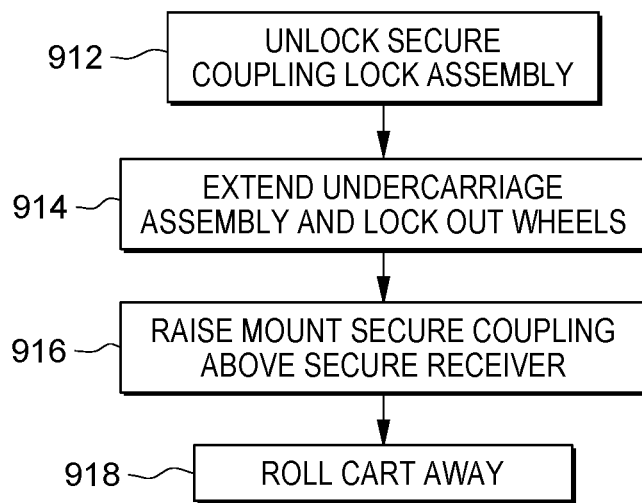

FIG. 47B is a flowchart outlining the method of demounting the cart 100 from a vehicle. In step 912, the secure coupling lock release lever assembly 110 is unlocked by the operator. In step 914, the undercarriage assembly 107 is extended and the wheels 108, 109 are unlocked. In step 916, the mount secure coupling 140 is raised above the secure receiver 500 by the hydraulic cylinder pump 150, linear actuator 600 or manually by the operator (again depending on the embodiment). In step 918, the cart is rolled way by the operator.

Advantages of all or some the embodiments disclosed herein include the following. First, there is ease of use since the attachment of the cart 100 allows for secure receiver coupling and clearance without lifting for any height receiver or ground terrain. Second, there is no vehicle tailgate obstruction when not in use. Third, there is no need to fold up since the operator can simply take off and roll away and utilize away and unattached from the vehicle unlike current available rooftop or secure receiver mounted baskets or cargo boxes. Fourth, the cart 100 is easy to store when not in use.

Loads 120 carried by the cart 100 may include grills, coolers, tool chests, workbench, and the like and also serve in the capacity of a lift table and work surface.

Figure 48A:
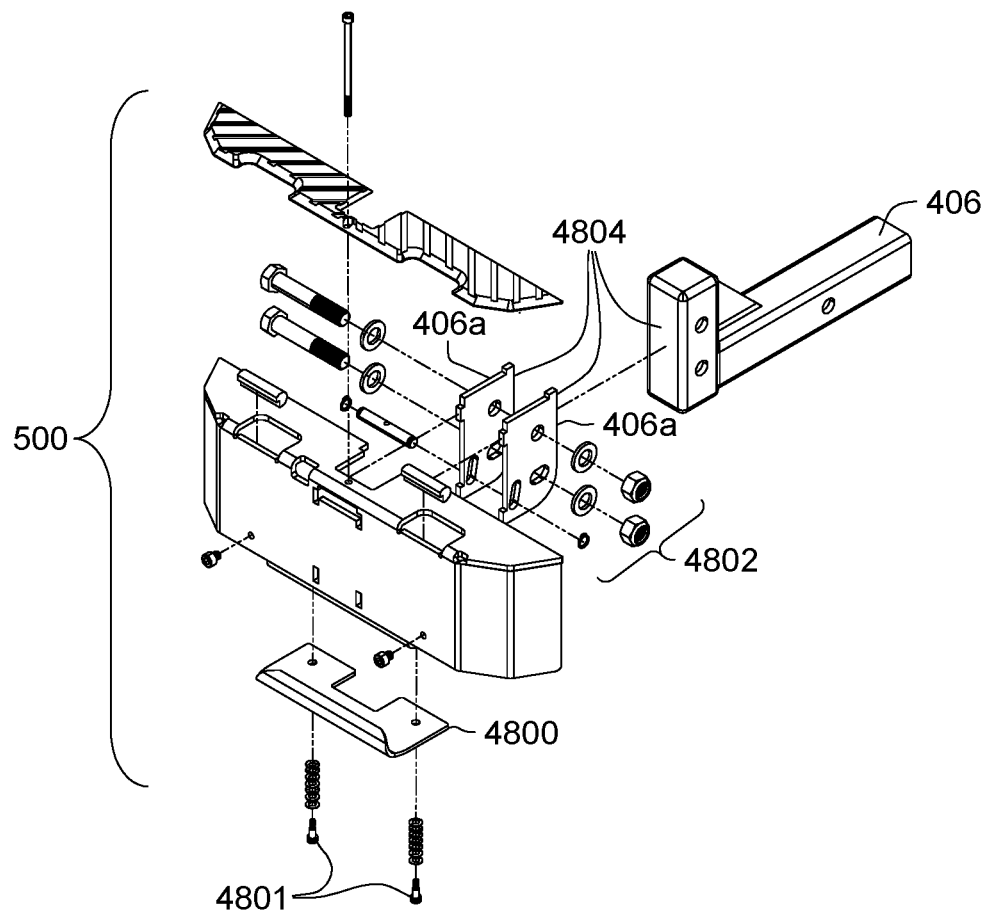
FIGS. 48A-48D show a view of an alternative embodiment of the secure receiver 500 with a spring-loaded lower tine capture slot latch 4800 attached to the bottom of the secure receiver 500 for attachment to a vehicle 404.
Figure 48B:
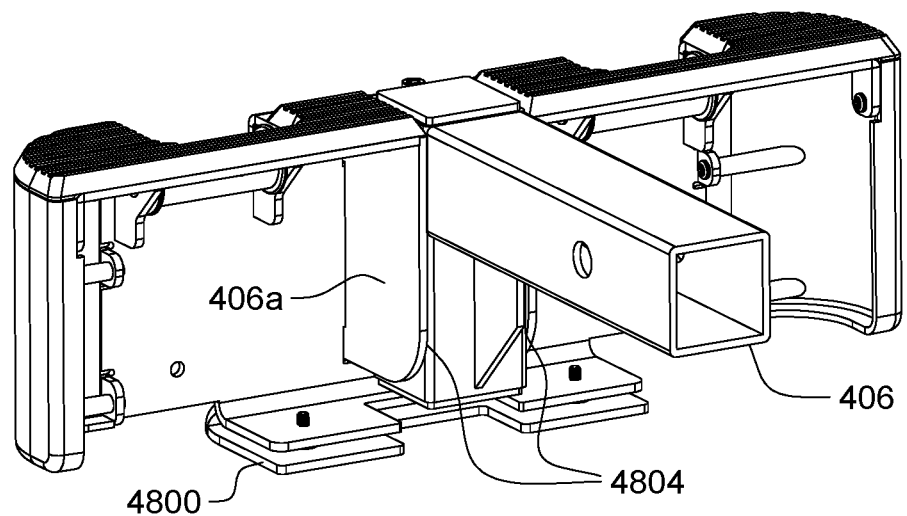
Figure 48C:
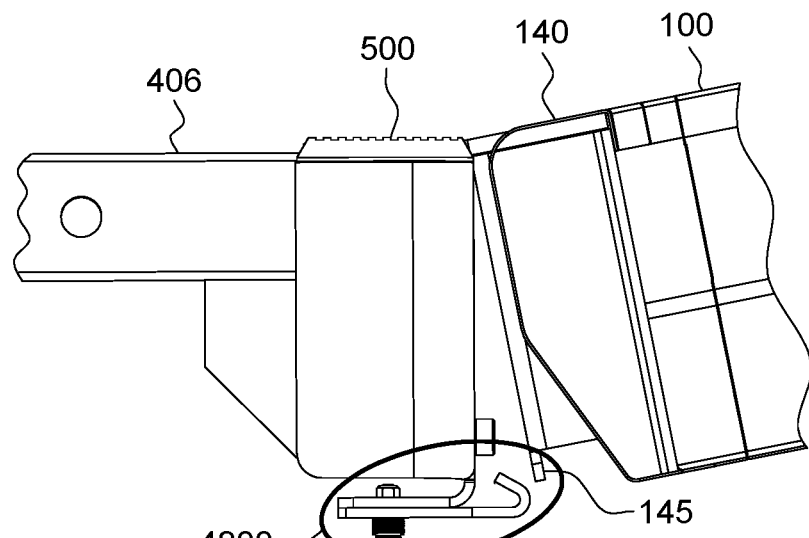
Figure 48D:
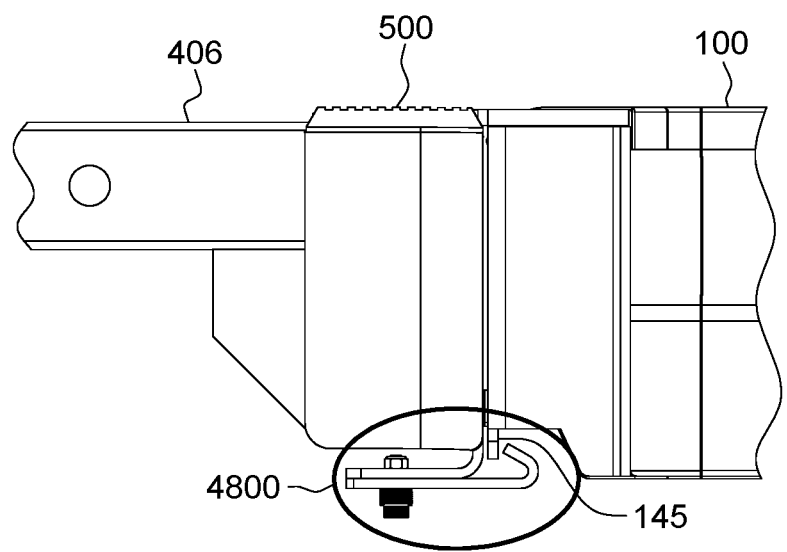

FIGS. 48A-48D show a view of an alternative embodiment of the secure receiver 500. FIG. 48A shows an exploded view of the secure receiver 500 with a spring-loaded lower tine capture slot latch 4800 (or spring-loaded lower tine latch) attached to the bottom of the secure receiver 500 by spring assembly 4801. The secure receiver 500 is mounted on the load bar adjustable extender 406 of vehicle 404. In this embodiment, load bar elements 406a could be bolted together as indicated by reference 4802. In addition, the load bar 406 could be welded to the load bar elements 406a at a plurality of points with the secure receiver 500 as indicated by reference 4804 as shown in FIG. 48B. FIGS. 22A-22C show the previously discussed attachment method of the mount secure coupling 140 which descends onto the secure receiver 500. As shown in FIGS. 48A-48C, the spring-loaded lower tine capture slot latch 4800 is a spring-loaded capture slot and has been added to secure receiver 500. This spring-loaded lower tine capture slot latch 4800 aids in mounting and coupling with the mount secure coupling 144 by utilizing the flex of the spring assembly 4801 to capture the lower tine or plurality of tines 145 of the mount secure coupling plate 142 of the mount secure coupling 140 (as shown in FIG. 10). The spring-loaded lower tine capture slot latch 4800 is more tolerant of misalignment due to different approach angles or height which makes self-alignment and capture of the lower tine 145 easier. Upon contact with the lower tines 145, the spring-loaded lower tine capture slot latch 4800 deflects down while the lower tines 145 slide over the top and into position whereby the spring assembly 4801 returns the spring-loaded lower tine capture slot latch to home position capturing and securing the lower tines 145 in place. In an alternative embodiment, the lower "tine" is on the secure receiver 500, and the spring loaded tine capture slot is on the mount secure coupling side. In this embodiment, the spring loaded tine capture and secure coupling lock assembly are combined into a singular mechanism to be able to decouple as shown FIGS. 48F and 48G.

Figure 48E:
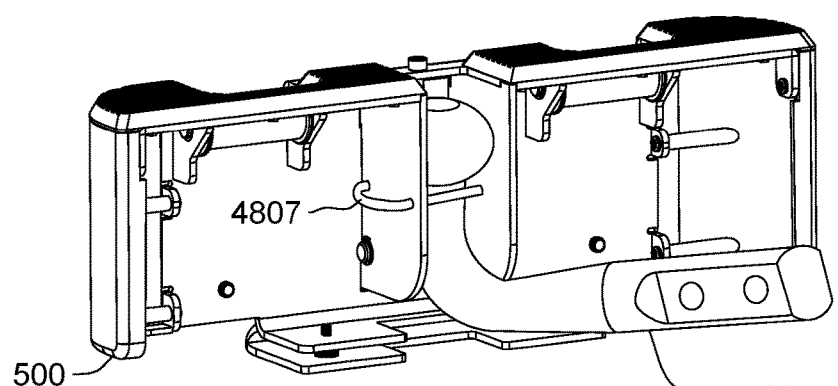
FIG. 48E shows an alternatively shaped load bar 406 in the form of a ball hitch 4806.
Figure 48F:
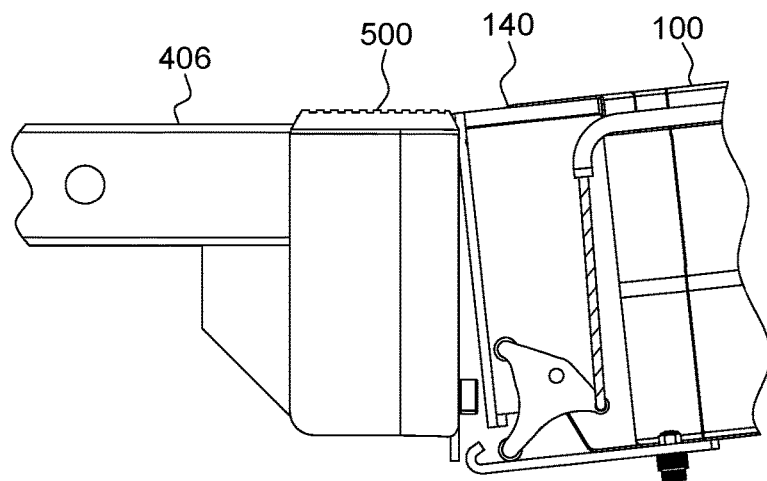
FIGS. 48F and 48G show a singular mechanism.
Figure 48G:
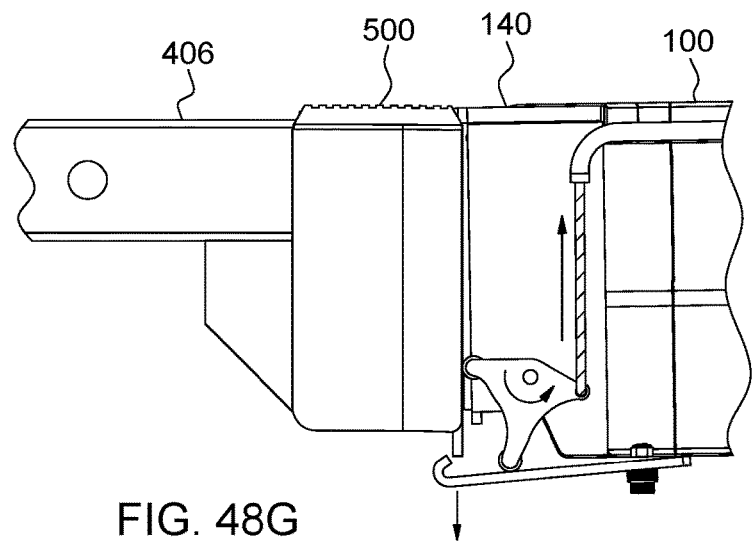

FIG. 48E shows an alternatively shaped extender 406 in the form of a ball hitch 4806. The secure receiver 500 attaches to the ball hitch 4806 in a manner similar to the attachment to the extender 406 but and in a similar secure manner (e.g., u-bolt clamp 4807).

Figure 49A:
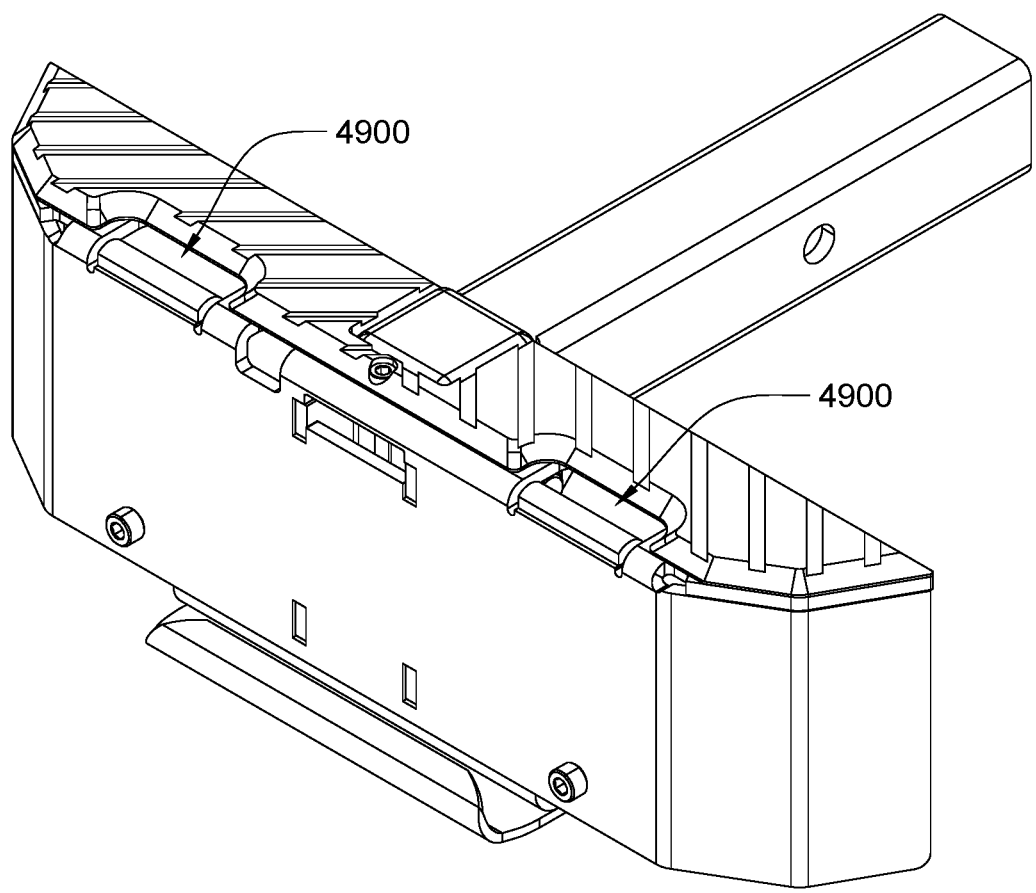
FIGS. 49A-49E show different view of alternative embodiments of the secure receiver with radiused upper tine slots from cut and bent over manufacturing process for lower costs (49A) and rollers in upper tine openings and on face (49B).

FIG. 49A shows another alternative embodiment to the upper tine retention slots (or slot) 508 of secure receiver 500 of FIG. 16. In FIG. 49A a secure receiver is shown with upper tine slots from a cut or stamped and bent over manufacturing process to obtain lower costs. The secure receiver 500 is modified with rolled over upper tine retention slots (or slots or openings) 4900. Also, this process and configuration creates the radiused edge of the upper tine retention slots 4900 from cutting slots and rolling the material down behind the facing. This eliminates need for separate attachment of round bar stock to create the radius edge for aiding mounting and coupling with the upper tines 144 of the mount secure coupling 140 of the cart 100 (as shown in FIG. 10).

Figure 49B:
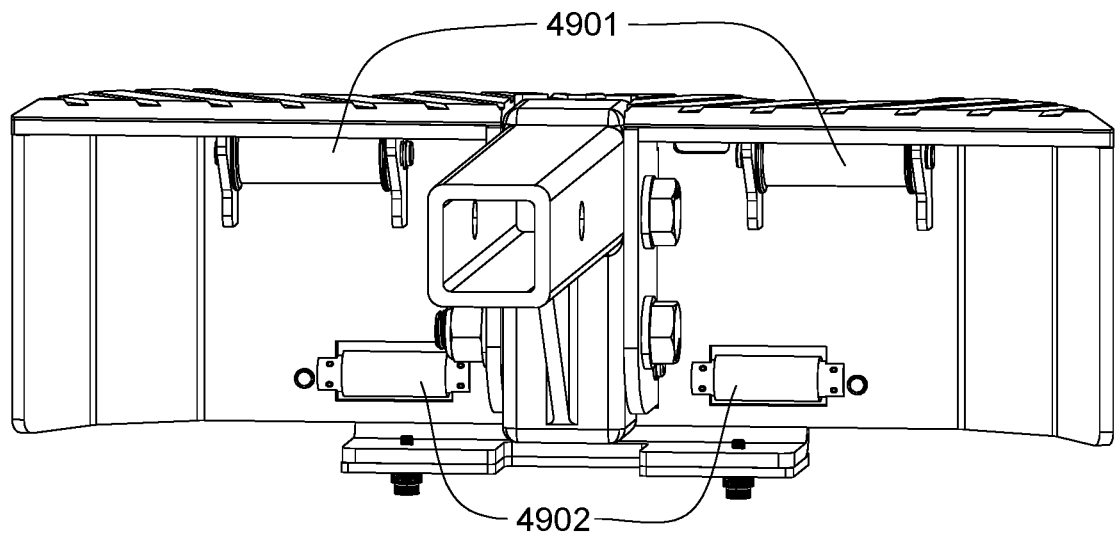
Figure 49C:
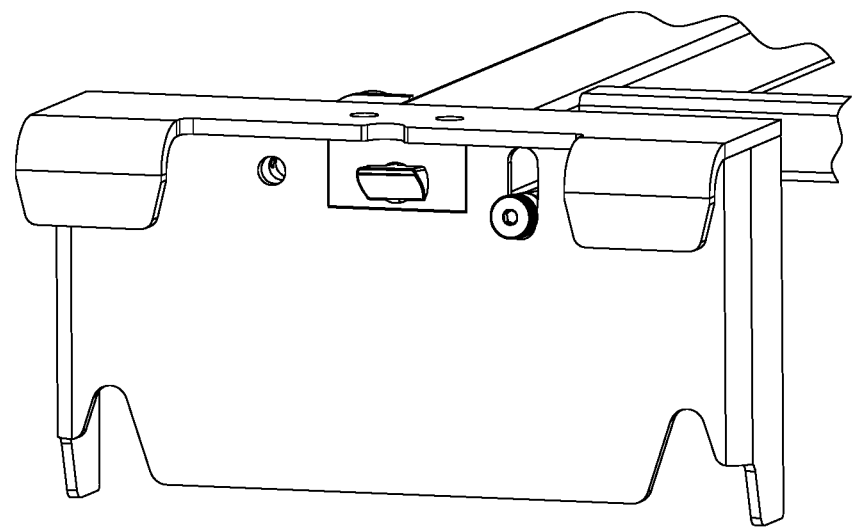
Figure 49D:
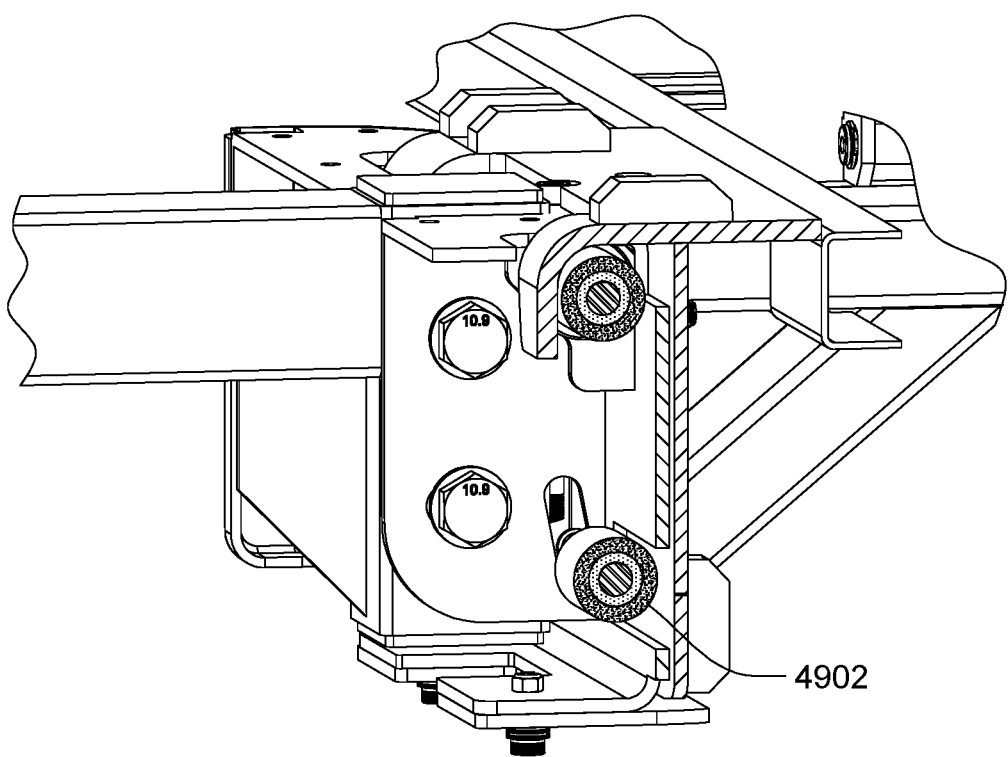
Figure 49E:
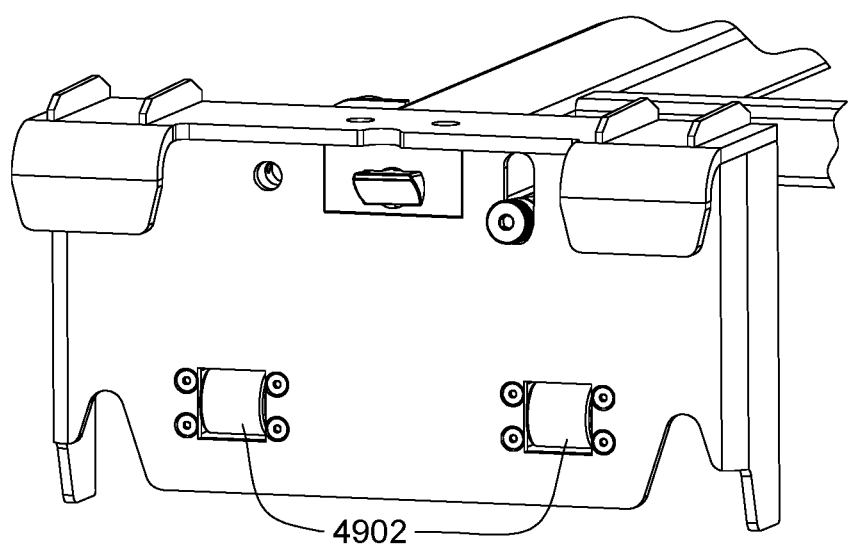
Figure 50A:
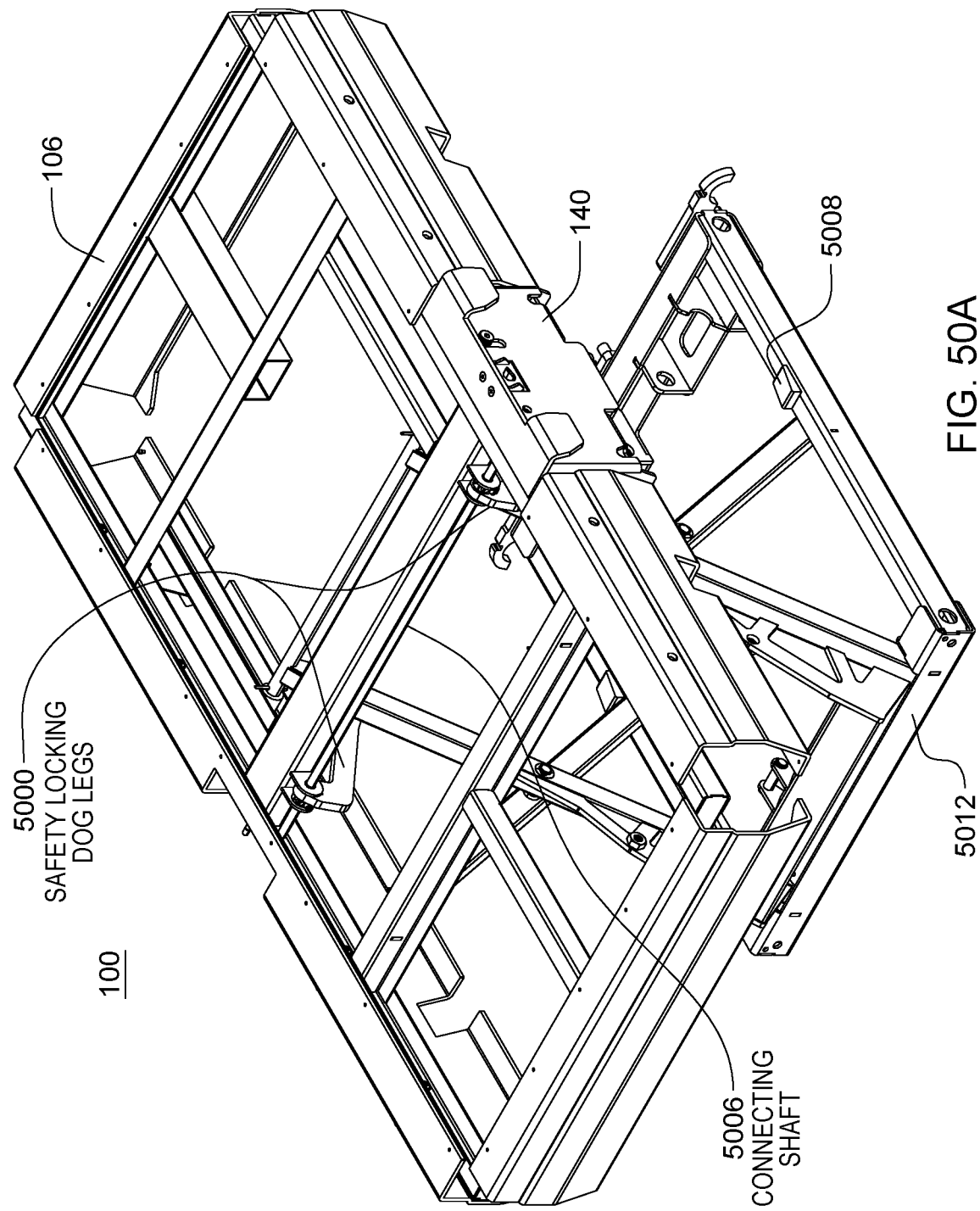
Figure 50C:
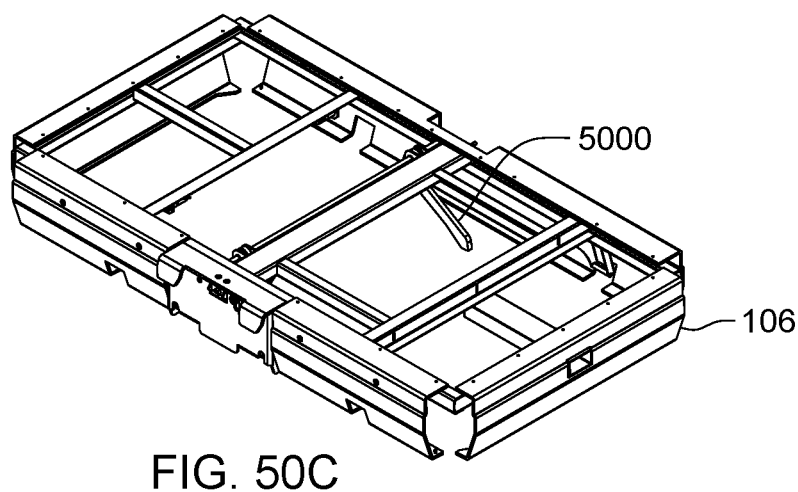
Figure 50D:
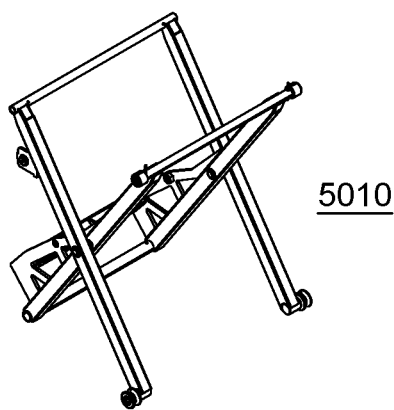
Figure 50E:
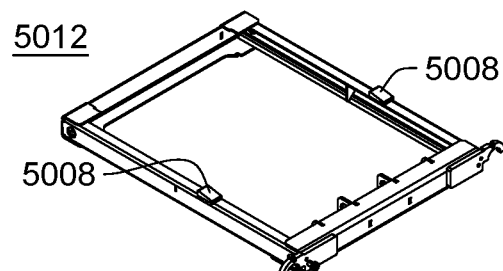
Figure 50F:
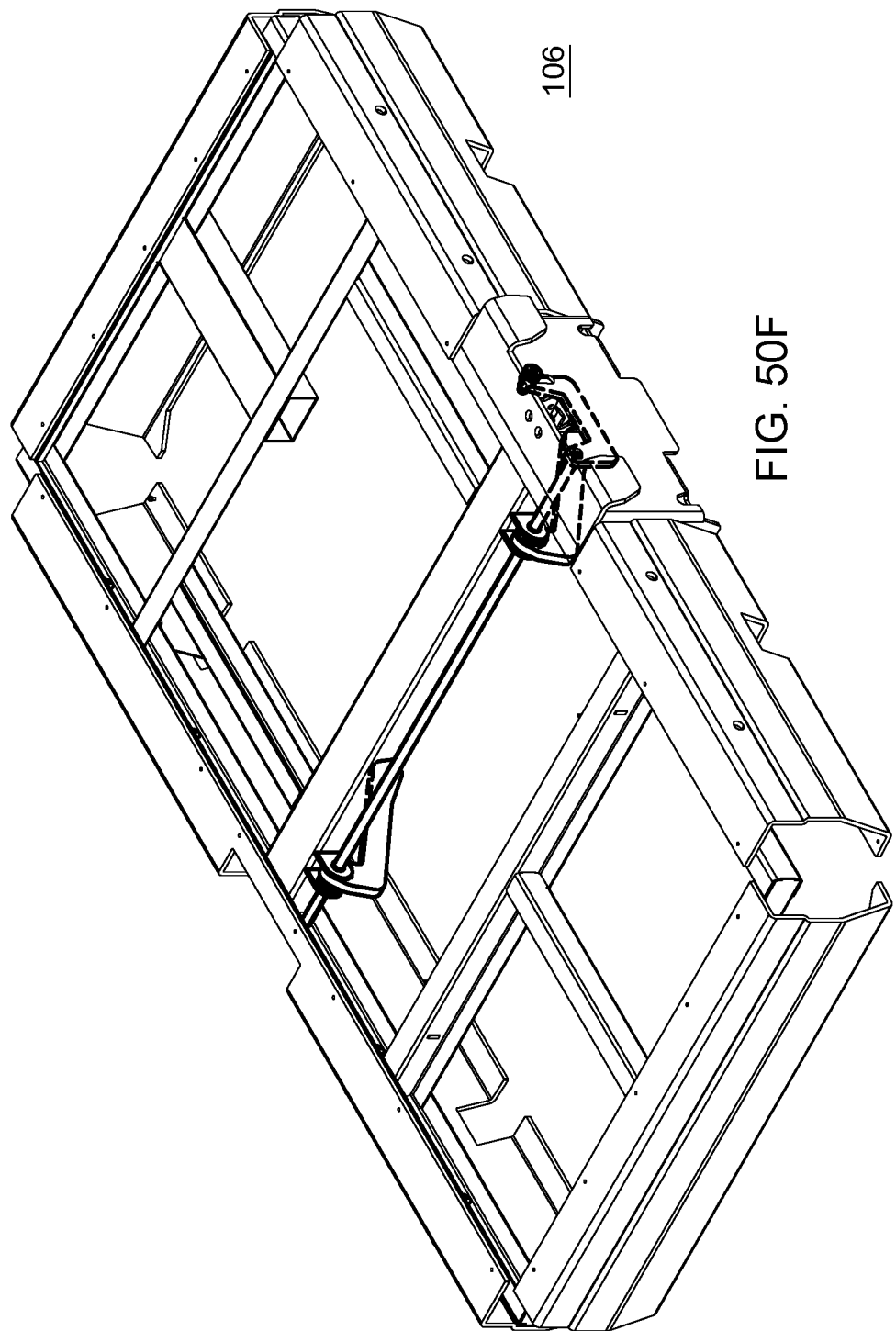
Figure 50G:
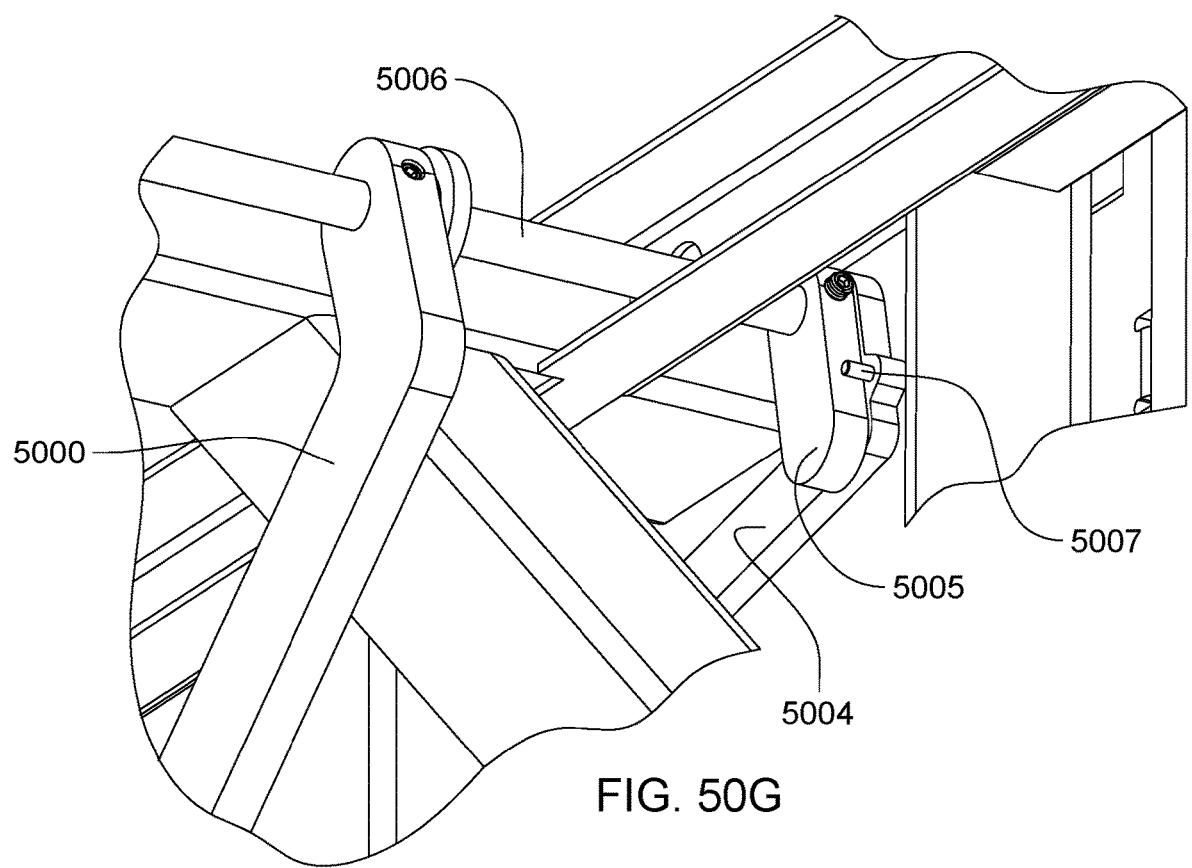
Figure 50H:
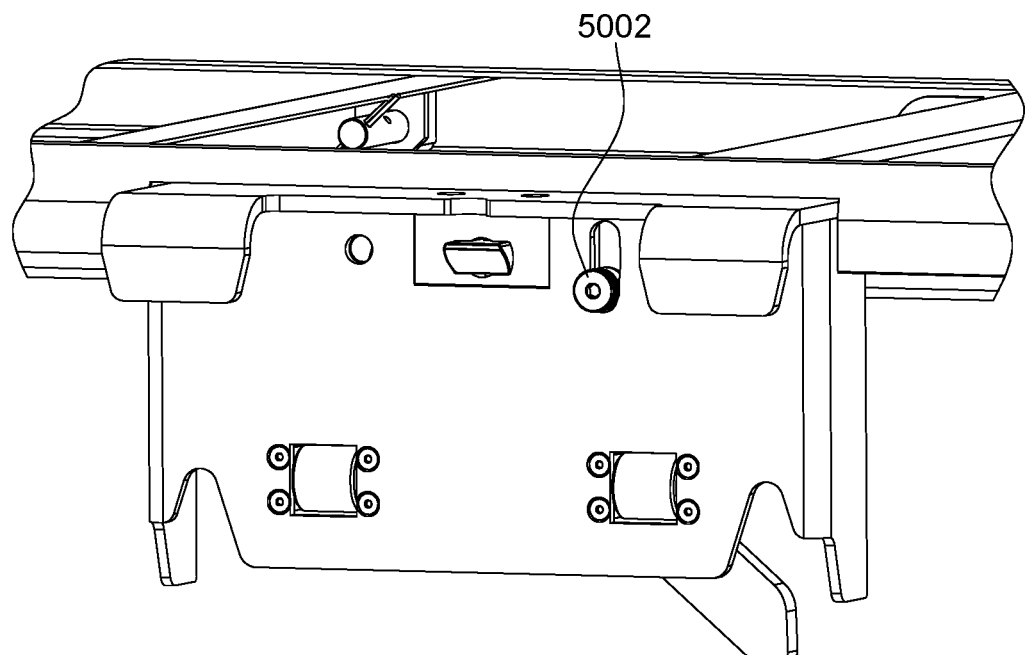
Figure 50I:
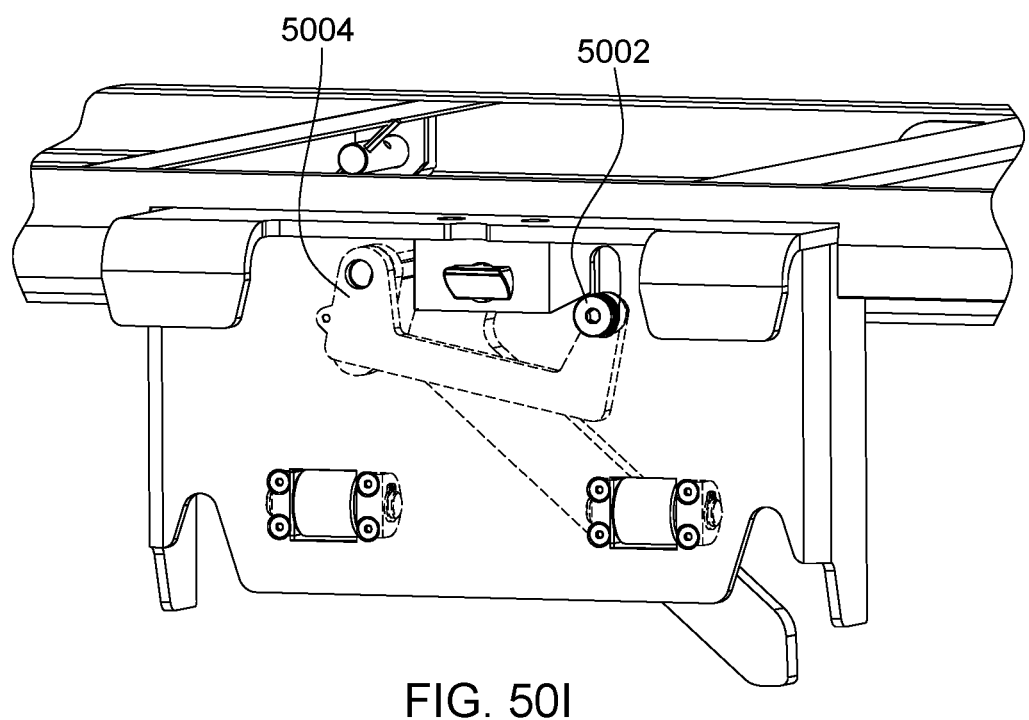

FIG. 49B-49E show different perspective views of tine rollers 4901 and face rollers 4902 assembled into a secure receiver to reduce friction forces and make coupling and uncoupling easier. FIG. 49B shows a pair of tine rollers 4901 added to the upper tine slots and face rollers 4902 to the lower face section of the receiver itself. FIG. 49C illustrates a corresponding mount secure male coupler. FIG. 49D shows a fully mated assembly (i.e. mount secure coupler 140 and secure receiver 500). FIG. 49E shows an alternative embodiment with the face rollers 4902 on the coupler side FIGS. 50A-50I illustrate another embodiment with a safety mechanism to prevent the top deck assembly 106 (FIG. 1) from lowering too much and causing an inadvertent collapse of the undercarriage assembly 107 (FIG. 1) when raising and lowering the top deck 106 while the cart 100 is independently mobile and not attached to the secure receiver 500. FIG. 50B shows an exploded view of top deck 106. The major elements that make up the safety mechanism include the top deck assembly 106 (FIG. 50C), the scissor assembly 5010 (FIG. 50D) and the sub-frame 5012 (FIG. 50E). The top deck assembly 106 and the sub-frame 5012 are connected together by the scissor assembly 5010 which consists of both scissor arm pairs 152,154 (FIG. 12). This could be a single stage scissor assembly (shown) or also be a multi-stage (or multi-tier) scissor assembly consisting of multiple arm pairs. The safety mechanism is mainly installed on the top deck assembly as shown in FIG. 50F. Referring to FIGS. 50C-50E, safety locking dog legs (also known as offset angle support legs, or other shape) 5000 have been added to the cart 100 to act as a trip device in order to enable a new axle unlock method. The principal components are the safety locking dog legs 5000 (FIG. 50B), deflector lever 5004 (FIG. 50I) (e.g., a deflector lever shape), safety actuation arm 5005 (FIG. 50G) and safety dog leg stops 5008 on the lower sub-frame 5012 (FIG. 50E). The safety locking dog legs 5000 are installed on a connecting shaft 5006 (FIG. 50G). FIG. 50G is a backside view of mount secure coupling 140 and shows how safety locking dog legs 5000 and safety actuation arm 5005 are attached directly to connecting shaft 5006 with set screws and move together. The safety locking dog legs 5000 will be deflected and rotated upward and out of the way only when the cart 100 is attached to the vehicle 404 by means of the mount secure coupling 140 and secure receiver 500. The secure receiver 500 could be attached to vehicles of all types including SUV's, trucks, all terrain vehicles (ATV's), farm equipment, watercraft, or even to fixed structures like a wall or pole. Upon descent of the mount secure coupling 140 onto the secure receiver 500, a safety trigger 5002 (as shown in FIGS. 50H and 50I) will be moved within a slot and will rotate deflector lever 5004 (FIG. 50I) about connecting shaft 5006 which acts as a pivot point. As shown in FIG. 50G a deflector lever pin 5007 extends from the interior side of deflector lever 5004 and makes contact with safety actuation arm 5005. When the safety trigger 5002 is moved, it is attached to and rotates the deflector lever 5004 which in turn pushes safety actuation arm 5005 through contact with deflector lever pin 5007. Deflector lever pin 5007 thus rotates safety actuation arm 5005, connecting shaft 5006 and the safety dog legs 5000 all upward to clear the safety dog leg stop plates 5008 and allow full retraction of scissor assembly 5010 and sub-frame 5012. As the scissor assembly 5010 continues to retract, the safety dog legs 5000 will continue to rotate upward, free of contact with deflector lever pin 5007 and allowing full stowing of sub-frame 5012. When the sub-frame 5012 is deployed for uncoupling from secure receiver 500, the safety dog legs 5000 drop back down by gravity and allow the actuation arm 5005 to come back in contact with deflector lever pin 5007.

There are at least two safety dog leg stop plates (or welds) 5008, one on each side of the lower sub-frame assembly 5012 (FIG. 50E). The safety dog leg stop plates 5008 function to block the safety locking dog leg 5000 so that the scissor assembly 5010 come to a positive stop and cannot lower further when the cart 100 is mobile and wheels 106, 108 are on the ground. When cart 100 is attached to the vehicle 404 by means of the secure receiver 500 the deflection of the safety trigger 5002 and actuation of the deflector lever 5004, safety actuation arm 5005, and rotating safety locking dog leg connecting shaft 5006 will deflect the safety dog legs over these "stops" 5008 and thus allowing the sub-frame/undercarriage assembly to retract fully and activate the axle rotation unlocking.

Figure 51A:
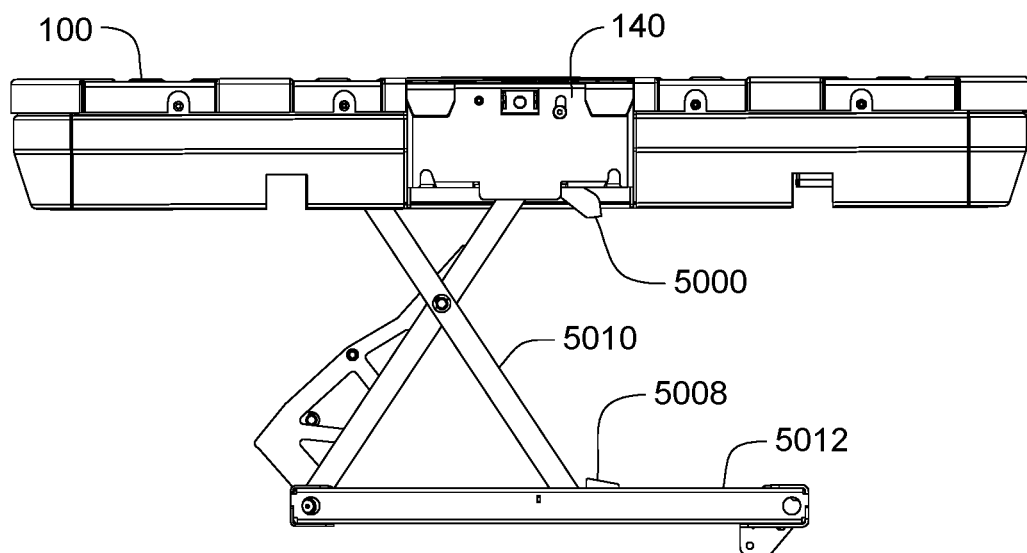
FIGS. 51A-51D show in detail the method of operation of the safety mechanism.
Figure 51B:
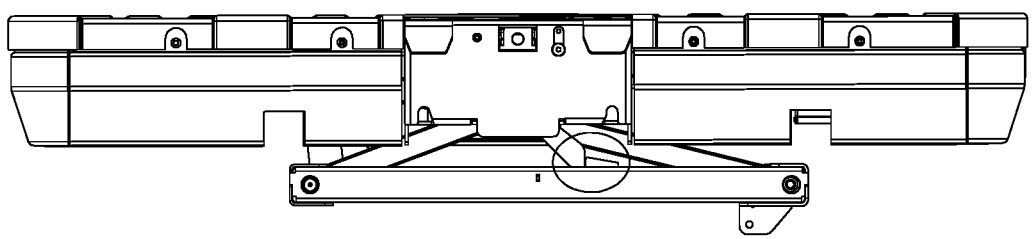
Figure 51C:
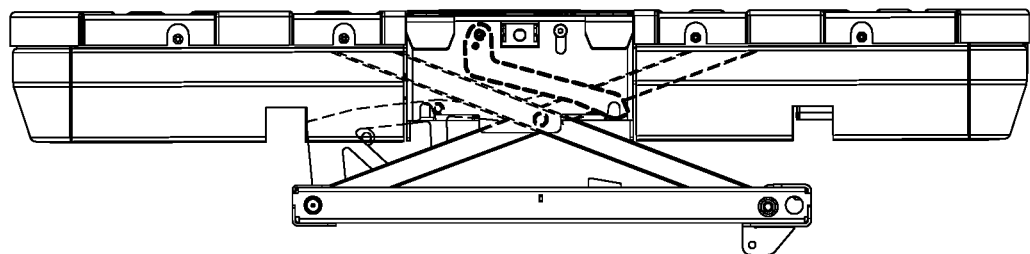
Figure 51D:
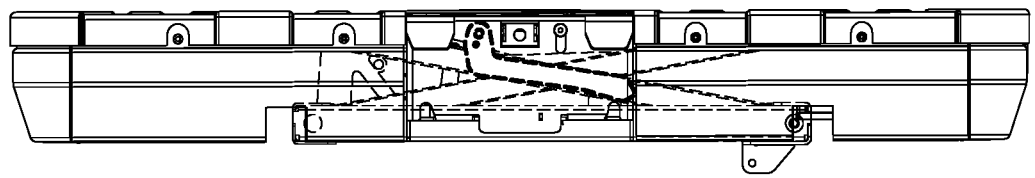
Figure 53A:
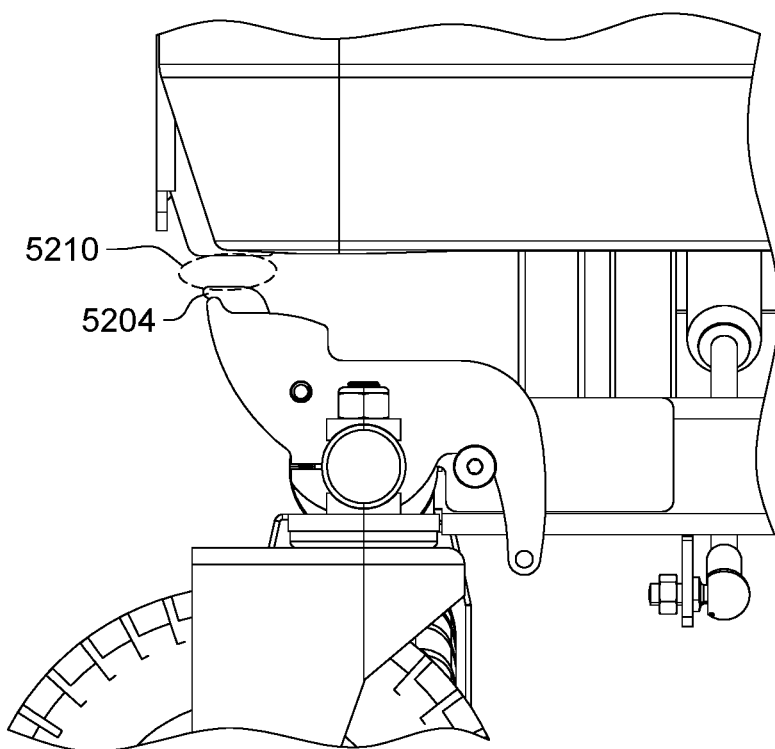
FIGS. 53A-53B show a top assembly deck 106 clearance 5210 above the rotation axle.
Figure 53B:
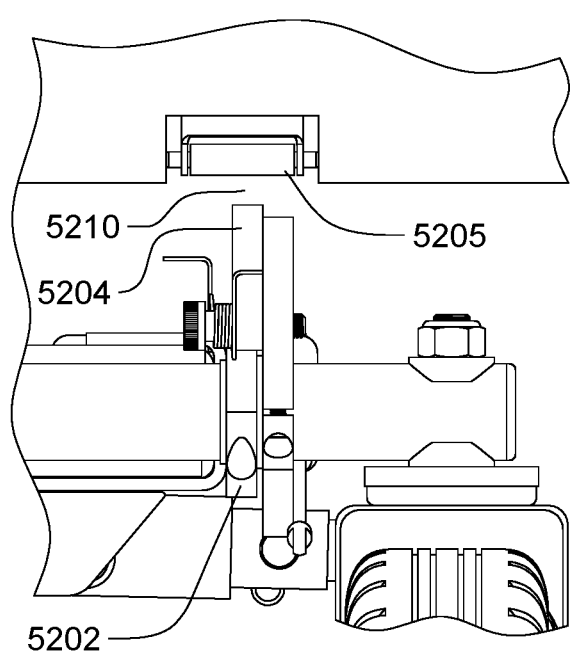

FIGS. 51A-51D show in detail the method of operation of the safety stop mechanism. FIG. 51A shows the cart 100 in a raised position. When the cart 100 is raised, the safety locking dog legs 5000 rotate back by gravity to their low and safe position, are in contact with deflector arm pin and the deflector lever 5004 (FIG. 50I) is in a bottom position. The safety stop mechanism is positioned to allow safe descent and stop against safety dog leg stop plates 5008 before allowing the rotation cam guide 5205 (FIG. 50B) to come in contact with the axle interlocking cam 5204 (FIG. 53A). Rotation cam guide 5205 is a contact point for both interlocking cam 5204 and main rotation cam 5200 (FIG. 53B). As shown in FIG. 51A, the safety locking dog legs 5000 will descend with the upper frame until they contact the safety dog leg stop plates 5008 as shown in FIG. 51B. At this moment, the scissor assembly 5010 will be locked and it will not be possible to go lower. When the cart 100 is going to be attached to a vehicle 404 as shown in FIG. 51C, the deflector lever safety trigger 5002 will contact the secure receiver 500 and will slide up within its slot actuating deflector lever 5004. By this movement, the safety locking dog legs 5000 (via actuation arm 5005 and connecting shaft 5006) will also rotate and will be able to clear the safety dog leg stop plates 5008 on the sub-frame (FIG. 51C). Referring to FIG. 51D, next, the safety locking dog legs 5000 will clear the safety dog leg stops 5008 until the subframe/undercarriage assembly is fully retracted, stow axles 155 are rotated and wheels 108, 109 stowed.

Figure 52A:
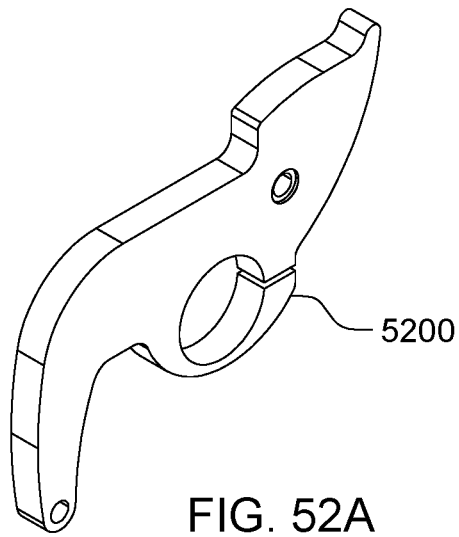
FIG. 52A shows a main rotation cam 5200.
Figure 52B:
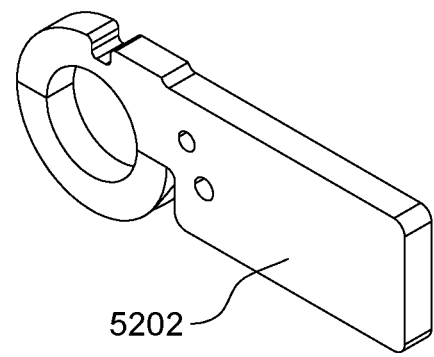
FIG. 52B shows an axle shaft support 5202.
Figure 52C:
FIG. 52C shows an interlocking cam 5204.
Figure 54A:
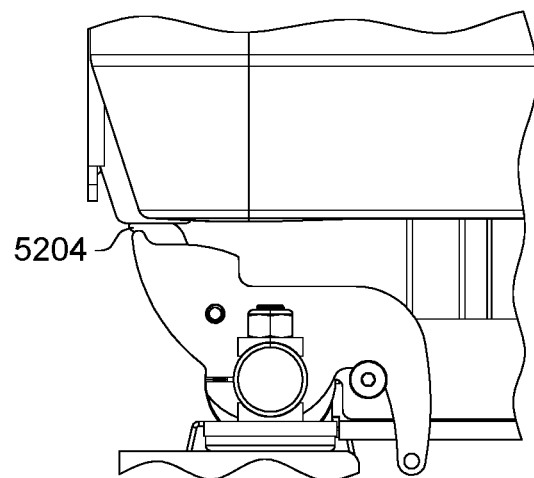
FIGS. 54A-54H show how the axle lock and unlock mechanism works.
Figure 54B:
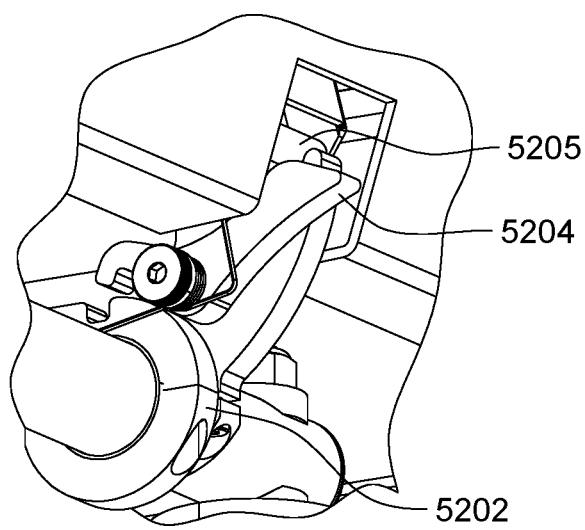
Figure 54C:
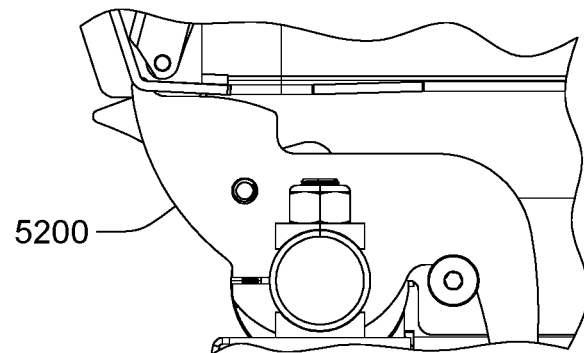
Figure 54D:
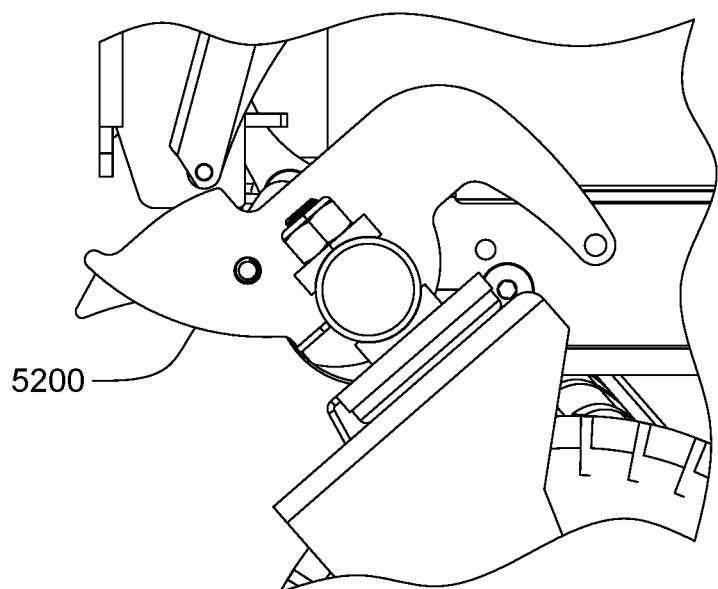
Figure 54E:
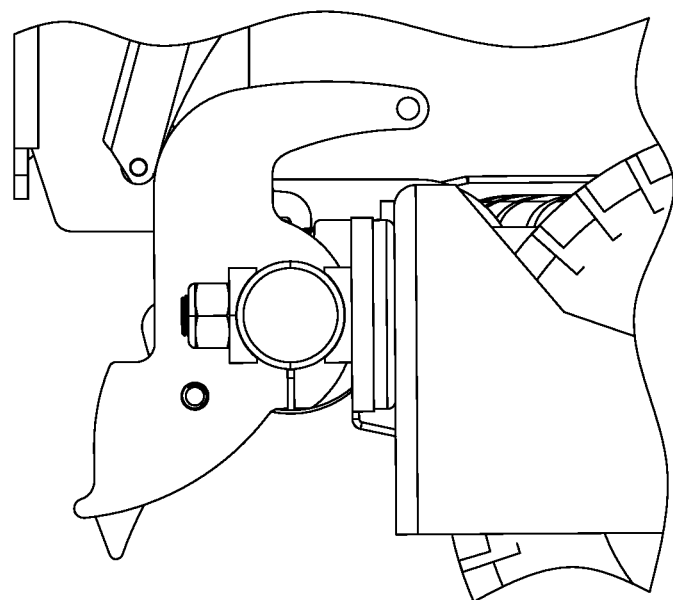

FIGS. 52A-54E illustrate an alternative embodiment of an axle lock and unlock mechanism of that shown in FIGS. 25A-E. FIG. 52A shows a main rotation cam 5200. FIG. 52B shows an axle shaft support 5202. FIG. 52C shows an interlocking cam 5204. FIGS. 53A-53B show a top assembly deck 106 with attached rotation cam guide 5205 clearance 5210 above the interlocking cam 5204. FIGS. 54A-54H show how the axle lock and unlock mechanism works. FIG. 54A shows the interlocking cam 5204 contacting the rotation cam guide 5205 (see FIG. 54B) on the top deck assembly. Next, as shown in FIGS. 54B and 54C, the interlocking cam 5204 is deflected to unlock it from a notch recess or from around a pin on the axle shaft support 5202 allowing the axle to rotate within a bearing when main rotation cam 5200 subsequently contacts rotation cam guide 5205. The main rotation cams 5200 contact the rotation cam guides 5205 (FIGS. 54B, 54F) on the top deck assembly and start to rotate. FIG. 54D shows the main rotation cam 5200 halfway rotated. FIG. 54E shows the rotation main rotation cam 5200 fully rotated. The main rotation cams 5200 continue to rotate until the undercarriage assembly 107 (FIG. 1) is fully retracted whereby the wheels 108, 109 are completely folded in and stowed.

Figure 54F:
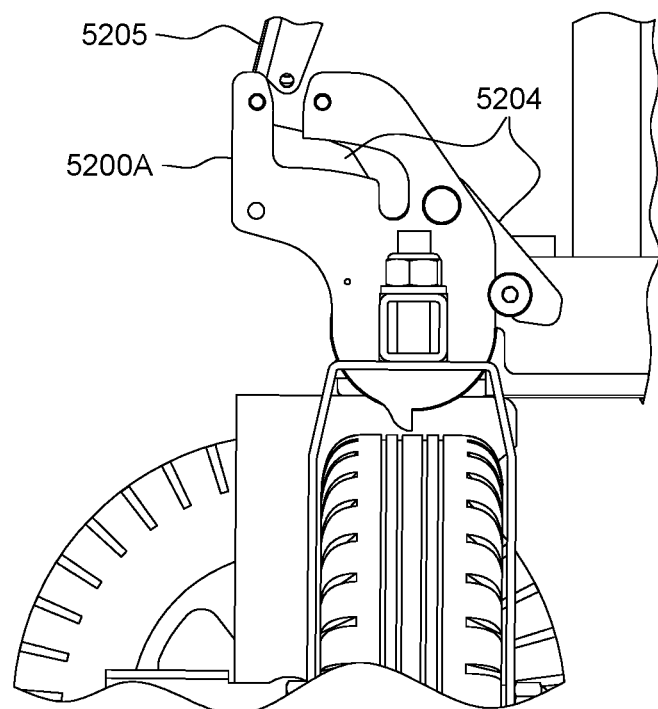
Figure 54G:
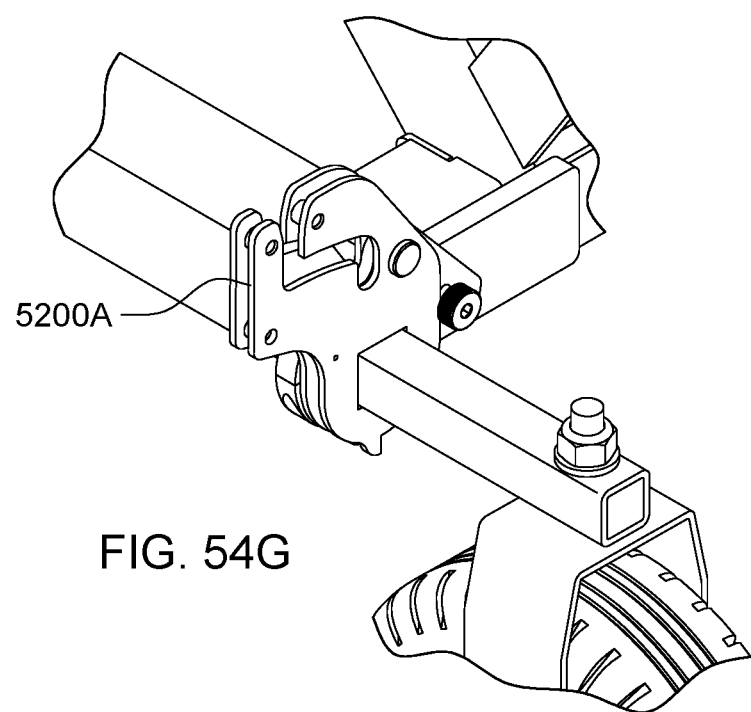
Figure 54H:
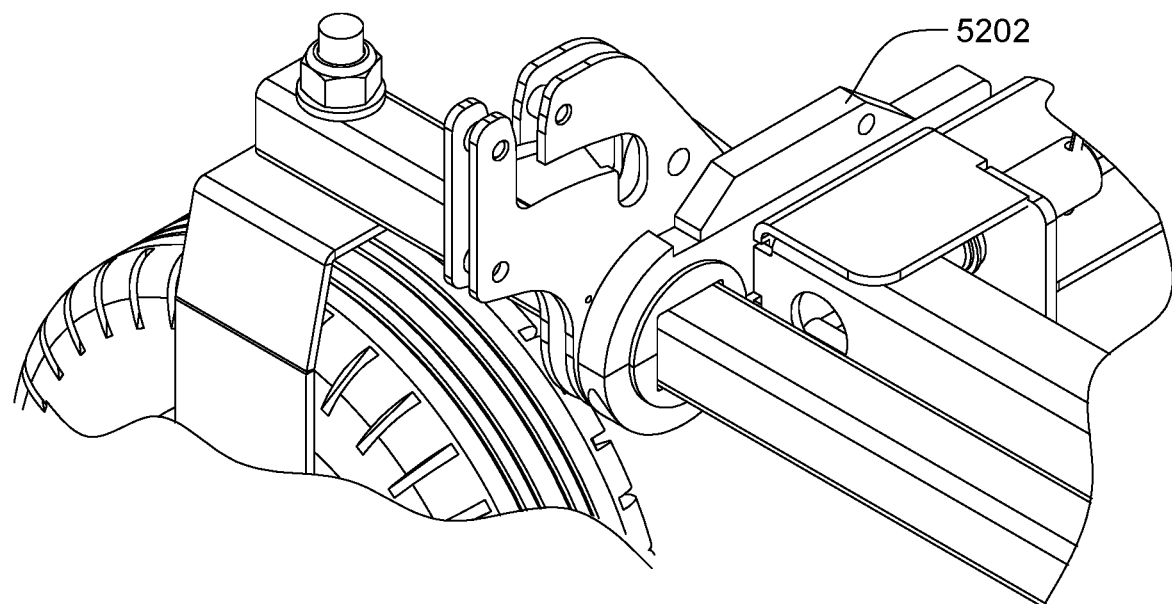

FIGS. 54F-54H are an alternative embodiment 5200A of the main rotation cam 5200 for the axle unlock and rotation mechanism. In this embodiment the interlocking cam is protected from inadvertent contact such as a foot or the like by the main rotation cam 5200A. This embodiment also improves rotation cam guide 5205 (FIG. 50F) contact and its roller along main rotation cam 5200A path for better rotation. This improves inward rotation for wheel stowing and back outward rotation for positive axle re-locking. FIG. 54G shows shaft collars with threaded holes for attachment to existing round axles. FIG. 54H shows another embodiment with square axles and machined plastic bearings. Axles could be of various geometries or materials such as aluminum, steel or other, and bearings would be similarly paired to axle geometry and material utilized.

Figure 55A:
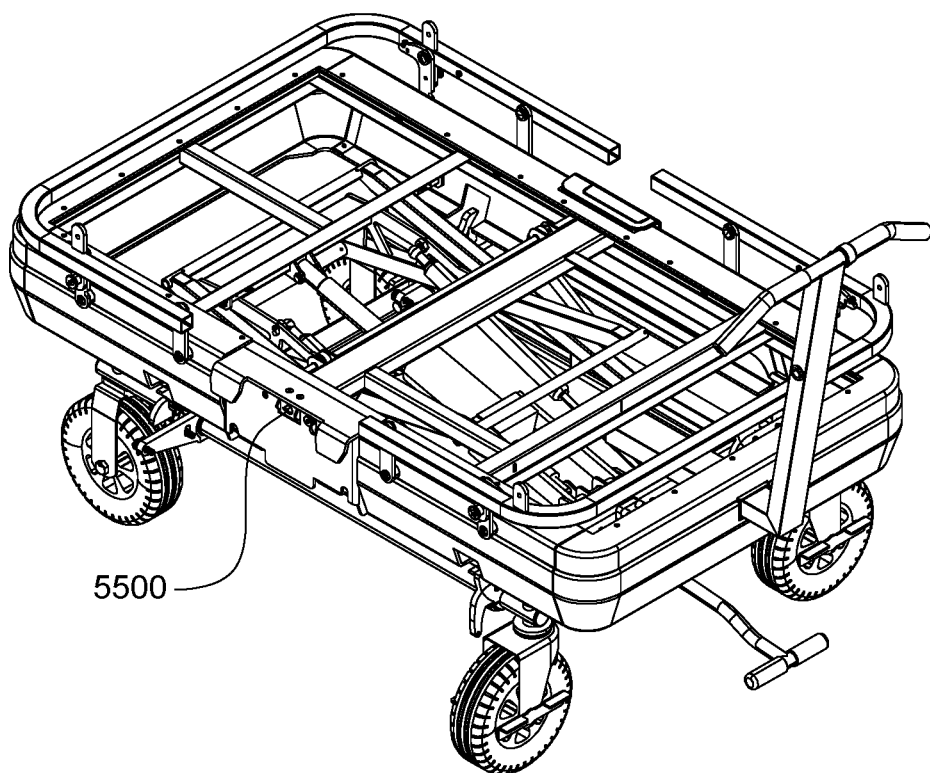
FIGS. 55A and 55B show an alternative embodiment of the mount secure coupling 140 with a resetting secure coupling lock assembly 5500.
Figure 55B:
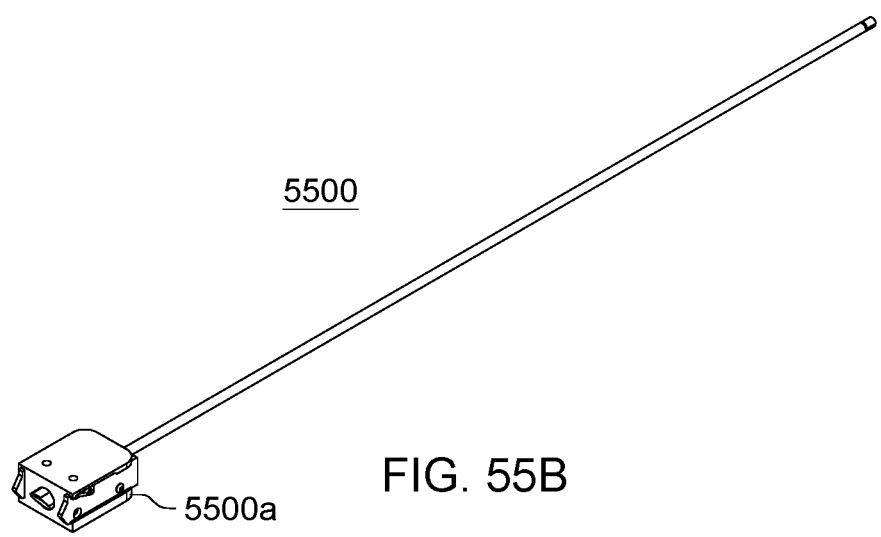
Figure 55C:
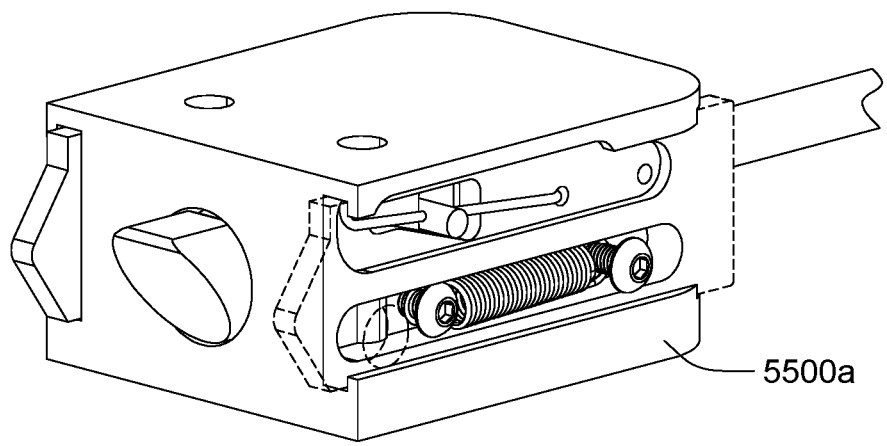
Figure 55D:
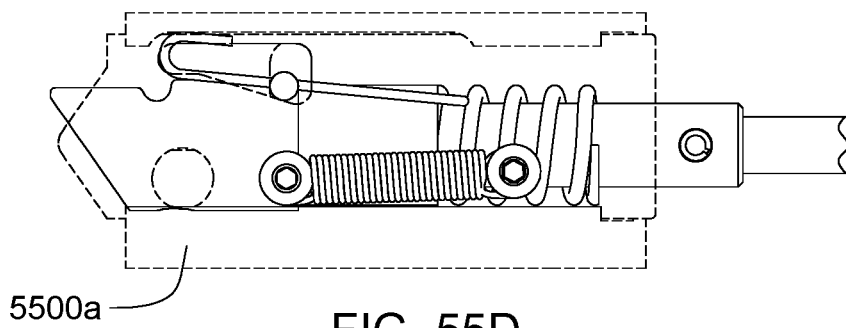
Figure 55E:
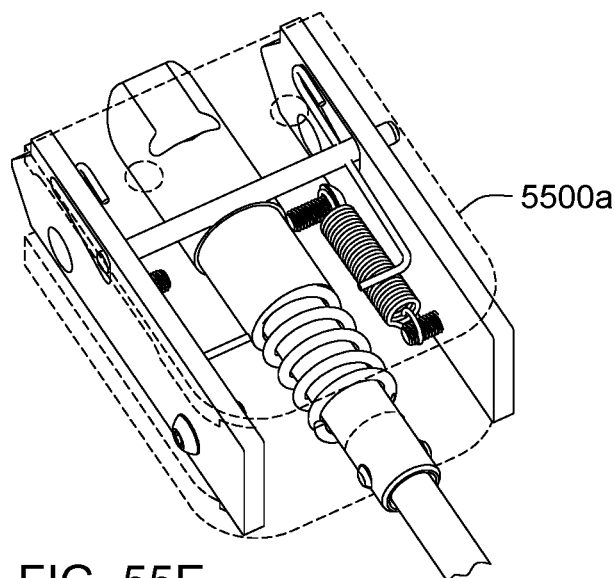
Figure 56A:
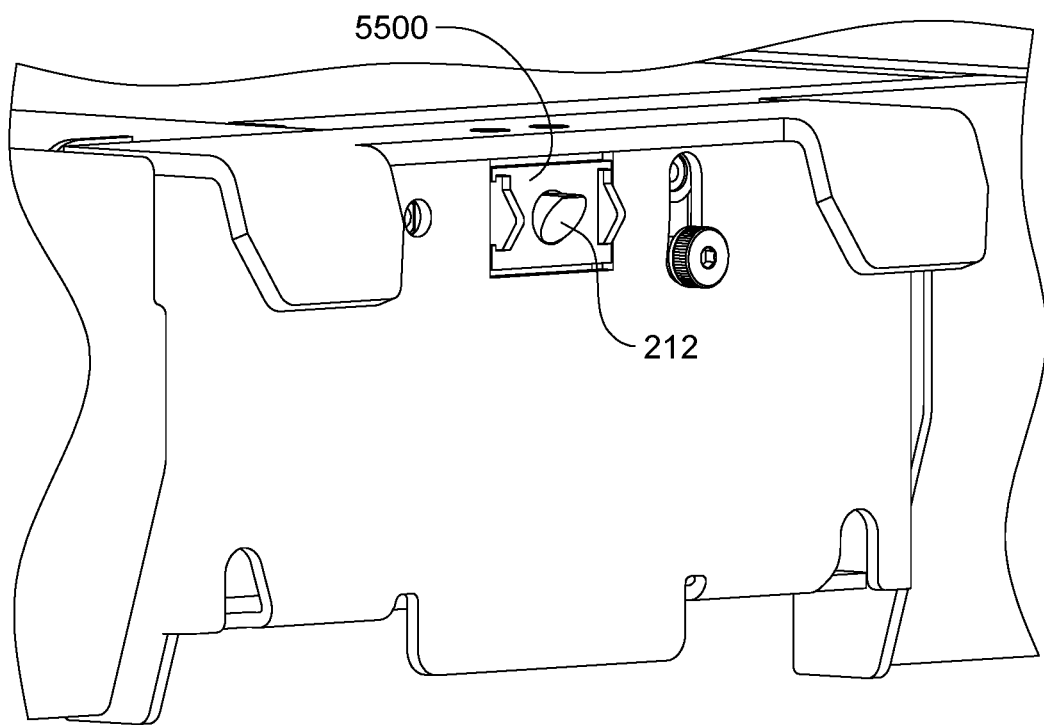
FIG. 56A illustrates when the cart 100 is raised and rolling on wheels 108, 109, then the secure coupling lock assembly 5500 is the position shown.
Figure 56B:
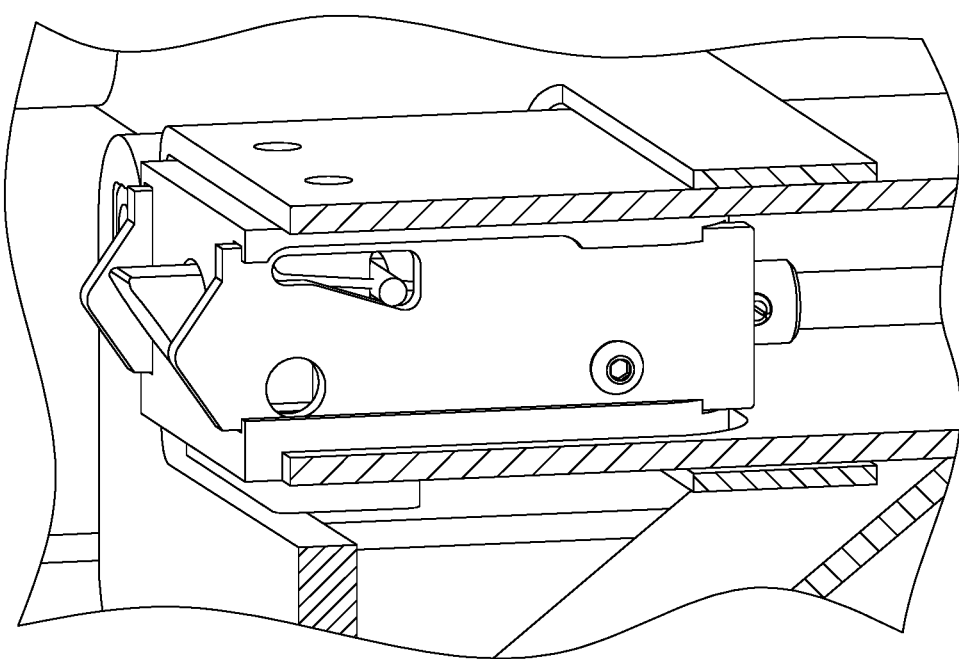
FIG. 56B shows the secure coupling lock assembly when fully locked.
Figure 57A:
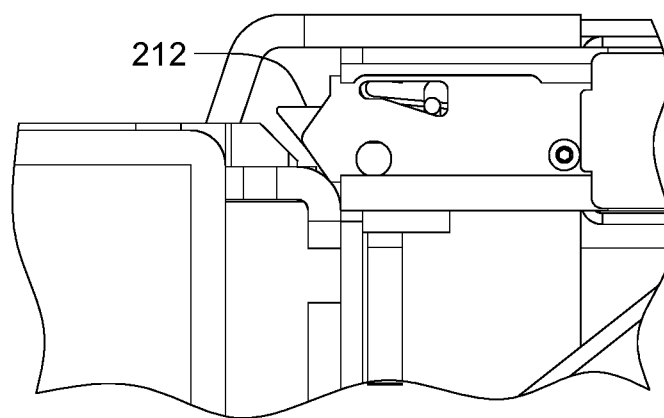
FIGS. 57A-57C show the secure coupling lock assembly 5500 moving to lock the cart 100 to the secure receiver 500.
Figure 57B:
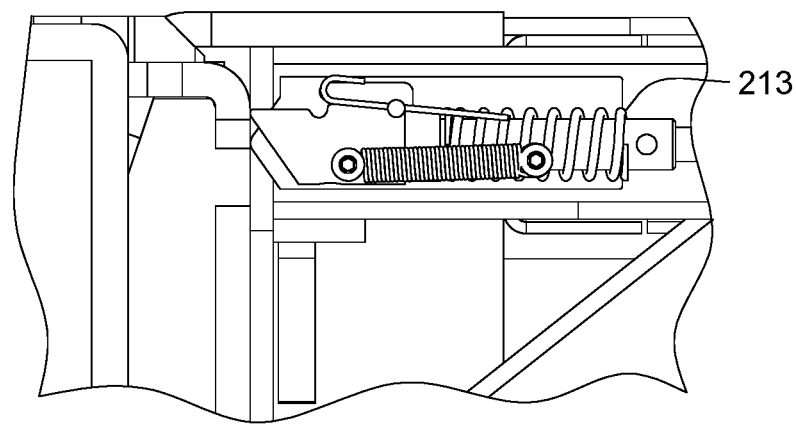
Figure 57C:
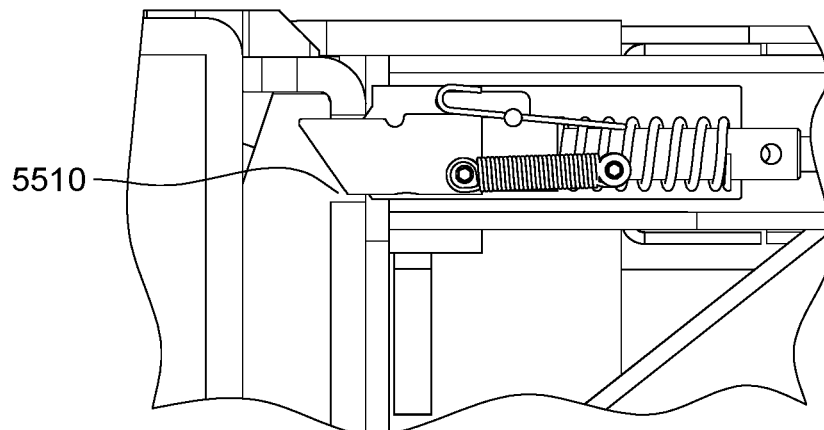
Figure 58A:
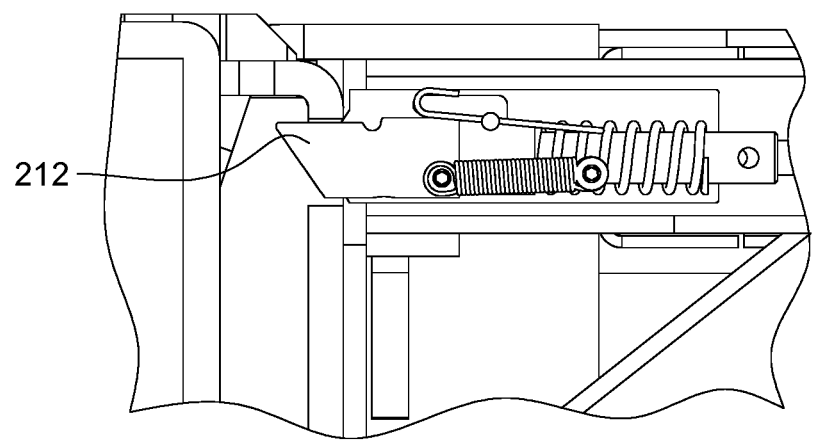
FIGS. 58A-58E show a picture of the secure coupling lock assembly 5500 moving to unlock the cart 100 from the secure receiver 500 and resetting itself.
Figure 58B:
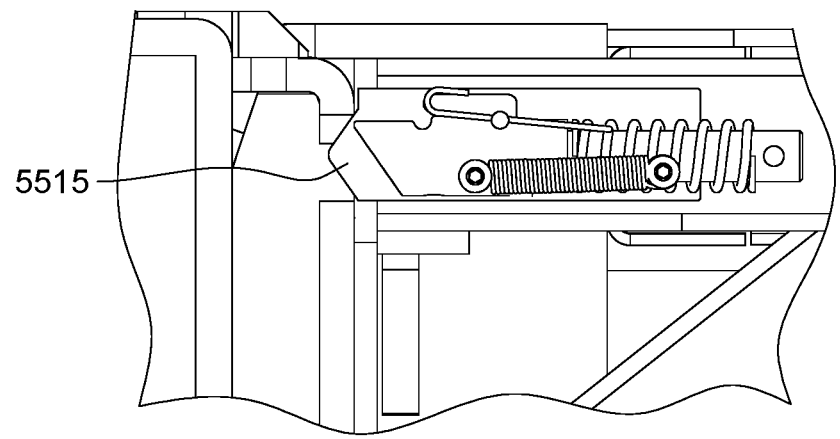
Figure 58C:
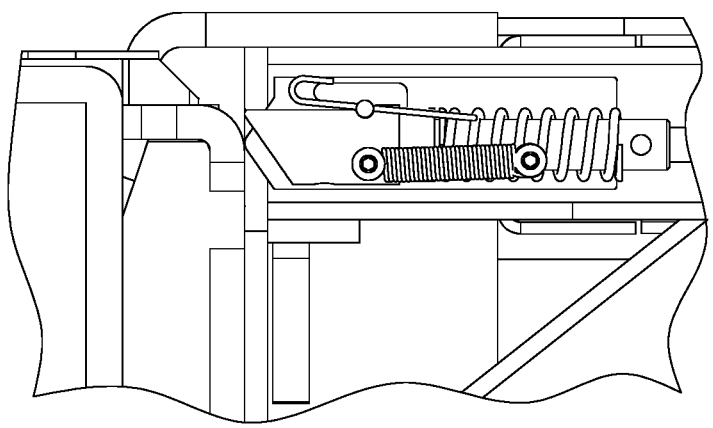
Figure 58D:
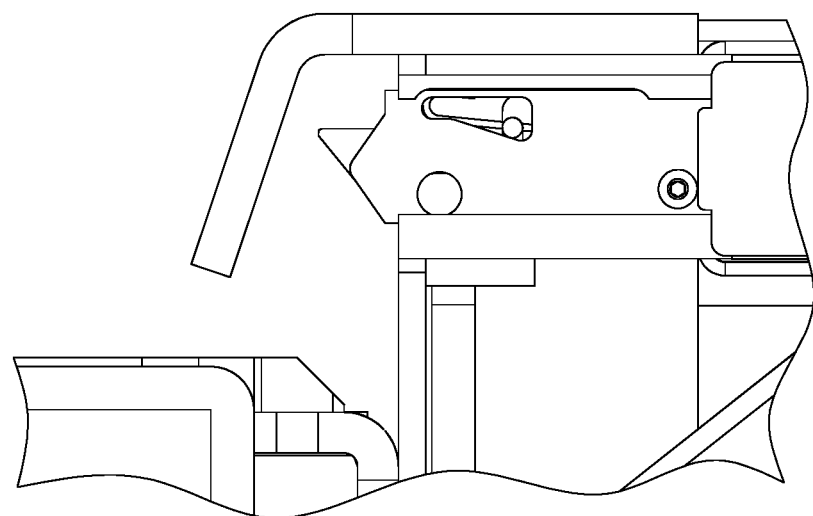
Figure 58E:
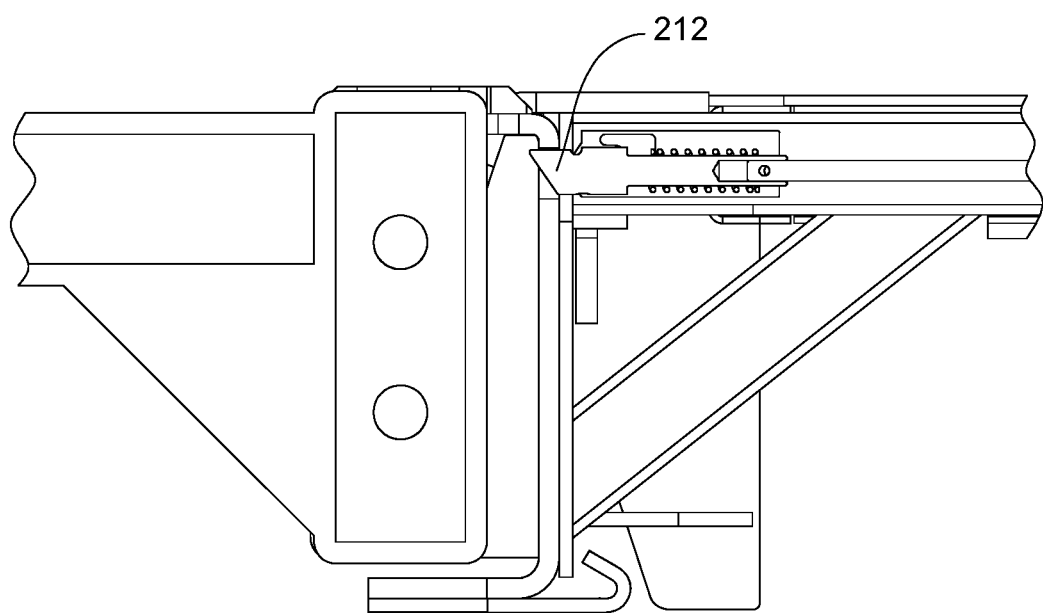

FIGS. 55A and 55B show an alternative embodiment of the secure coupling lock assembly 5500 (also known as a resetting failsafe lock). FIG. 55C shows a perspective view of the secure coupling lock assembly 5500*a*; FIG. 55D is a cross-sectional view of the secure coupling lock assembly 5500*a*; and FIG. 55E is a perspective view of the secure coupling lock assembly 5500*a*. FIGS. 56A-58E show how the secure coupling lock assembly 5500 works. Secure coupling lock assembly 5500 operates in a similar manner as described in connection with FIGS. 23A-23D and the secure coupling lock assembly 202. Same as in FIGS. 23A-23D, the cart 100 descends and secure coupling lock assembly 5500*a* locks. This action is captured in detail in FIGS. 29A-29E which show the unlock, takeoff, and reset. In FIG. 56A, when the cart 100 is raised and rolling on wheels 108, 109, then the secure coupling lock assembly 5500 is the position shown with the secure coupling lock latch bolt 212 ready to auto lock upon descent. In FIG. 56B, shows the secure coupling lock assembly when fully locked. The secure coupling lock assembly 5500 locks the cart 100 to the secure receiver 500. FIGS. 57A-57C show the secure coupling lock assembly 5500 moving to lock the cart 100 to the secure receiver 500. In FIG. 57A, the cart 100 is going down attempting to lock to the secure receiver 500. In FIG. 57B, the secure coupling lock latch bolt 212 slides over face of secure receiver 500 and is pushed back against secure coupling lock latch bolt spring 213 (e.g. a compression spring), until it finds secure receiver lock opening 5510 in secure receiver 500 (FIG. 57C). FIGS. 58A-58E show a picture of the secure coupling lock assembly 5500 moving to unlock the cart 100 from the secure receiver 500 and resetting itself. In FIG. 58A, the secure coupling lock assembly 5500 is fully locked. In FIG. 58B, the secure coupling lock release lever 111 is pulled to pull back the secure coupling lock latch bolt 212 to unlock the cart 100. In FIG. 58C, the cart 100 is shown rising and secure coupling lock assembly reset plates 5515 (FIG. 58B) are deflected by contact with the upper edge of secure receiver lock opening 5510 and thereby releasing the secure coupling lock latch bolt 212 to reset to its extended and ready to auto lock position (FIG. 58D).

Figure 59A:
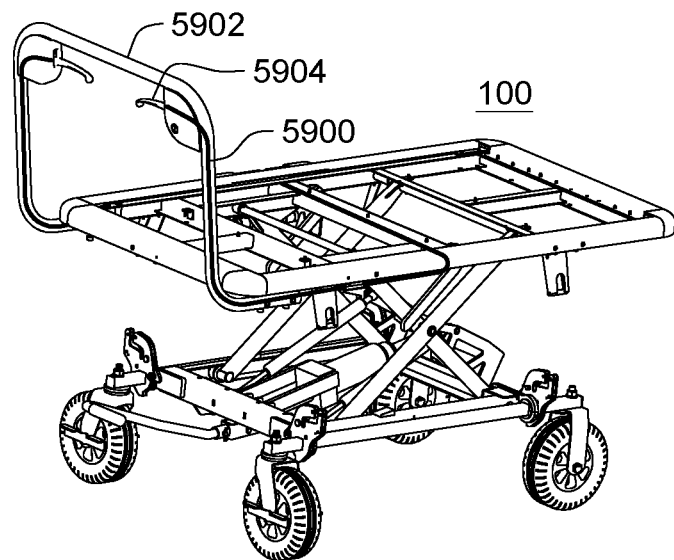
FIGS. 59A-59E show an alternative secure coupling lock assembly which is cable 5900 actuated for disengaging the locking mechanism.
Figure 59B:
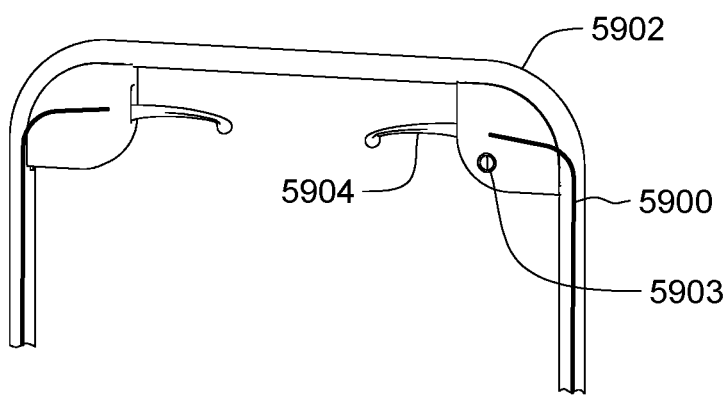
Figure 59C:
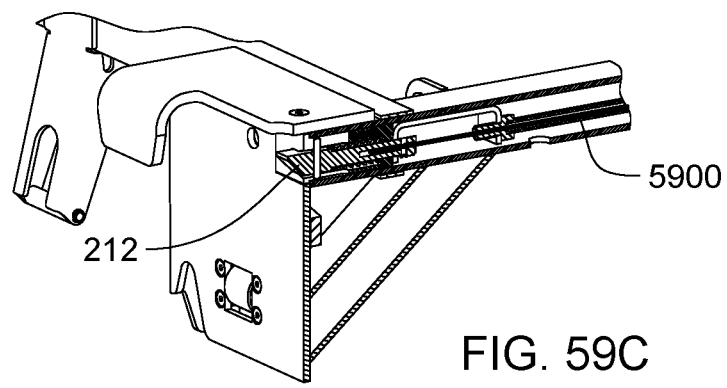
Figure 59D:
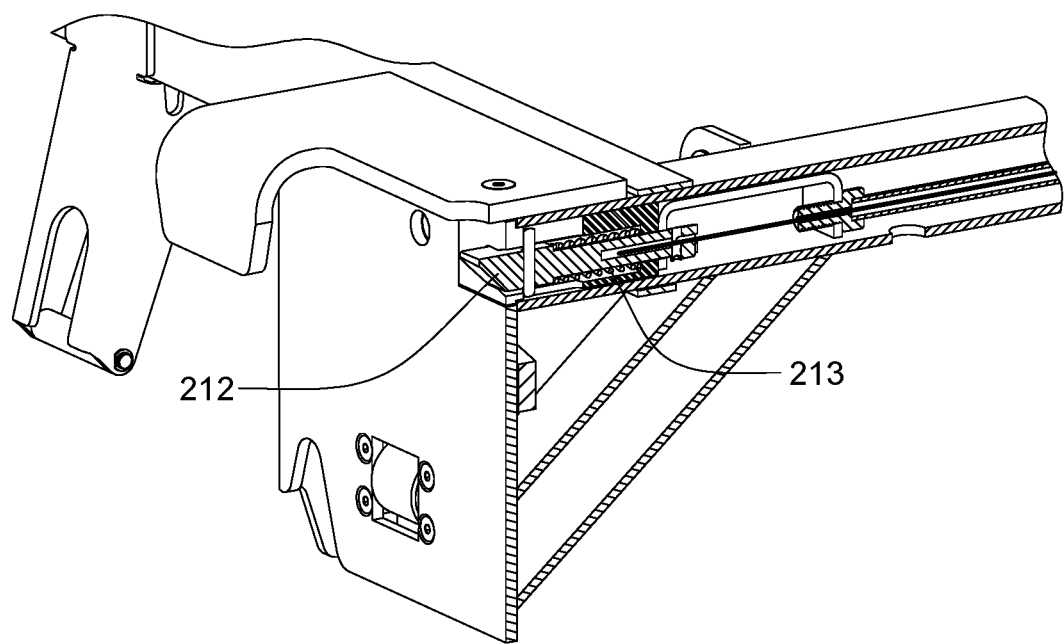
Figure 59E:
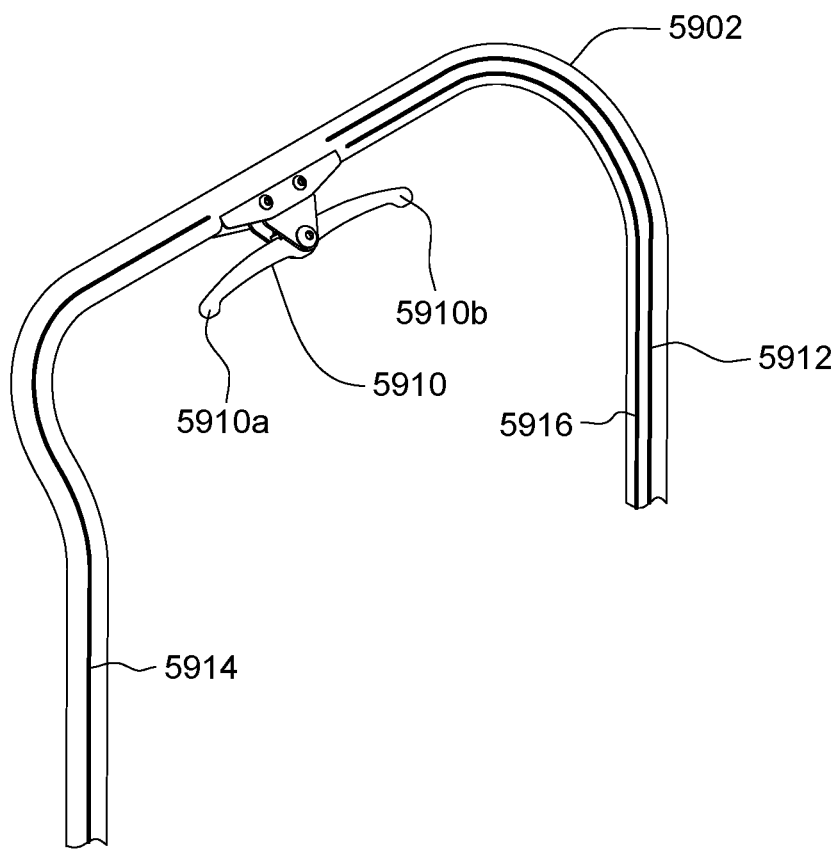

FIGS. 59A-59D show an alternative secure coupling lock assembly which is cable 5900 actuated for disengaging the secure coupling lock latch bolt 212 (FIG. 59C). FIGS. 59A and 59B show a radiused handle 5902 with a lock lever 5904 connected to a cable 5900. Upon pulling the lock lever 5904, the cable 5900 retracts the latch lock bolt against a compression spring to unlock the cart. Upon releasing the lock lever the latch bolt is re-extended to its ready to auto lock position by the secure coupling lock latch bolt spring 213, so that it is reset and will automatically relock the mount secure receiver upon descent and coupling. In FIG. 59B a theft security key lock 5903 is shown to provide security from unlocking the secure coupling lock assembly and further prevent theft by prohibiting taking the cart off of the mount secure receiver. FIG. 59E shows an alternative lever 5910 to the control levers. Pull up one side of the lever 5910*a* and the hydraulic cylinder will release. Pull up the other side 5910*b* and it will release (retract) the secure coupling lock latch bolt 212. Both sides 5910*a*, 5910*b* are connected by independent cables to their respective mechanisms (i.e., one cable (5912) to hydraulic pump cylinder release and one cable (5914 or 5916) to the secure coupling lock assembly.

Figure 60A:
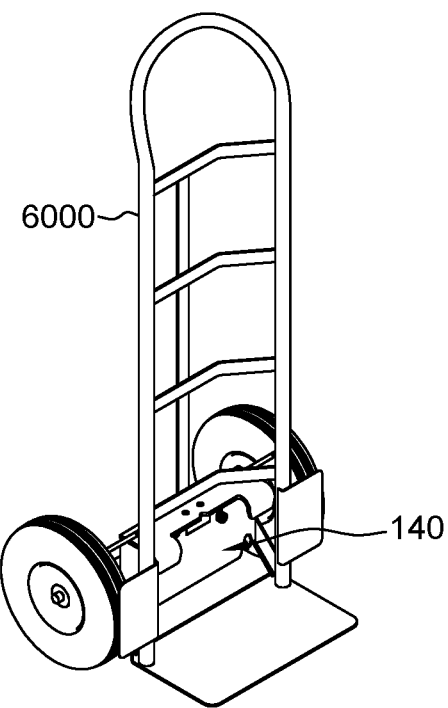
FIG. 60A shows a hand truck mounted on a vehicle through the mount secure coupling and secure receiver system system and FIG. 60B shows the hand truck with the mount securing coupling.
Figure 60B:
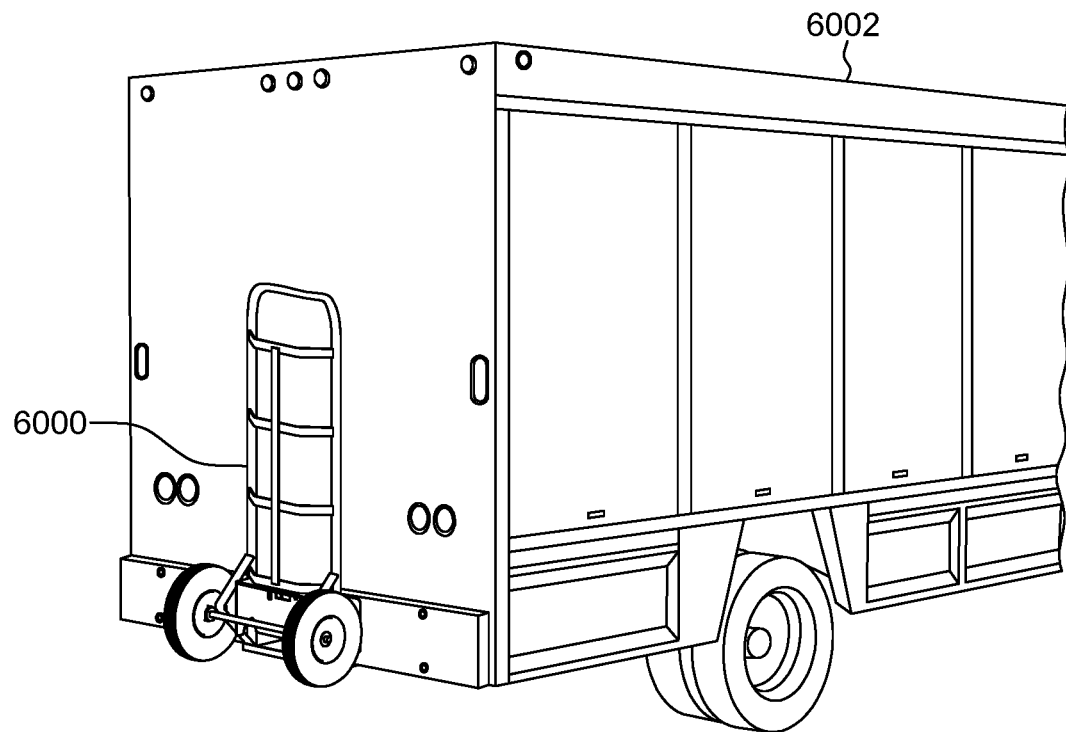

FIG. 60A shows a hand truck 6000 mounted on a vehicle 6002 (e.g., delivery truck) through the mount secure coupling and secure receiver system and FIG. 60B shows the hand truck 6000 with the mount securing coupling 140.

The foregoing embodiments are presently by way of example only; the scope of the present disclosure is to be limited only by the claims.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes. Although these processes may describe the operations as a sequential process, many of the operations can be performed in parallel or concurrently. In addition, the order of the operations may be rearranged. A process may have additional steps not included in the figures. Also, a number of steps may be undertaken before, during, or after the above elements are considered.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Accordingly, the above description does not limit the scope of the disclosure.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

What is claimed is:

1. A carrier and mount secure coupling and receiver system comprising:
   the carrier comprising:
   a deck having a carrying portion;
   a lever located on a first side of the deck and coupled with a connector extending across the width of the carrier to a secure coupling lock assembly located on the second side of the deck;
   a mount secure coupling located on the second side of the deck and capable of being attached to a secure receiver by engagement of the mount secure coupling and the secure coupling lock assembly; and
   wherein the lever is capable of operating the connector to unlock the secure coupling lock assembly and detach the carrier from the secure receiver.

2. The carrier and mount secure coupling and receiver system of claim 1, the carrier further comprising:
   an undercarriage assembly capable of supporting and adjusting the height of the deck through a pair of scissor arms.

3. The carrier and mount secure coupling and receiver system of claim 2, the undercarriage assembly further comprising:
   a hydraulic cylinder capable of adjusting the height of the pair of scissor arms to lower and raise the deck.

4. The carrier and mount secure coupling and receiver system of claim 3, the undercarriage assembly further comprising:
   a return spring or plurality of return springs configured to pull the pair of scissor arms back into a retraction position from an extension position upon attachment of the mount secure coupling to the secure receiver.

5. The carrier and mount secure coupling and receiver system of claim 2, the undercarriage assembly further comprising:
   a pair of axles that will unlock and rotate inward by at least one of a plurality of rotation cams upon retraction of the undercarriage assembly.

6. The carrier and mount secure coupling and receiver system of claim 1, further comprising the secure receiver having:
   an opening capable of receiving a latch bolt and at least one retention slot capable of receiving a corresponding at least one tine of a coupler.

7. The system of claim 1 wherein the connector is a connecting rod.

8. The system of claim 1 wherein the connector is a cable.

9. A carrier and mount secure coupling and receiver system comprising:
   the carrier having a deck having a carrying portion, a mount secure coupling and a secure coupling lock assembly, wherein the mount secure coupling is capable of being attached to a secure receiver by engagement of the mount secure coupling and the secure coupling lock assembly; and
   the secure receiver has an opening capable of receiving a latch bolt and at least one retention slot capable of receiving a corresponding at least one tine of a coupler.

10. A carrier and mount secure coupling and receiver system comprising:
    the carrier comprising:
    a deck having a carrying portion, a mount secure coupling and a secure coupling lock assembly; and
    wherein the mount secure coupling is capable of being attached to a secure receiver by engagement of the mount secure coupling and the secure coupling lock assembly while simultaneously lifting up and turning inward two pairs of wheels until retracted.

11. The carrier and mount secure coupling and receiver system of claim 10, further comprising the secure receiver having:
    an opening capable of receiving a latch bolt and at least one retention slot capable of receiving a corresponding at least one tine of a coupler.

12. A carrier and mount secure coupling and receiver system comprising:
    the carrier comprising:
    a deck having a carrying portion;
    a mount secure coupling and a secure coupling lock assembly;
    wherein the mount secure coupling is capable of being attached to a secure receiver by engagement of the mount secure coupling and the secure coupling lock assembly; and
    an undercarriage assembly capable of supporting and adjusting the height of the deck through a pair of scissor arms and having a pair of axles that will unlock and rotate inward by at least one of a plurality of rotation cams upon retraction of the undercarriage assembly.

13. The carrier and mount secure coupling and receiver system of claim 12, wherein at least one of a plurality of cam guides is configured to come into contact with the at least one of the plurality of rotation cams after the unlock during retraction of the undercarriage assembly.

14. The carrier and mount secure coupling and receiver system of claim 12, further comprising the secure receiver having:
    an opening capable of receiving a latch bolt and at least one retention slot capable of receiving a corresponding at least one tine of a coupler.

* * * * *